(12) United States Patent
Lin

(10) Patent No.: US 10,387,157 B2
(45) Date of Patent: Aug. 20, 2019

(54) SYSTEM AND METHOD FOR INSTRUCTION SET CONVERSION BASED ON MAPPING OF BOTH BLOCK ADDRESS AND BLOCK OFFSET

(71) Applicant: Shanghai XinHao Microelectronics Co. Ltd., Shanghai (CN)

(72) Inventor: Kenneth Chenghao Lin, Shanghai (CN)

(73) Assignee: SHANGHAI XINHAO MICROELECTRONICS CO. LTD., Shanghai (CN)

( * ) Notice: Subject to any disclaimer, the term of this patent is extended or adjusted under 35 U.S.C. 154(b) by 366 days.

(21) Appl. No.: 15/100,250

(22) PCT Filed: Nov. 26, 2014

(86) PCT No.: PCT/CN2014/092313
§ 371 (c)(1),
(2) Date: May 27, 2016

(87) PCT Pub. No.: WO2015/078380
PCT Pub. Date: Jun. 4, 2015

(65) Prior Publication Data
US 2017/0003967 A1    Jan. 5, 2017

(30) Foreign Application Priority Data

Nov. 27, 2013  (CN) .......................... 2013 1 0625156
Dec. 24, 2013  (CN) .......................... 2013 1 0737869

(51) Int. Cl.
G06F 9/30       (2018.01)
G06F 9/38       (2018.01)
G06F 12/0875    (2016.01)

(52) U.S. Cl.
CPC .......... *G06F 9/3802* (2013.01); *G06F 9/3004* (2013.01); *G06F 9/3017* (2013.01); *G06F 12/0875* (2013.01); *G06F 2212/452* (2013.01)

(58) Field of Classification Search
None
See application file for complete search history.

(56) References Cited

U.S. PATENT DOCUMENTS 7,406,585 B2 * 7/2008 Rose ................... G06F 9/30174
                                                 711/E12.017
2005/0223192 A1 10/2005 Topham
(Continued)

FOREIGN PATENT DOCUMENTS

CN    1682181 A    10/2005
CN    103235724 A  8/2013

OTHER PUBLICATIONS

The World Intellectual Property Organization (WIPO) International Search Report for PCT/CN2014/092313 dated Feb. 27, 2015.

*Primary Examiner* — Aimee Li
*Assistant Examiner* — William V Nguyen
(74) *Attorney, Agent, or Firm* — Anova Law Group, PLLC

(57) ABSTRACT

An instruction set conversion system and method is provided, which can convert guest instructions to host instructions for processor core execution. Through configuration, instruction sets supported by the processor core are easily expanded. A method for real-time conversion between host instruction addresses and guest instruction addresses is also provided, such that the processor core can directly read out the host instructions from a higher level cache, reducing the depth of a pipeline.

19 Claims, 17 Drawing Sheets

(56) References Cited

U.S. PATENT DOCUMENTS

| | | | |
|---|---|---|---|
| 2009/0217009 A1* | 8/2009 | Shum | G06F 9/30018 712/226 |
| 2011/0072428 A1* | 3/2011 | Day, II | G06F 9/45558 718/1 |
| 2013/0198496 A1* | 8/2013 | Busaba | G06F 9/3005 712/233 |
| 2015/0317159 A1* | 11/2015 | Stark | G06F 9/30145 712/202 |
| 2015/0324213 A1* | 11/2015 | Abdallah | G06F 9/45525 717/151 |

* cited by examiner

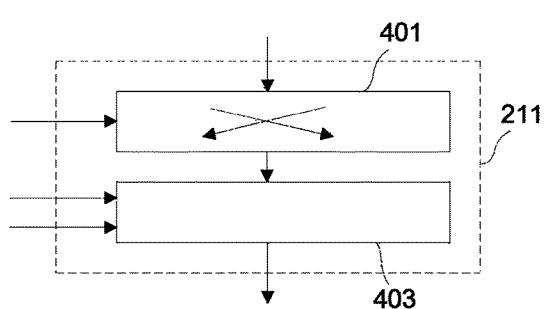
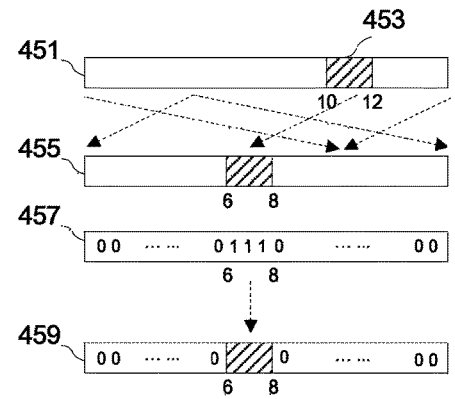
Figure 4A              Figure 4B
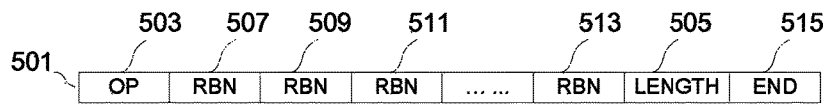
Figure 5A
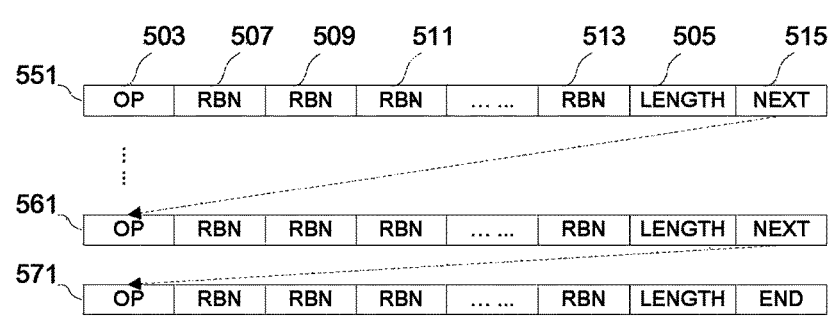
Figure 5B

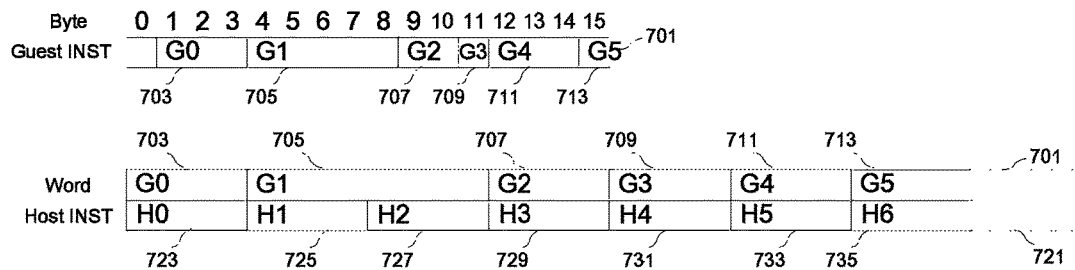
Figure 8A
618
Bits for Guest INST  `0 1 0 0 1 0 0 0 0 1 0 1 1 0 0 1`  —751
Bits for Host INST  `1 1 0 1 1 1 1`  —771
Figure 8B
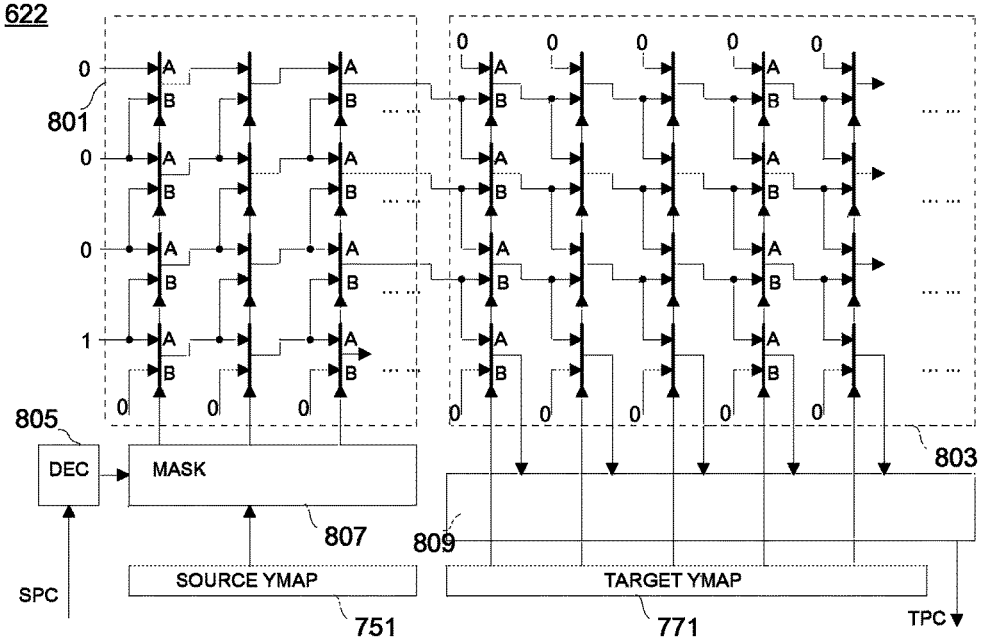
Figure 8C

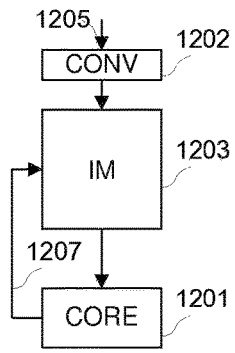
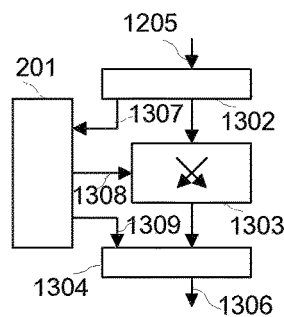
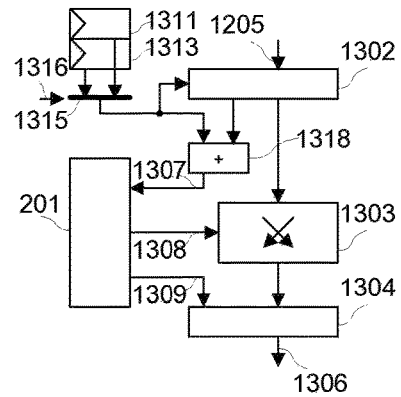
Figure 12     Figure 13A     Figure 13B
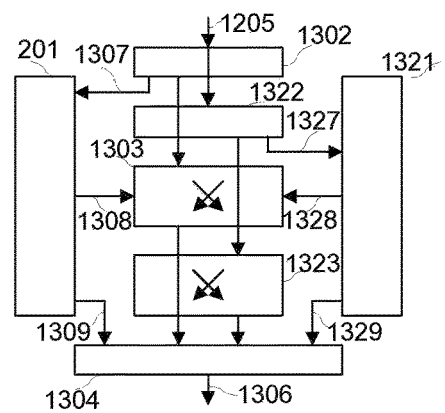
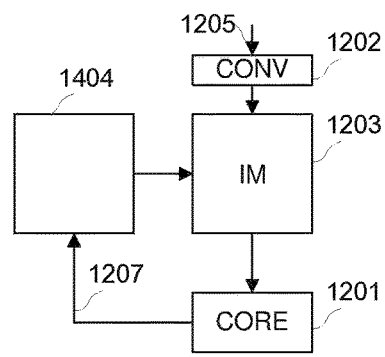
Figure 13C     Figure 14
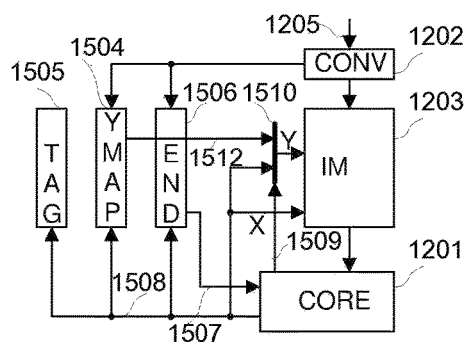
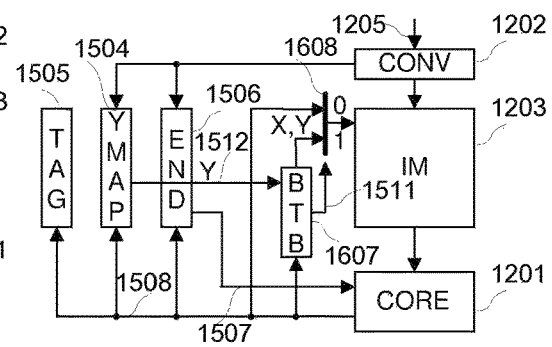
Figure 15     Figure 16

SYSTEM AND METHOD FOR INSTRUCTION SET CONVERSION BASED ON MAPPING OF BOTH BLOCK ADDRESS AND BLOCK OFFSET

CROSS-REFERENCES TO RELATED APPLICATIONS

The application is the U.S. National Stage of International Patent Application No. PCT/CN2014/092313, filed on Nov. 26, 2014, which claims priority of Chinese Application No. 201310625156.4, filed on Nov. 27, 2013, and priority of Chinese Application No. 201310737869.X, filed on Dec. 24, 2013, the entire contents of all of which are hereby incorporated by reference.

FIELD OF THE INVENTION

The present invention generally relates to computer, communication, and integrated circuit technologies.

BACKGROUND

Currently, if one processor core executes programs belonging to different instruction sets, the most common method is to use a software virtual machine (or a virtual layer). The role of the virtual machine is to translate or interpret a program composed of an instruction set (guest instruction set) that is not supported by the processor core to generate the corresponding instructions in the instruction set (host instruction set) supported by the processor core for processor core execution. In general, during the operating process, an interpretation method fetches all fields including opcodes and operands in the guest instruction using the virtual machine in order and in real time via a software method. Then, the corresponding operations are performed for the operands using a stack structure in the memory based on different opcode. Therefore, multiple host instructions need to be executed to realize the function of any one guest instruction, and efficiency is low. While a translation method is used, a process similar to software compilation is implemented before the program is executed. The program is converted into a form entirely composed of the host instruction set. Thus, when the program is executed, the efficiency is higher. However, there is still performance overhead associated with the software compiling process.

With the second method, instruction decoders corresponding to different instruction sets are added in the processor core. When instructions of the different instruction sets are executed, the appropriate instruction decoders may decode the instructions, and the decoded instructions may be passed to a subsequent pipeline to perform the corresponding operations. This method has almost no loss in efficiency, but the extra instruction decoders can increase hardware cost, and increase the cost of the processor chip. In addition, because a variety of instruction decoders are implemented in advance within the processor core, scalability is lack and a new instruction set cannot be supported.

With the third method, a conversion module is added outside of the processor core. The conversion module can convert a guest instruction set to a host instruction set for processor core execution. The conversion module can be implemented in software. Generally, the method is easy to expand, but the efficiency is too low. The conversion module can also be implemented in hardware. But it is difficult to expand, and the method cannot take full advantage of a cache memory to obtain the host instruction.

Specifically, when the conversion module is located between the cache memory and the processor core, the instructions stored in the cache memory are guest instructions and the guest instructions need to be converted to the host instructions for processor core execution. Thus, regardless of whether there is a cache hit, the conversion operation needs to be performed. Therefore, the conversion operation for the same guest instruction is performed repeatedly multiple times, which increases the power consumption and deepens the pipeline of the processor core, further increasing hardware cost and performance loss when a branch prediction fails.

When the conversion module is located outside of the processor core (that is, the cache memory is located between the conversion module and the processor core), the instructions stored in the cache memory are the converted host instructions. That is, based on the host instruction address, an addressing operation is performed. While a branch target instruction address obtained by the branch instruction executed by the processor core is a guest instruction address. Because there is no one-to-one correspondence between the host instruction and the guest instruction (for example, a guest instruction may correspond to multiple host instructions), the correspondence between the host instruction address and the guest instruction address must be recorded. Thus, when a branch is taken, the guest instruction address of the branch target instruction is converted to the host instruction address. Then, the processor core may fetch the correct host instruction in the cache memory for processor core execution based on the obtained host instruction address. The difficulty for recording mapping relationships between the guest instruction addresses and the host instruction addresses is how to effectively convert the guest instruction addresses and store the converted instructions. Otherwise, once a branch is taken, based on a guest instruction address, the guest instruction is read out from the lower memory outside the conversion module and converted by the conversion module, and then the converted instruction is stored in the cache for processor core execution, greatly affecting execution performance. One solution to this problem is to use a trace cache based on a program execution trace instead of the traditional cache based on address matching. But the trace cache stores a large amount of instructions that have duplicate addresses but are located in different traces, resulting in large volume waste in memory capacity and low performance of the trace cache.

The disclosed methods and systems are directed to solve one or more problems set forth above and other problems. It should be noted that the content in this section is part of the disclosure and, unless explicitly indicated, shall not be considered as prior art.

BRIEF SUMMARY OF THE DISCLOSURE

An instruction set conversion method is provided. The method comprises: converting guest instructions to host instructions, and creating mapping relationships between guest instruction addresses and host instruction addresses; storing the host instruction in a cache memory that is accessed directly by a processor core; based on the host instruction address, perform a cache addressing operation to fetch directly the corresponding host instruction for processor core execution; or after converting the guest instruction address outputted by the processor core to the host instruction address based on the mapping relationship, perform the cache addressing operation to fetch the corresponding host instruction for processor core execution.

Optionally, in the method, based on a program execution flow and instruction execution feedback from the processor core, subsequent host instructions are provided to the processor core, where the instruction execution feedback from the processor core is a generated signal representing whether a branch is taken when the processor core executes a branch instruction.

Optionally, the method further includes: extracting all instruction fields containing an instruction type from the guest instruction; based on the extracted instruction type of the guest instruction, finding the instruction type of the host instruction and instruction conversion control information corresponding to the guest instruction; based on the instruction conversion control information, shifting the corresponding instruction fields extracted from the guest instruction; and splicing the instruction type of the host instruction and the shifted instruction fields to form the corresponding host instruction.

Optionally, the method includes one of the following: one guest instruction is converted to one host instruction, where an instruction address of the guest instruction corresponds to an instruction address of the host instruction; and one guest instruction is converted to a plurality of host instructions, where an instruction address of the guest instruction corresponds to an instruction address of a first host instruction of the plurality of host instructions.

Optionally, in the method, a plurality of guest instructions are converted to one host instruction, where an instruction address of a first guest instruction of the plurality of guest instructions corresponds to an instruction address of the host instruction.

Optionally, the method further includes creating mapping relationships between guest instruction addresses and host instruction addresses.

Optionally, in the method, creating mapping relationships between guest instruction addresses and host instruction addresses further includes: creating mapping relationships between a plurality of guest instruction block addresses and a plurality of host instruction block addresses; and creating mapping relationships between a plurality of guest instruction block offsets and a plurality of host instruction block offsets.

Optionally, in the method, a data structure is used to represent the mapping relationships between the plurality of guest instruction addresses and the plurality of host instruction block addresses, where the data structure stores the plurality of host instruction block addresses, and the plurality of host instruction block addresses are sorted by the guest instruction block addresses and the guest instruction block offset addresses.

Optionally, in the method, when the host instruction block address corresponding to the guest instruction address exists in the data structure, based on the guest instruction block address and the guest instruction block offset address contained in the guest instruction address, a corresponding position in the data structure is found to read out the host instruction block address stored in the data structure.

Optionally, in the method, when the host instruction block address corresponding to the guest instruction address does not exist in the data structure, based on the guest instruction block address and the guest instruction block offset address in the guest instruction address, a corresponding insert position in the data structure is found to store the host instruction block address corresponding to the guest instruction address in the insert position.

Optionally, in the method, based on the mapping relationship between the guest instruction block address and the host instruction block address, the guest instruction block address is converted to the host instruction block address.

Optionally, in the method, based on the mapping relationship between the guest instruction block offset address and the host instruction block offset address, the guest instruction block offset address is converted to the host instruction block offset address.

Optionally, in the method, a total number of guest instructions between a starting address of the guest instruction block containing the guest instruction address and the guest instruction address is counted through a forward shift logic from an initial value, where the forward shift logic shifts a current value one bit in a forward direction when passing every guest instruction to obtain a shifting result. A total number of the first host instructions corresponding to the guest instructions starting from a starting address of the host instruction block corresponding to the guest instruction block is counted through a reverse shift logic, where the reverse shift logic shifts the current value one bit in a reverse direction when passing every host instruction until the shifting result is changed to the initial value. The block offset address corresponding to the host instruction is the block offset address corresponding to the guest instruction at this time.

Optionally, in the method, an operation on a stack register is converted to an operation on a register file by address calculation, such that the register file in the processor core is used as the stack register.

Optionally, in the method, a plurality of instructions in one or more guest instruction sets are converted to a plurality of instructions in a host instruction set.

An instruction set conversion system is provided. The system comprises: a processor core configured to execute a plurality of host instructions; a converter configured to convert a plurality of guest instructions to the plurality of host instructions and create mapping relationships between a plurality of guest instruction addresses and a plurality of host instruction addresses; an address mapping module configured to store the mapping relationships between the plurality of guest instruction addresses and the plurality of host instruction addresses and to perform conversions between the plurality of guest instruction addresses and the plurality of host instruction addresses; and a cache memory configured to store the plurality of host instructions obtained by the conversions and to output the corresponding host instructions for processor core execution based on the host instruction addresses.

Optionally, in the system, the converter further includes: a memory configured to store corresponding relationships between a plurality of guest instruction types and a plurality of host instruction types, as well as corresponding relationships between a plurality of instruction fields of the guest instructions and a plurality of instruction fields of the corresponding host instructions; an aligner configured to shift and align the guest instruction, where the aligner shifts the guest instruction to an instruction block and aligns the guest instruction when the guest instruction goes across an instruction block boundary; an extractor configured to extract the plurality of instruction fields containing the instruction type from the guest instruction, where the extracted instruction type is used to perform an addressing operation on the memory to read out the instruction type of the host instruction and instruction conversion control information corresponding to the guest instruction, and shift the extracted instruction fields based on the instruction conversion control information; and an instruction splicer configured to splice the instruction type of the host instruction and the shifted instruction fields to form the corresponding host instruction.

Optionally, in the system, the address mapping module further includes: a block address mapping module configured to store mapping relationships between a plurality of guest instruction block addresses and a plurality of host instruction block addresses and to convert the plurality of guest instruction block addresses to the plurality of host instruction block addresses; and an offset address mapping module configured to store mapping relationships between a plurality of guest instruction block offset addresses and a plurality of host instruction block offset addresses and to convert the plurality of guest instruction block offset addresses to the plurality of host instruction block offset addresses.

Optionally, in the system, a tracker is configured to, based on a program execution flow and instruction execution feedback from the processor core, perform the addressing operation on the cache memory along the program execution flow and to send the subsequent instructions read out from the cache memory to the processor core for execution, where the instruction execution feedback from the processor core is a generated signal representing whether a branch is taken when the processor core executes a branch instruction.

Optionally, in the system, the address mapping module further includes a forward shift logic and a reverse shift logic. The forward shift logic is configured to count a total number of guest instructions between a starting address of the guest instruction block containing the guest instruction address and the guest instruction address from an initial value, where the forward shift logic shifts a current value one bit in a forward direction when passing every guest instruction to obtain a shifting result. The reverse shift logic is configured to count a total number of the first host instructions corresponding to the guest instructions starting from a starting address of the host instruction block corresponding to the guest instruction block, where the reverse shift logic shifts the current value one bit in a reverse direction when passing every host instruction until the shifting result is changed to the initial value. At this time, the block offset address corresponding to the host instruction is the block offset address corresponding to the guest instruction.

Optionally, in the system, a register file in the processor core is used as a stack register. A top of stack pointer register is configured to store a current top of stack pointer, where the pointer points to a register in the register file. An adder is configured to add the value of the top of stack pointer and one, corresponding to a position of a register above the top of stack. A subtractor is configured to subtract one from the value of top of stack pointer, corresponding to a position of a register below the top of stack. A bottom of stack control module is configured to detect whether the stack register is nearly empty or nearly full. When the stack register is nearly full, the bottom of stack control module sends at least one register value at the bottom of stack to the memory, and adjusts a bottom of stack pointer, such that the stack register is not overflowed. When the stack register is nearly empty, the bottom of stack control module adjusts the bottom of stack pointer, and sends at least one register value stored previously in the memory to the bottom of stack, such that the stack register continues to provide operands for processor core execution.

Optionally, in the method, the instruction filled into a level one cache memory is examined to extract the corresponding instruction information. Based on the extracted instruction information, a first read pointer is updated.

Optionally, in the method, when the first read pointer points to a conditional branch instruction and a next instruction of the conditional branch instruction is an unconditional branch instruction, the first read pointer is updated based on an execution result of the conditional branch instruction. When the branch is taken, the first read pointer is updated to a branch target addressing address of the conditional branch instruction. When the branch is not taken, the first read pointer is updated to a branch target addressing address of the unconditional branch instruction. The processor core does not need to execute the unconditional branch instruction in a single clock cycle.

Optionally, in the method, when the processor core executes the branch instruction, based on branch prediction, one of a next sequential execution instruction and the branch target instruction as a subsequent instruction for the processor core execution and storing the addressing address of the other of the next sequential execution instruction and the branch target instruction is selected. When a result of the branch is the same as the branch prediction, the next subsequent instruction is resumed execution. When a result of the branch is not the same as the branch prediction, a pipeline is emptied and the instruction corresponding to the stored addressing address is executed.

Optionally, in the system, based on the instruction information, the first read pointer is updated.

Optionally, in the system, instruction information stored in a track point pointed to by the first read pointer and instruction information stored in a next track point are read out from a track table at the same time.

Optionally, in the system, when the first read pointer points to a conditional branch instruction and a next instruction of the conditional branch instruction is an unconditional branch instruction, the first read pointer is updated based on an execution result of the conditional branch instruction. When the branch is taken, the first read pointer is updated to a branch target addressing address of the conditional branch instruction. When the branch is not taken, the first read pointer is updated to a branch target addressing address of the unconditional branch instruction. The processor core does not need to execute the unconditional branch instruction in a single clock cycle.

Optionally, in the system, the tracker further includes a register configured to store addressing addresses of a next sequential execution instruction and the branch target instruction. When the processor core executes the branch instruction, based on branch prediction, one of the next sequential execution instruction and the branch target instruction is selected as a subsequent instruction for processor core execution, and the addressing address of the other of the next sequential execution instruction and the branch target instruction is stored in the register in the tracker. When a result of the branch is the same as the branch prediction, the next subsequent instruction is executed. When a result of the branch is not the same as the branch prediction, a pipeline is emptied and the instruction corresponding to the addressing address stored in the register in the tracker is executed.

Optionally, in the system, an ending track point is added after a last track point of every track in the track table. When the instruction of the ending track point is an unconditional branch instruction, the branch target addressing address is an addressing address corresponding to a first track point of a next sequential execution track in the track table. When the first read pointer points to the ending track point, the level one cache memory outputs a NOP instruction.

Optionally, in the system, the ending track point is added after the last track point of every track in the track table. When the instruction of the ending track point is an unconditional branch instruction, the branch target addressing address is an addressing address corresponding to the first track point of the next sequential execution track in the track table. When the track point before the ending track point is not a branch point, the instruction type and the branch target addressing address of the ending track point are used as the instruction type and the branch target addressing address of the track point before the ending track point, respectively.

A processor system for executing one or more instruction sets is provided. The processor system comprises a first memory configured to store a plurality of computer instructions belonging to a first instruction set; an instruction converter configured to convert the plurality of computer instructions belonging to the first instruction set to a plurality of host instructions belonging to a second instruction set; a second memory configured to store the plurality of host instructions converted by the instruction converter; and a processor core coupled to the second memory configured to fetch the plurality of host instructions directly from the second memory and execute the plurality of host instructions when there is no need to fetch the plurality of computer instructions and use the instruction converter.

Optionally, in the system, the instruction converter includes a memory configured to, based on configuration, store a mapping relationship between the first instruction set and the second instruction set. Based on the stored mapping relationship between the first instruction set and the second instruction set, the instruction converter converts the plurality of computer instructions belonging to the first instruction set to the plurality of host instructions belonging to the second instruction set.

Optionally, in the system, an address converter, coupled to the instruction converter and the processor core, is configured to convert a plurality of addresses of target computer instructions in the plurality of computer instructions belonging to the first instruction set to a plurality of host addresses of target instructions in the plurality of host instructions belonging to the second instruction set.

Optionally, in the system, when the address converter converts the addresses, the address converter is further configured to map the target computer instruction address to a host instruction block address, map the target computer instruction address to a host block offset address of the instruction block corresponding to the address of the instruction block containing the host instruction, and combine the host instruction block address with the host block offset address to form a host instruction address.

Optionally, in the system, based on the block address mapping relationship between the computer instruction block address and the host instruction block address, the host instruction block address is generated.

Optionally, in the system, the address converter stores the block address mapping relationship. Based on a mapping relationship table, a hardware logic generates the host block offset address.

Optionally, in the system, an ending flag memory is configured to store the host instruction address of an ending instruction of the host instruction block, where the ending instruction is a last host instruction before a next host instruction block in a sequential address order.

Optionally, in the system, a next block address memory is configured to store the block address of the next host instruction block in the sequential address order. A branch target buffer is configured to store the host instruction address of the branch target.

Optionally, in the system, the first memory is further configured to store a plurality of computer instructions belonging to a third instruction set. The memory in the instruction converter is further configured to store a mapping relationship between the third instruction set and the second instruction set based on configuration. Based on the stored mapping relationship between the third instruction set and the second instruction set, the instruction converter converts the plurality of computer instructions belonging to the third instruction set to the plurality of host instructions belonging to the second instruction set.

Optionally, in the system, the system runs a first thread instruction sequence and a second thread instruction sequence. The first thread instruction sequence is composed of the plurality of computer instructions in the first instruction set. The second thread instruction sequence is composed of the plurality of computer instructions in the third instruction set. The instruction converter stores the mapping relationship between the first instruction set and the second instruction set and the mapping relationship between the third instruction set and the second instruction set in the memory based on configuration. Based on a thread number of the instruction sequence, the instruction converter selects one of the mapping relationship between the first instruction set and the second instruction set and the mapping relationship between the third instruction set and the second instruction set, and converts the plurality of computer instructions of the thread to the plurality of host instructions belonging to the second instruction set.

Optionally, in the system, every computer instruction of the plurality of computer instructions at least includes an instruction field containing an instruction type. Every host instruction of the plurality of host instructions at least includes an instruction field containing an instruction type. The plurality of computer instructions and the plurality of host instructions are one-to-one correspondence. The mapping relationship includes a mapping relationship between the instruction type of every computer instruction and the instruction type of every host instruction and a mapping relationship between the instruction fields except the instruction type contained in every computer instruction and the instruction fields except the instruction type contained in every host instruction.

Optionally, in the system, every computer instruction of the plurality of computer instructions at least includes an instruction field containing the instruction type. Every host instruction of the plurality of host instructions at least includes an instruction field containing the instruction type. A total number of the plurality of computer instructions is not equal to a total number of the plurality of host instructions. Every computer instruction of the plurality of computer instructions is mapped to one or more host instructions of the plurality of host instructions.

Optionally, in the system, the mapping relationship contains a shift logic. One instruction field of at least one host instruction of the plurality of host instructions is generated by shifting the corresponding instruction field of the corresponding computer instruction.

Optionally, in the system, the instruction fields of the computer instruction at least contain the instruction type. The instruction converter performs an addressing operation on the memory in the instruction converter by at least using the instruction type to read out the corresponding mapping relationship.

A method for executing one or more instruction sets by a processor system is provided. The method comprises storing a plurality of computer instructions belonging to a first instruction set in a first memory; converting the plurality of computer instructions belonging to the first instruction set to a plurality of host instructions belonging to a second instruction set by an instruction converter; storing the plurality of host instructions converted by the instruction converter in a second memory; and fetching the plurality of host instructions directly from the second memory and executing the plurality of host instructions by a processor core coupled to the second memory when there is no need to fetch the plurality of computer instructions and use the instruction converter.

Optionally, in the method, the instruction converter is configured by storing a mapping relationship between the first instruction set and the second instruction set in a memory in the instruction converter. Based on the stored mapping relationship between the first instruction set and the second instruction set, the plurality of computer instructions belonging to the first instruction set are converted to the plurality of host instructions belonging to the second instruction set.

Optionally, in the method, an address converter, coupled to the instruction converter and the processor core, converts a plurality of addresses of target computer instructions in the plurality of computer instructions belonging to the first instruction set to a plurality of host addresses of target instructions in the plurality of host instructions belonging to the second instruction set.

Optionally, in the method, when the address converter converts the address, the method further includes mapping the target computer instruction address to a host instruction block address; mapping the target computer instruction address to a host block offset address of the instruction block corresponding to the address of the instruction block containing the host instruction; and combining the host instruction block address with the host block offset address to form a host instruction address.

Optionally, in the method, based on the block address mapping relationship between the computer instruction block address and the host instruction block address, the host block address is generated.

Optionally, in the method, the address converter stores the block address mapping relationship. Based on a mapping relationship table, a hardware logic generates the host block offset address.

Optionally, in the method, an ending flag memory stores the host instruction address of an ending instruction of the host instruction block. The ending instruction is a last host instruction before a next host instruction block in a sequential address order.

Optionally, in the method, a next block address memory stores the block address of the next host instruction block in the sequential address order. A branch target buffer stores the host instruction address of the branch target.

Optionally, in the method, a plurality of computer instructions belonging to a third instruction set are stored in the first memory. The instruction converter stores a mapping relationship between the third instruction set and a second instruction set in the memory based on configuration. Based on the stored mapping relationship between the third instruction set and the second instruction set, the instruction converter converts the plurality of computer instructions belonging to the third instruction set to the plurality of host instructions belonging to the second instruction set.

Optionally, in the method, a first thread instruction sequence and a second thread instruction sequence are run. The first thread instruction sequence is composed of the plurality of computer instructions in the first instruction set. The second thread instruction sequences is composed of the plurality of computer instructions in the third instruction set. The instruction converter stores the mapping relationship between the first instruction set and the second instruction set and the mapping relationship between the third instruction set and the second instruction set in the memory based on configuration. Based on a thread number of the instruction sequence, the instruction converter selects one of the mapping relationship between the first instruction set and the second instruction set and the mapping relationship between the third instruction set and the second instruction set, and converts the plurality of computer instructions of the thread to the plurality of host instructions belonging to the second instruction set.

Optionally, in the method, every computer instruction of the plurality of computer instructions at least includes an instruction field containing an instruction type. Every host instruction of the plurality of host instructions at least includes an instruction field containing an instruction type. The plurality of computer instructions and the plurality of host instructions are one-to-one correspondence. The mapping relationship includes a mapping relationship between the instruction type of every computer instruction and the instruction type of every host instruction and a mapping relationship between the instruction fields except the instruction type contained in every computer instruction and the instruction fields except the instruction type contained in every host instruction.

Optionally, in the method, every computer instruction of the plurality of computer instructions at least includes an instruction field containing the instruction type. Every host instruction of the plurality of host instructions at least includes an instruction field containing the instruction type. A total number of the plurality of computer instructions is not equal to a total number of the plurality of host instructions. Every computer instruction of the plurality of computer instructions is mapped to one or more host instructions of the plurality of host instructions.

Optionally, in the method, one instruction field of at least one host instruction of the plurality of host instructions is generated by shifting the corresponding instruction field of the corresponding computer instruction.

Optionally, in the method, the instruction field of the computer instruction at least contains one instruction type. The instruction converter performs an addressing operation on the memory in the instruction converter by at least using the instruction type to read out the corresponding mapping relationship.

Other aspects of the present disclosure can be understood by those skilled in the art in light of the description, the claims, and the drawings of the present disclosure.

ADVANTAGEOUS EFFECTS

An instruction set stored in a cache memory system (that is, a higher level cache) closest to the processor core in a processor system described in this disclosure is a host instruction set supported by a processor core, whereas an instruction set stored in a main memory or a lower-level cache is a guest instruction set. Through configuration for a converter, the corresponding guest instruction set can be converted to the host instruction set for the processor core execution. Therefore, it can easily extend the instruction set supported by the processor system.

Based on a program execution flow and instruction execution feedback from the processor core, the higher level cache directly provides the host instructions to the processor core, reducing the depth of a pipeline and improving the efficiency of the pipeline. Especially when the branch prediction is wrong, the waste of the pipeline cycle can be reduced.

For those skilled in the arts, other advantages and applications of the invention are obvious.

BRIEF DESCRIPTION OF THE DRAWINGS

FIG. 4A illustrates a structure schematic diagram of an exemplary extractor consistent with the disclosed embodiments;

FIG. 4B illustrates a schematic diagram of an exemplary operating process of an extractor consistent with the disclosed embodiments;

FIG. 5A illustrates a schematic diagram of an exemplary row of mapping information consistent with the disclosed embodiments;

FIG. 5B illustrates a schematic diagram of another exemplary multiple rows mapping information consistent with the disclosed embodiment;

FIG. 8A illustrates a schematic diagram of an exemplary corresponding relationship between a guest instruction block and a host instruction block consistent with the disclosed embodiments;

FIG. 8B shows a storage form of an exemplary offset address mapping relationship consistent with the disclosed embodiments;

FIG. 8C illustrates a schematic diagram of an exemplary offset address converter consistent with the disclosed embodiments;

FIG. 12 illustrates a schematic diagram of an exemplary processor system including a configurable converter consistent with the disclosed embodiments;

FIG. 13A illustrates a block diagram of an exemplary configurable converter consistent with the disclosed embodiments;

FIG. 13B illustrates a schematic diagram of an exemplary memory in a configurable converter consistent with the disclosed embodiments;

FIG. 13C illustrates a schematic diagram of another exemplary memory in a configurable converter consistent with the disclosed embodiments;

FIG. 14 illustrates a schematic diagram of an exemplary processor system including a configurable converter and an address mapping module consistent with the disclosed embodiments;

FIG. 15 illustrates a schematic diagram of another exemplary processor system including a configurable converter and an address mapping module consistent with the disclosed embodiments;

FIG. 16 illustrates a schematic diagram of an exemplary processor system including a branch target table consistent with the disclosed embodiments;

DETAILED DESCRIPTION

Figure 1:
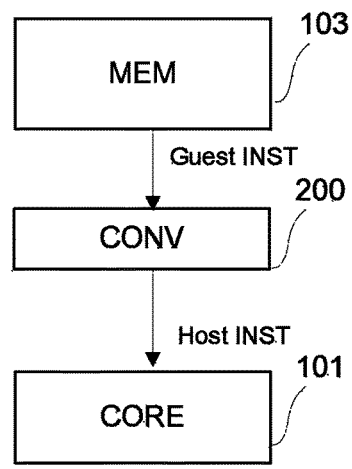
FIG. 1 illustrates a structure schematic diagram of an exemplary processor system consistent with the disclosed embodiments.

Reference will now be made in detail to exemplary embodiments of the invention, which are illustrated in the accompanying drawings in connection with the exemplary embodiments. By referring to the description and claims, features and merits of the present invention will be clearer to understand. It should be noted that all the accompanying drawings use very simplified forms and use non-precise proportion, only for the purpose of conveniently and clearly explain the embodiments of this disclosure.

It is noted that, in order to clearly illustrate the contents of the present disclosure, multiple embodiments are provided to further interpret different implementations of this disclosure, where the multiple embodiments are enumerated rather than using an exhaustion method. In addition, for the sake of simplicity, contents mentioned in the previous embodiments are often omitted in the following embodiments. Therefore, the contents that are not mentioned in the following embodiments can refer to the previous embodiments.

Although this disclosure may be expanded using various forms of modifications and alternations, the specification also lists a number of specific embodiments to explain in detail. It should be understood that the purpose of the inventor is not to limit the disclosure to the specific embodiments described herein. On the contrary, the purpose of the inventor is to protect all the improvements, equivalent conversions and modifications based on spirit or scope defined by the claims in the disclosure. The same reference numbers may be used throughout the drawings to refer to the same or like parts.

Instruction address refers to memory address of the instruction stored in a main memory. That is, the instruction can be found in the main memory based on this address. For simplicity, it is assumed that virtual address equals physical address. For situations that address mapping is required, the described method of the invention could be applied. A current instruction may refer to an instruction being currently executed or fetched by the processor core. A current instruction block may refer to an instruction block containing an instruction being currently executed by the processor core.

For simplicity, the term "guest instruction set" refers to an instruction set corresponding to the program executed by the processor system. Every instruction included in the guest instruction set is a guest instruction. The term "host instruction set" refers to an instruction set supported by the processor core in the processor system. Every instruction included in the host instruction set is a host instruction. The term "instruction block" refers to a set of consecutive instructions with the same high bits (or most significant bits) of the address. The term "instruction field" may be a contiguous field representing the same content in the instruction word, such as a first opcode (Op-code) field, a second opcode (Op-code) field, a first source register field, a second source register field, a target register field, an immediate field, and so on. In addition, the host instruction set is a fixed length instruction set, that is, word length of each target instruction is fixed (for example, 32-bit). The guest instruction set can be a fixed length instruction set and also be a variable length instruction set. If the guest instruction set is a variable length instruction set, and high bit addresses of all bytes of a variable-length guest instruction are not exactly same. That is, the guest instruction spans two instruction blocks. The guest instruction is the last instruction of a previous instruction block, and one instruction after the instruction is the first instruction of a next instruction block.

A branch instruction or a branch point refers to any appropriate instruction type that may make the processor core to change an execution flow (e.g., an instruction is not executed in sequence). A branch instruction address may refer to the address of the branch instruction itself, including an address of an instruction block and an instruction offset address. A branch target instruction may refer to the target instruction being branched to by a branch instruction. A branch target instruction address may refer to the address being branched to if the branch is taken, that is, the instruction address of the branch target instruction.

First, every guest instruction is converted to one or more host instructions; or a plurality of guest instructions are converted to one or more host instructions. Then, the one or more host instructions are executed by the processor core, implementing the same function that the processor core executes directly the guest instruction(s). FIG. 1 illustrates a structure schematic diagram of an exemplary processor system consistent with the disclosed embodiments.

As shown in FIG. 1, memory 103 stores executable codes of a program that needs to be executed, and the executable codes are composed of the guest instructions in the guest instruction set. Each guest instruction is sent to converter 200 and converted to the corresponding single or multiple host instructions, and then the host instructions are sent to the processor core 101 for execution. The converter 200 can be a fixed structure, which only supports that a specific guest instruction set is converted to a host instruction set. The converter 200 can also be configurable. That is, based on configuration, one or more guest instruction set may be converted to a host instruction set. The converter 200 with the fixed structure can be considered as a special case of the configurable converter, so only the configurable converter is described herein.

Figure 2:
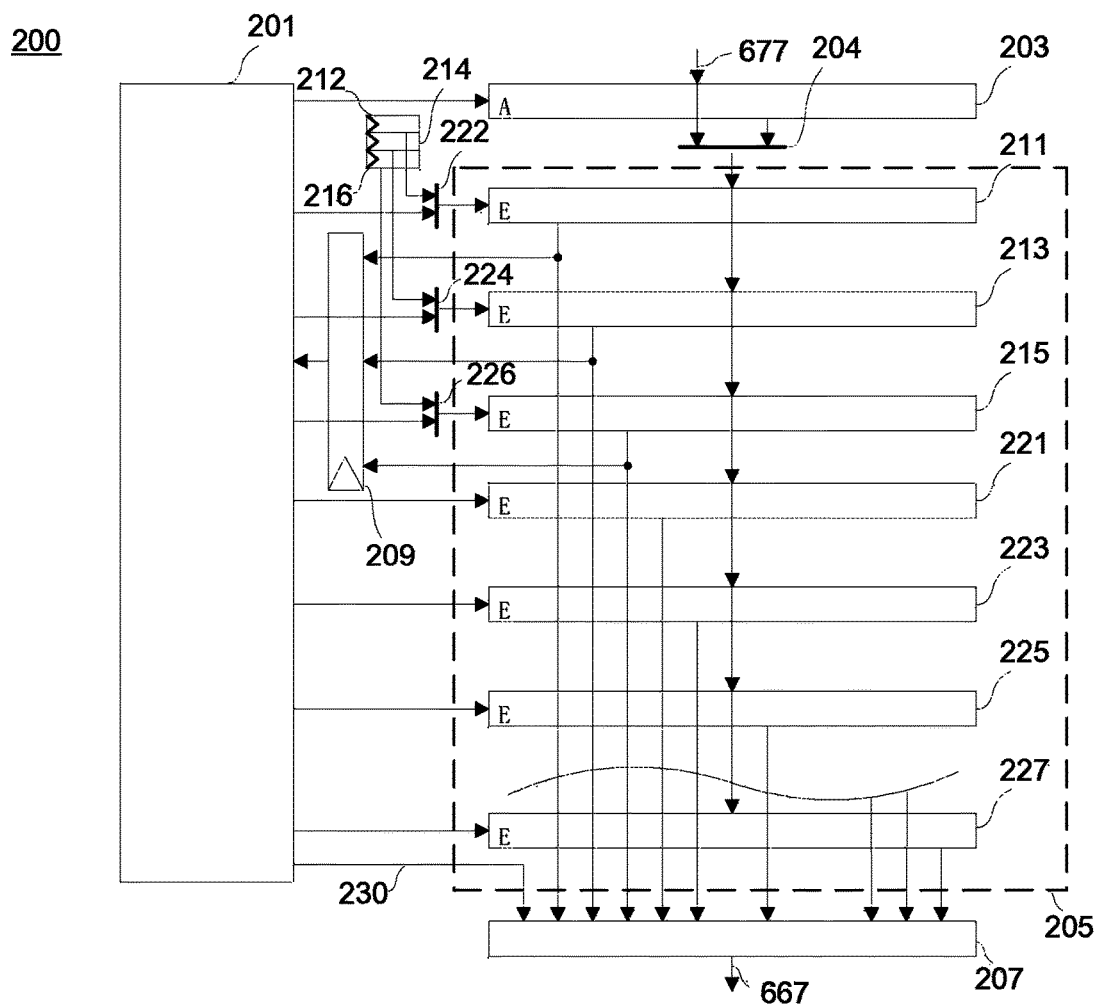
FIG. 2 illustrates a structure schematic diagram of an exemplary converter consistent with the disclosed embodiments.

FIG. 2 illustrates a structure schematic diagram of an exemplary converter consistent with the disclosed embodiments. As shown in FIG. 2, converter 200 may include a memory 201, an aligner 203, an extraction array 205, an instruction splicer 207, and an operation code (or op-code splicer) 209. The aligner 203 is configured to shift and align guest instruction in a guest instruction set. Also, when the guest instruction goes across an instruction block boundary, the aligner 203 shifts the guest instruction to an instruction block and aligns the guest instruction.

Figure 3A:
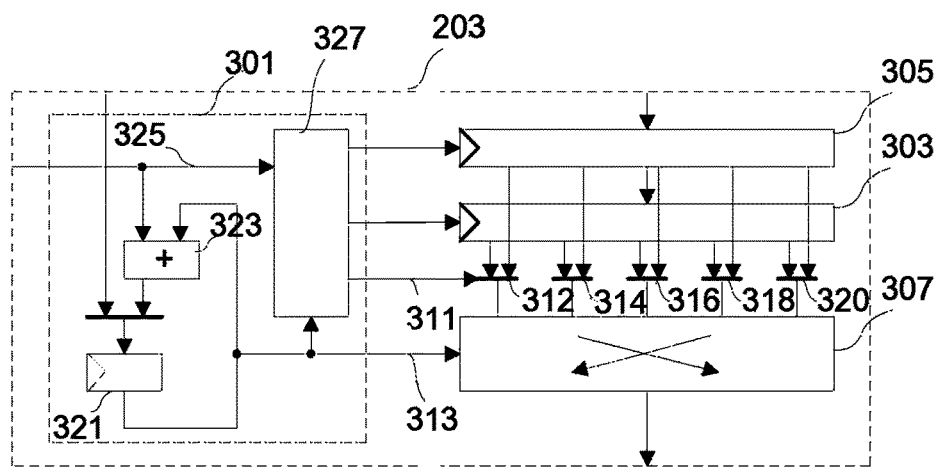
FIG. 3A illustrates a structure schematic diagram of an exemplary aligner consistent with the disclosed embodiments.

FIG. 3A illustrates a structure schematic diagram of an exemplary aligner consistent with the disclosed embodiments. As shown in FIG. 3A, the aligner 203 may include a controller 301, buffers 303 and 305, and a rotator 307. It is assumed that the unit length of a guest instruction is byte, and an instruction block can contain all bytes of the longest guest instruction. In this disclosure, the two buffers store 2 consecutive instruction blocks, respectively. Therefore, a guest instruction being processed may locate entirely in an instruction block of the buffer 303 or may across instruction block boundary (that is, the beginning part of the instruction is at the end of the instruction block of the buffer 303, and the remaining part of the instruction is at the beginning of the instruction block of the buffer 305). Selectors 312, 314, 316, 318 and 320 correspond respectively to one byte from left to right in order. Under the control of decoder 327, selectors select contents of the buffer 303 or the buffer 305 and send the selected contents to input of the rotator 307.

The controller 301 includes a register 321 and an adder 323. The bit width of the controller is m, and $2^m$ equals to byte width of buffer 303 and buffer 305. Register 321 stores a start offset address (SA) of the guest instruction currently being converted. After the start address is encoded by encoder 327, the start address is used as selection signal to control output selectors 312, 314, 316, 318 and 320 of buffer 303 and buffer 305. The selectors select bytes with an offset address greater than or equal to SA from buffer 303 and select bytes with an offset address less than SA from buffer 305 to send the selected bytes to rotator 307. The shift amount is sent to rotator 307 via bus 313.

Thus, in the input of the rotator 307, the part whose offset address is greater than or equal to SA is the beginning part 353 of the guest instruction, and the part whose offset address is less than SA is the ending part 355 of the guest instruction. Also, there may be part of the next sequential guest instruction after the ending part 355. Therefore, based on the received shift amount, the rotator 307 performs a left rotate. That is, the beginning part 353 of the guest instruction is shifted to the beginning of the instruction block, and the ending part 355 of the guest instruction is placed at the right of the beginning part in the same instruction block. Then, the instruction block is outputted from the rotator 307.

After the guest instruction of the instruction block is detected, the length of the guest instruction is sent out via bus 325 by memory 201. The length of the guest instruction is sent to adder 323 of controller 301 via bus 325 and is added to shift amount on bus 313. The result is a start address of the next guest instruction and the result is stored in register 321. In addition, if carry output of the adder 323 is '0', it indicates that the starting position of the next guest instruction is in buffer 303 and is aligned using the above method. If the carry output of the adder 323 is '1', it indicates that the starting position of the next guest instruction is in buffer 305. At this time, under the control of the carry output, the contents in buffer 305 are filled into buffer 303, and a new subsequent instruction block is filled into buffer 305. Therefore, the starting position of the next guest instruction is in buffer 303 and is aligned using the above method.

Figure 3B:
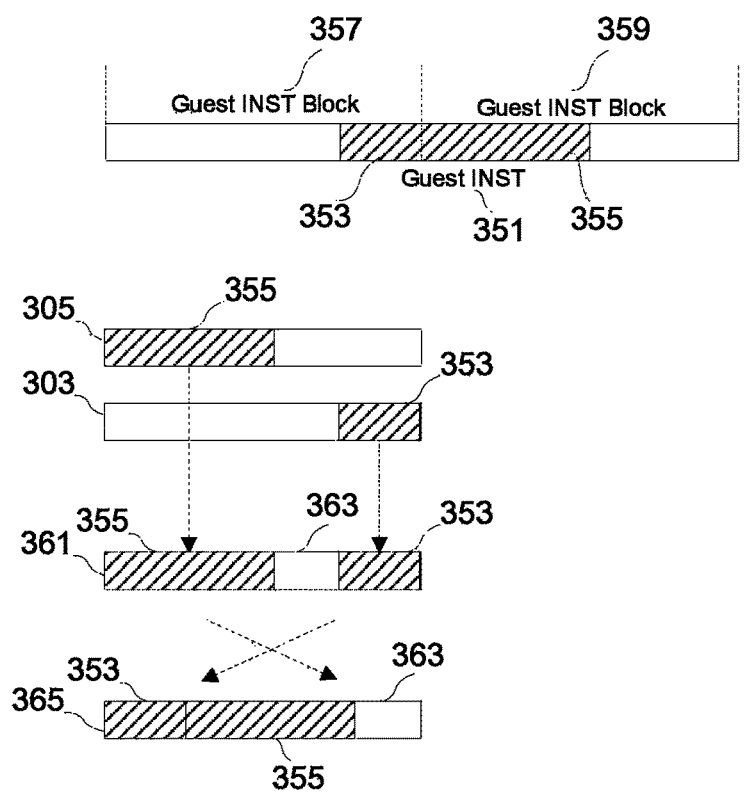
FIG. 3B illustrates a schematic diagram of an exemplary operating process of an aligner consistent with the disclosed embodiments.

FIG. 3B illustrates a schematic diagram of an exemplary operating process of an aligner consistent with the disclosed embodiments. The guest instruction 351 strides across the boundary of the instruction block, where the beginning part 353 is in the instruction block 357 and the ending part 355 is in the instruction block 359. The instruction block 357 and the instruction block 359 are stored in buffer 303 and buffer 305, respectively. After the instruction block 357 and the instruction block 359 are selected and spliced by the selector, the instruction block 361 is formed as input of rotator 307. Thus, the instruction block 361 is formed by three parts (from left to right): the ending part 355 of the guest instruction 351, a part 363 of a subsequent instruction of the guest instruction 351, and the beginning part 353 of the guest instruction 351.

Shifter 307 performs a left shifting operation in a circular manner by using the offset address of the beginning part 353 of the guest instruction as the shift amount, such that the beginning address of the guest instruction 351 is aligned with the beginning of the instruction block. In this disclosure, the instruction block 365 obtained by circular shifting includes the guest instruction 351 and a part 363 of a sequential next instruction of the guest instruction 351. The part 363 may be ignored because the part 363 has no effect on the subsequent operation.

Returning to FIG. 2, the guest instructions which are aligned by the aligner 203 are sent to extraction array 205. Based on instruction types, each instruction field is extracted. The extraction array 205 is composed of several extractors with the same structure. The number of extractors is greater than or equal to a maximum number of instruction fields included in any instruction of the guest instruction set. In all the guest instruction sets supported by the processor system, if the instruction contains at most n number of instruction fields, the extraction array 205 is composed of the n number of extractors. Each extractor receives the same guest instruction input, and outputs information needed to be extracted based on a control signal sent by memory 201.

FIG. 4A illustrates a structure schematic diagram of an exemplary extractor consistent with the disclosed embodiments. As shown in FIG. 4A, the extractor is composed of a rotator 401 and a masking device 403. Based on the received shift amount, rotator 401 shifts the inputted guest instruction word, such that the specific instruction field in the instruction is shifted to the corresponding position. The masking device 403 performs a Bit AND operation for the shifted instruction and mask word, such that the remaining part of the output other than the specific instruction field of the extractor are all '0'. Therefore, the instruction field of the guest instruction can be shifted to the position of the instruction field of the host instruction.

FIG. 4B illustrates an exemplary operating process of an extractor consistent with the disclosed embodiments. A shifting and mask operation for the instruction field 453 in the guest instruction 451 is shown in FIG. 4B. The shift amount of the rotator 401 is equal to the offset address difference of the instruction field in the guest instruction and in the host instruction. For example, when the instruction field 453 locates at the 10th bit, 11th bit and 12th bit of the guest instruction 451 and the instruction field 453 locates at the 6th bit, 7th bit and 8th bit of the corresponding host instruction, the corresponding shift amount is left shift 4 bits (that is, 10 minus 6 is equal 4). Therefore, after the guest instruction 451 is shifted by the rotator 401, the shifted instruction 455 as shown in FIG. 4B is obtained.

Because the instruction field is located at the 6th bit, 7th bit and 8th bit of the host instruction, the 6th bit, 7th bit and 8th bit of the mask word 457 are all '1', and other bits of the mask word 457 are all '0'. Therefore, the shifted instruction 455 and mask word 457 are performed a Bit AND operation in the mask device 403 and the result is used as the output of the extractor, that is, the extractor outputs 459 in FIG. 4B.

Returning to FIG. 2, some extractors in extraction array 205 are used to extract operation code fields of the guest instruction, and other extractors in extraction array 205 are used to extract other instruction fields of the guest instruction. For example, if the number of operation code fields in the instruction of the guest instruction set is at most 3, extractors 211, 213 and 215 in the extraction array 205 are used to extract the operation code fields (called as operation code extractors), and the remaining extractors (e.g., extractors 221, 223, 225 and 227) in extraction array 205 are used to extract other instruction fields (called as other field extractors). The operation codes extracted by extractors 211, 213 and 215 are shifted respectively to different positions and are not overlapped. The extracted operation codes are sent to operation code splicer 209 to perform a Bit OR operation, thus obtaining a complete operation code. The complete operation code is sent to memory 201 as an addressing address.

When an extractor is used to extract the operation code field, the control signals (e.g., shift amount, mask word, and so on) of the extractor are all from the corresponding registers. For example, as shown in FIG. 2, the control signal from register 212 is selected by selector 222, to control extractor 211; the control signal in register 214 is selected by selector 224 to control extractor 213; and the control signal in register 216 is selected by selector 226 to control extractor 215.

When an extractor is used to extract other instruction fields, the control signals of the extractor are all from memory 201. The memory 201 is composed of several rows of mapping information, and is divided into a direct access area and an indirect access area. Each row of mapping information corresponds to an addressing address. Because every addressing address corresponds to a complete operation code of the host instruction, one or more rows of mapping information correspond to one or more guest instructions in the guest instruction set, and the mapping information stores corresponding extracting information. The extracting information includes an operation code of the host instruction corresponding to the guest instruction, a starting position and width of every instruction field (except operation code field) of the guest instruction, and a position relationship between the instruction field of the guest instruction and the corresponding instruction field of the host instruction.

In this disclosure, the addressing operation can be directly performed for direct access area of memory 201 based on the operation code of the guest instruction to find the corresponding row of mapping information. Specifically, the complete operation code outputted by the operation code splicer 209 can be used as the addressing address of the direct access area to read out the corresponding row of mapping information. The indirect access area of memory 201 must be accessed based on index values of other rows of mapping information (that is, the row address information). For example, when a guest instruction corresponds to multiple host instructions, the complete operation code of the guest instruction can be used as an addressing address to read out mapping information corresponding to the first host instruction among multiple host instructions from the direct access area, such that the first host instruction can be converted. This mapping information includes an index value of the mapping information corresponding to the second host instruction in the indirect access area. Therefore, based on the index value, the mapping information corresponding to the second host instruction can be found in the indirect access area, and the second host instruction can be converted. In this way, all the multiple host instructions can be converted.

FIG. 5A illustrates a schematic diagram of an exemplary row of mapping information consistent with the disclosed embodiments. A row of mapping information shown in FIG. 5A corresponds to a guest instruction. That is, one guest instruction corresponds to one host instruction. The mapping information 501 is composed of an operation code (OP) 503 of the host instruction, length 505 of the guest instruction, configuration information of several extractors (e.g., configuration information 507, 509, 511, and 513 of extractors) and an ending flag 515. The operation code 503 of the host instruction is the operation code of the host instruction corresponding to the guest instruction. The length 505 of the guest instruction is the length of the instruction word of the guest instruction which is sent to aligner 203 as a length value of the guest instruction 325. The length value of the guest instruction 325 is added to the starting point of the current instruction and the result is used to calculate the starting point of the next instruction. The ending flag 515 stores all '0' which indicate that this row is mapping information of the last row of host instruction corresponding to the guest instruction.

The number of extractor configuration information of the in the mapping information 501 is the same as the number of extractors, and the configuration information and the extractors have one-to-one correspondence. The configuration information is composed of 3 parts: shift amount (R), a starting position of '1' in mask value (B), and the number of '1' in mask value (W). The shift amount R is sent to the corresponding extractor and is used to control shifting of the rotator 401. The starting position B and the number W are used to determine the position of '1' in the mask value. That is, the values of continuous W number of mask bits (starting from position B) are '1', and the values of other mask bits are '0'.

FIG. 5B illustrates a schematic diagram of another exemplary multiple rows of mapping information consistent with the disclosed embodiment. As shown in FIG. 5B, the multiple rows of mapping information correspond to a guest instruction. That is, the guest instruction corresponds to multiple host instructions. As used here, a guest instruction corresponds to 3 host instructions, and the mapping information corresponding to information of the three host instructions are mapping information 551, mapping information 561 and mapping information 571. The mapping information 551 locates in the direct access area of memory 201, where the address area can be directly addressed by decoding the operation code extracted from the guest instruction. The mapping information 561 and the mapping information 571 locate at the indirect access area, and must be addressed based on the index value stored in the mapping information (e.g., mapping information 551) in the direct access area.

Similar to the mapping information 501 shown in FIG. 5A, the mapping information 551 is also composed of an operation code 503 of the host instruction, length 505 of the guest instruction, configuration information of several extractors (e.g., configuration information 507, 509, 511, and 513 of extractors) and ending flag 515. The mapping information 561 and the mapping information 571 also include an operation code 503 of the host instruction, configuration information of several extractors (e.g., configuration information 507, 509, 511, and 513 of extractors) and ending flag 515, but the mapping information 561 and the mapping information 571 may not include the length 505 of the guest instruction. The operation codes 503 of the three rows of mapping information correspond to operations codes of the three host instruction corresponding to the guest instruction, respectively.

The length 505 of the guest instruction in the mapping information 551 is the length of the instruction word of the guest instruction. The length 505 of the guest instruction is sent to aligner 203 as a length value of the guest instruction 325. The length value of the guest instruction 325 is used to calculate the starting point of the next guest instruction. The ending flag 515 of the mapping information 551 and the mapping information 561 do not signify the end of the mapping information but signify the continuous mapping information in other rows. Other situations can also be obtained following the above description. The length 505 of the instruction word of the mapping information 551 and mapping information 561 stores an index that points to the subsequent mapping information, respectively. That is, the length 505 of the instruction word of the mapping information 551 stores an index value of mapping information 561 in memory 201, and the length 505 of the instruction word of the mapping information 561 stores an index value of mapping information 571 in memory 201.

Mapping information 571 is used as instruction information of the last host instruction of multiple host instructions corresponding to one guest instruction. The ending flag 515 in mapping information 571 may store all '0'. Thus, based on the entire opcode extracted from the operation code (or opcode) extractor, mapping information of the first row may be found. Then, under the control ending flag 515 in mapping information of every row, memory 201 may correctly output mapping information of one or more host instructions corresponding one guest instruction, correctly converting the guest instruction set.

Returning to FIG. 2, for any guest instruction outputted by aligner 203, the complete operation code extracted by the operation code extractor can be used as an addressing address to read out an operation code of the corresponding host instruction 503 from memory 201, and read out extraction information of each instruction field of the corresponding guest instruction. The operation code of the host instruction is sent to instruction splicer 207 via bus 230. The extraction information of each instruction field of the corresponding guest instruction is sent to other field extractors, respectively. Based on the field starting position, field width and shift amount included in the extraction information, other field extractor shifts the corresponding field of the guest instruction to the specific position and performs a mask operation, such that the extractor outputs, with the exception the shifted instruction field, are all '0'.

Therefore, after all guest instruction fields, with the exception of the operation code field, are shifted to the instruction fields needed by the host instruction by the field extractors, the instruction fields are outputted to instruction splicer 207 to perform a Bit OR operation and are spliced with the operation code of the host instruction outputted by memory 201, forming the host instruction that meets formats of the host instruction set. The host instruction is sent to processor core for execution, such that the corresponding function of the guest instruction is implemented.

Figure 5C:
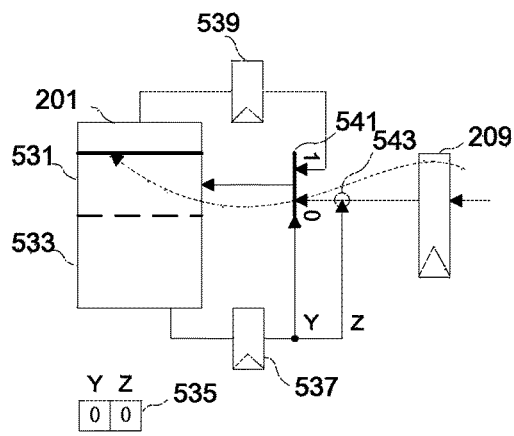
FIG. 5C illustrates a schematic diagram of an exemplary operating process of a mapping information memory consistent with the disclosed embodiments.
Figure 5D:
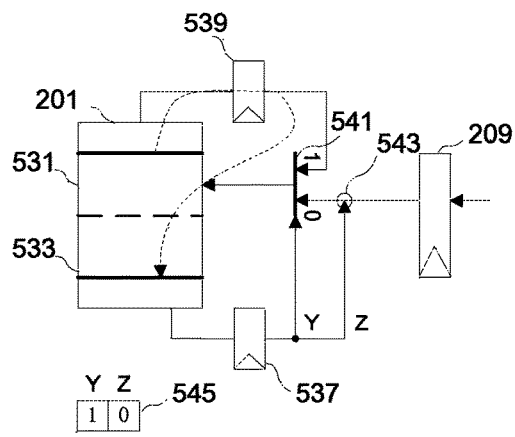
FIG. 5D illustrates a schematic diagram of another exemplary operating process of a mapping information memory consistent with the disclosed embodiments.
Figure 5E:
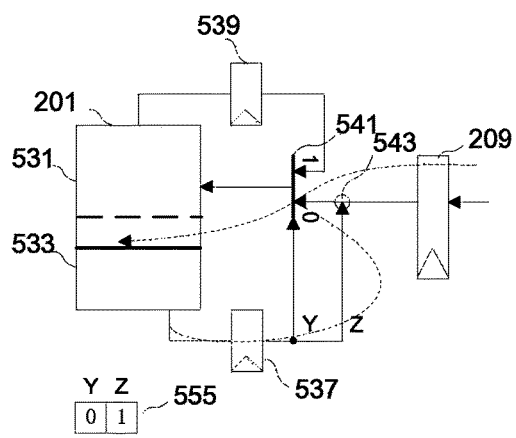
FIG. 5E illustrates a schematic diagram of another exemplary operating process of a mapping information memory consistent with the disclosed embodiments.

FIGS. 5C, 5D and 5E illustrate schematic diagrams of exemplary operating processes of mapping information memory consistent with the disclosed embodiments. As shown in FIGS. 5C, 5D and 5E, memory 201 includes a direct access area 531 and an indirect access area 533. The address of the indirect access area is higher than the address of the direct access area. For example, the address formed by the operation code of the guest instruction is n bits, and the address of memory 201 is n+1 bits. When the most significant bit of the address is '0', the direct access area 531 is accessed; when the most significant bit of the address is '1', the indirect access area 533 is accessed.

Each row of mapping information in memory 201 includes an ending flag with two bits (e.g., the ending flag is formed by a Y bit and a Z bit). The ending flag is used to indicate a conversion relationship between the guest instruction and the host instruction corresponding to this row of mapping information. That is, the relationship may be one of the followings: one guest instruction corresponds to one host instruction, or one guest instruction corresponds to multiple host instructions, or multiple guest instructions correspond to one host instruction; and the controls the converter processessing the next instruction based on one of the relationships.

Specifically, the value '00' of the ending flag 535 shown in FIG. 5C indicates that the row of mapping information corresponds to the current guest instruction. That is, one guest instruction corresponds to one host instruction. The value '10' of the ending flag 545 shown in FIG. 5D indicates that the row of mapping information corresponds to the current guest instruction and the next guest instruction. That is, multiple guest instructions correspond to one host instruction. The value '01' of the ending flag 555 shown in FIG. 5E indicates that the row of mapping information and mapping information pointed to by the index value in the row of mapping information together correspond to the current guest instruction. That is, one guest instruction corresponds to multiple host instructions.

The Y bit in the ending flag is used to indicate whether to convert the next guest instruction. Specifically, if the Y bit is '0', it indicates that the conversion of the current guest instruction (or several continuous guest instructions including the current guest instruction) is complete, and the conversion of the next guest instruction is performed in the next cycle. If the Y bit is '1', it indicates that the conversion of the current guest instruction is not complete, and the corresponding conversion is continuously performed in the next cycle (the conversion of the next guest instruction cannot be started).

The said ending flag is stored in register 537, and the index value in the row of mapping information is stored in register 539 for the next instruction conversion. The ending flag of the previous guest instruction stored in register 537 can be used to control selector 541 (selector 541 is controlled by Y bit in the ending flag) and address splicing logic 543 (address splicing logic 543 is controlled by Z bit in the ending flag) when the current guest instruction is processed.

The Y output of the register controls a two-way selector. When Y is '0', the selector selects the operation code of the guest instruction as an address of memory 201; when Y is '1', the selector selects index value of a previous instruction in memory 201 stored in register 539 as an current address of memory 201 during instruction conversion. A Z value is spliced with an address formed by the operation code of the guest instruction as a most significant bit of an address. When Z is '0', the address on memory 201 points to the direct access area; when Z is '1', the address on memory 201 points to the indirect access area. The circles shown in the FIGS. 5C-5E indicate bus splicing.

As shown in FIG. 5C, the ending flag YZ corresponding to the previous guest instruction is '00', and the host instruction can be generated based on the corresponding mapping information using the previous described method. Therefore, the current guest instruction corresponds to at least one new host instruction. At this time, one input of address splicing logic 543 is from a complete operation code of the current guest instruction of the operation code splicer 209, and the other input of address splicing logic 543 is Z bit ('0') of the ending flag in register 537. That is, all '0' are spliced before the complete operation code, such that the output of the address splicing logic 543 is still the complete operation code of the current guest instruction, corresponding to the address of the direct access area 531. The selector 541, under the control of the Y bit ('0') in the ending flag, selects the output of OR logic as an addressing address of memory 201. Therefore, the mapping information corresponding to the current guest instruction is read out from the direct access area 531 of memory 201, and the corresponding instruction field is shifted and masked according to previously described method and sent to the instruction splicer 207. Also, because the Y bit in the ending flag is '0', the conversion of the next guest instruction can be started in the next cycle.

Figure 5F:
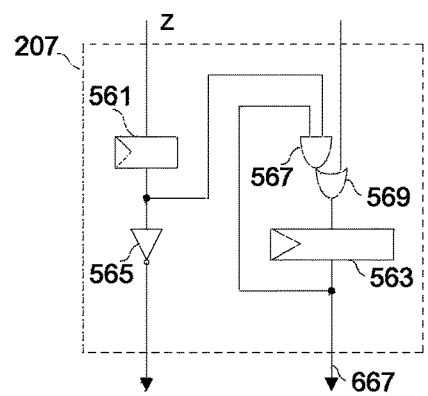
FIG. 5F illustrates a schematic diagram of an exemplary instruction splicer consistent with the disclosed embodiments.

FIG. 5F illustrates a schematic diagram of an exemplary instruction splicer consistent with the disclosed embodiments. Content stored in register 563 is the host instruction that has been converted or an intermediate conversion result obtained when conversion is not complete. The Z bit in the ending flag is stored in register 561 and is sent to AND logic 567 in the next cycle. After the Z bit is inverted by an inverter, Z bit is outputted as a signal indicating whether the host instruction in register 563 is converted completely. The other input of AND logic 567 is from a value stored in register 563. The output of AND logic 567 is sent to OR logic 569. The other input of OR logic 569 is a result obtained from shifting and masking sent by each extractor. The output of register 563 is the output 667 of the instruction splicer 207.

For the situation shown in FIG. 5F, because the Z bit of the ending flag is '0', if the output of AND logic 567 is '0' in the next cycle, the output of OR logic 569 is the result obtained from shifting and masking of each extractor. The results are spliced to a complete host instruction in register 563. At this time, the output of inverter 565 is '1' (that is, the inverted value of the Z bit), indicating that the conversion is complete, and the content stored in register 563 is the host instruction obtained by conversion. Therefore, the process for converting a guest instruction to a host instruction is complete. The converted host instruction is outputted in the next cycle, and the converter starts to read the next guest instruction for conversion.

As shown in FIG. 5D, the ending flag corresponding to the previous guest instruction is '10', indicating that the guest instruction corresponds to multiple host instructions, and the host instructions corresponding to the previous mapping information are not adequate to complete the conversion. Therefore, before completing the conversion of the previous guest instruction, the current guest instruction cannot be converted. At this time, the content stored in register 539 is an index value included in the previous mapping information, that is, the addressing address of the next mapping information of the previous mapping information (these two mapping information correspond to the previous guest instruction) in the indirect access area 533. The selector 541, under the control of Y bit ('1') in the ending flag, selects the index value outputted by register 539. Because address space of memory 201 corresponding to the index value is in the indirect access area 533, the mapping information corresponding to the previous guest instruction can be read out from the indirect access area 533, and the corresponding instruction field can be shifted and masked according to previously described method and sent to instruction splicer 207. Because the Y bit in the ending flag is '1', the conversion of the current instruction continues in the next cycle, and the conversion of the next guest instruction cannot be started.

At this time, in instruction splicer 207, the Z bit of the flag is '0'. Therefore, in the next cycle, the output of AND logic 567 is '0', and the output of OR logic 569 is the result obtained from shifting and masking of each extractor. The results are spliced to a complete host instruction in register 563. The output of the inverter 565 is '1' (that is, the inverted value of the Z bit), indicating that the conversion is complete, and the content stored in register 563 is the host instruction obtained by conversion. Therefore, in the process for converting a guest instruction to multiple host instructions, one host instruction among multiple host instructions is generated and the generated host instruction is outputted in the next cycle. In the next cycle, the above process is repeated until the Y bit of the flag in the corresponding mapping information is '0'. It indicates that the host instruction corresponding to the mapping information is the last host instruction among the multiple host instructions. The host instruction is outputted in the next cycle, and the process for converting one guest instruction to multiple host instruction is complete. At the same time, the converter starts to read the next guest instruction for conversion.

As shown in FIG. 5E, the ending flag corresponding to the previous guest instruction is '01', indicating that the guest instruction and the next guest instruction (that is, the current guest instruction) correspond to a same host instruction. Therefore, the current guest instruction is continuously converted until the host instruction corresponding to multiple guest instructions is generated. At this time, one input of address splicing logic 543 is the complete operation code of the current guest instruction from operation code splicer 209, and the other input of the address splicing logic 543 is Z bit ('1') of the flag in register 537. That is, an additional address bit is spliced before the complete operation code, such that the output of the address splicing logic 543 is an address corresponding to the indirect access area. The selector 541, under the control of Y bit ('0') in the ending flag, selects the output of OR logic as an addressing address of memory 201. Therefore, the corresponding mapping information (that is, the mapping information corresponding to both of the previous guest instruction and the current guest instruction) can be read out from the indirect access area 533 in memory 201. Then, the corresponding instruction field is shifted and masked according to the previous method and is sent to instruction splicer 207.

At this time, in instruction splicer 207, the Z bit of the ending flag is '1'. Therefore, in the next cycle, the output of AND logic 567 is the value stored in register 563 (that is, the intermediate result of the conversion), the output of the OR logic 569 is combination (e.g., Bit OR operation) of the result obtained from shifting and masking operation of extractors and the intermediate result. These results forms a new intermediate result in register 563. The output of inverter 565 is '0' (that is, the inverted value of the Z bit), indicating that the conversion is not complete. Because the Y bit in the flag is '0', the converter starts to convert the next guest instruction. The above process is repeated, and the shifting and masking results of instruction fields corresponding to multiple continuous guest instructions are combined together via OR logic 569, such that the multiple guest instructions are converted to one host instruction, until the Z bit is '0' (indicating that the current guest instruction is the last guest instruction of the multiple guest instructions corresponding to the host instruction). At this time, the output of the inverter 565 is '1' (that is, the inverted value of the Z bit), indicating that the conversion is complete and the content stored in register 563 is the host instruction obtained by conversion. Thus, the conversion from multiple guest instructions to one host instruction is complete.

It should be noted that memory 201 can be a rewritable Random-Access Memory (RAM). Based on different guest instruction sets to be supported, different mapping information is written in RAM. Memory 201 can also be a Read Only Memory (ROM). That is, memory 201 supports one or more guest instruction sets. In addition, memory 201 can also a logic circuit that can achieve the same function. That is, memory 201 supports one or more guest instruction sets. Further, a part of a buffer is assigned as memory 201 and is not used as the buffer.

In addition, if the guest instruction is a fixed length instruction, and the length of the extractor is equal to the length of the instruction word, then the aligner 203 may be omitted in converter 200. The converter 200 may support different guest instruction sets based on different configuration. When the instruction length of one guest instruction set is equal to the length of the extractor, the selector 204 may directly select the corresponding guest instruction to send to every extractor; otherwise, the selector 204 selects the output of aligner 203 to send the selected output to every extractor. Other operations are the same as the description in the previous embodiments and are not repeated herein.

Figure 6:
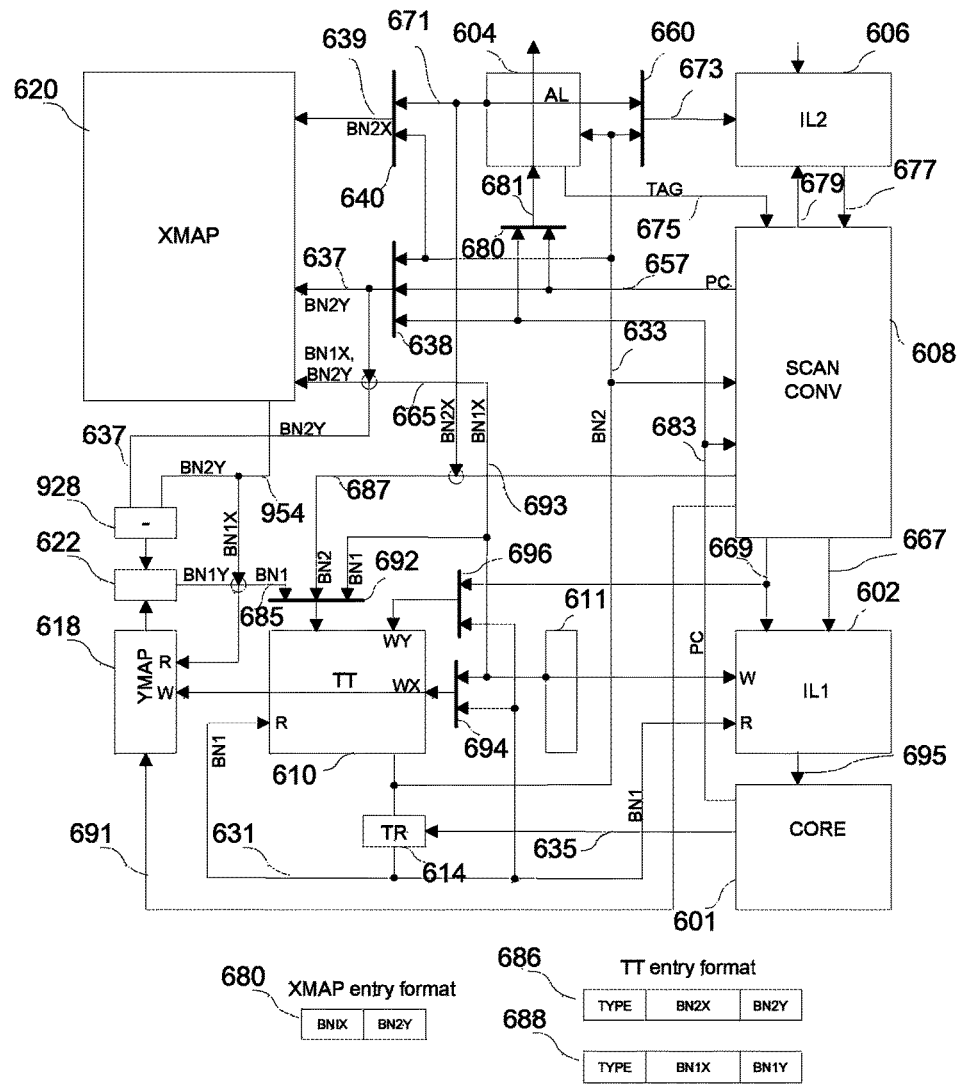
FIG. 6 illustrates a processor system containing multi-level caches consistent with the disclosed embodiments.

The different level caches of a processor system can store instructions of different instruction set, thereby improving performance of the processor system. For example, guest instructions can be stored in a level two (L2) cache of the processor system; host instructions can be stored in a level one (L1) cache of the processor system; and instruction set conversion is performed when the guest instruction is filled into the L1 cache. FIG. 6 illustrates a processor system containing multi-level caches consistent with the disclosed embodiments.

As shown in FIG. 6, the processor system may include a processor core 601, an active list 604, a scan converter 608, a track table 610, a replacement module 611, a tracker 614, a block address mapping module (XMAP) 620, an offset address mapping module (YMAP) 618, an offset address converter 622, a subtractor 928, a level one (L1) cache 602, a level two (L2) cache 606 and selectors 640, 660, 680, 638, 692, 694 and 696. The hollow circles shown in FIG. 6 indicate the splicing of buses. The processor system may also include a controller (not shown in FIG. 6). The controller is configured to receive operations outputted from block address mapping module 620, active list 604, track table 610 and replacement module 611, and control the operations of the function modules.

In this disclosure, L2 cache 606 stores guest instructions, whereas L1 cache 602 stores corresponding host instructions. A first address and a second address can be used to indicate position information of the instruction in L1 cache or L2 cache. As used herein, the first address and the second address may be an addressing address of the L1 cache, or an addressing address of the L2 cache.

When a host instruction is stored in L1 cache 602, BN1X can be used to indicate a level one block number of an instruction block containing the host instruction (that is, pointing to a corresponding L1 instruction block in L1 cache), and BN1Y can be used to indicate a level one block offset of the host instruction (that is, a relative position of the host instruction in the L1 instruction block). When a guest instruction is stored in L2 cache 606, BN2X can be used to indicate a block number of a level two (L2) instruction block containing the guest instruction (that is, the BN2X points to a corresponding L2 instruction block in the L2 cache), and BN2Y can be used to indicate a L2 block offset of the guest instruction (that is, a relative position of the guest instruction in L2 instruction block). For illustration purposes, BN1 can be used to represent BN1X and BN1Y, and BN2 can be used to represent BN2X and BN2Y. Because the guest instructions corresponding to the host instructions in L1 cache are all stored in L2 cache, host instruction stored in L1 cache may be represented by BN1 or BN2.

Entries in active list 604 and memory blocks in L2 cache 606 have one-to-one correspondence. Every entry in active list 604 stores a matching pair of a L2 instruction block address and a L2 block number BN2X, indicating which memory block of L2 cache 606 stores the L2 instruction block corresponding to the instruction block address. A matching operation can be performed on active list 604 based on the L2 instruction block address, and a BN2X can be obtained when the matching operation is successful. Also, an addressing operation can be performed on active list 604 based on a BN2X, such that the corresponding L2 instruction block address can be read out.

When the guest instruction is filled from L2 cache 606 into L1 cache 602, the scan converter 608 calculates a branch target address of a guest branch instruction, and the guest instruction is converted to the host instruction by instruction converter 200 in scan converter 608. The obtained branch target address is sent to active list 604 to match with the instruction block address stored in active list 604, determining whether the branch target is stored in L2 cache 606. If the matching operation is unsuccessful, it indicates that the instruction block containing the branch target instruction is not yet filled into L2 cache 606. So when this instruction block is filled from a lower level cache into L2 cache 606, a matching pair of the corresponding L2 instruction block address and L2 block number is created in active list 604.

Scan converter 608 converts and examines the instruction block (guest instruction) that is filled from L2 cache 606 into L1 cache 602, and extracts track point information corresponding to the host instruction to fill the extracted track point information into a corresponding entry of track table 610, such that at the least a track of one L1 instruction block corresponding to the L2 instruction block is created. Specifically, when creating the track, replacement module 611 generates a BN1X pointing to an available track. The replacement module 611 may determine the available track based on a replacement algorithm (such as LRU algorithm, LFU algorithm, and so on).

Specifically, scan converter 608 examines every guest instruction that is filled from L2 cache 606 into L1 cache 602, extracts certain information, such as instruction type, instruction source address and branch offset of the branch instruction, and calculates a branch target address based on the extracted information. For a direct branch instruction, the branch target address can be obtained by adding together a block address of the instruction block containing the branch instruction, an offset of the branch instruction in the instruction block and a branch offset. The instruction block address can be read out from active list 604 and directly sent to an adder in scan converter 608. A register that is used to store the current instruction block address may be added in scan converter 608. Therefore, active list 604 does not need to send out the instruction block address in real time. In this disclosure, the branch target address of the direct branch instruction is generated by scan converter 608, whereas the branch target address of the indirect branch instruction is generated by processor core 601. Both addresses correspond to the guest instruction address. In addition, scan converter 608 can convert every guest instruction to one or more corresponding host instructions, and the branch offset of the branch instruction is not changed during conversion. That is, the branch offset of the guest branch instruction is equal to the branch offset of the corresponding host branch instruction, ensuring that the branch target address of the indirect branch instruction generated by processor core 601 is correct.

Every row corresponding to every L2 cache block in block address mapping module 620 has a plurality of entries.

Every entry stores the block number (BN1X) of the L1 cache block corresponding to a part of L2 cache block (a sub-block of the L2 cache block) and a starting offset (BN2Y) of the L2 cache sub-block in the L2 cache block. Each entry is arranged in an ascending order of the BN2Y it contains from left to right. When one new entry is added into one row of the block address mapping module 620, BN2Y of the new entry is compared to BN2Y of other entries in this row by comparator 924. The entries whose BY2N is greater than BN2Y of the new entry are shifted to the right by shifter 926, such that the position is vacated to store the new entry.

The rows in the block address mapping module 620, the rows in active list 604 and the memory blocks in L2 cache 606 have one-to-one correspondence and are pointed to by the same BN2X. The block address mapping module 620 is configured to store a corresponding relationship of the corresponding BN2X and BN1X. As shown in FIG. 6, XMAP entry format 684 includes the BN1X and the BN2Y. Therefore, for a BN2, one row of the block address mapping module 620 can be found based on the BN2X in the BN2. Then, the BN2Y in the BN2 is compared to a valid BN2Y stored in every entry of the row. A corresponding BN1X in the entry having successful comparison can be read out. Therefore, the BN2X is converted to a corresponding BN1X or a comparison unsuccessful result is obtained, which indicates the host instruction corresponds to the guest instruction at the BN2Y is not yet in level 1 memory 602.

The format of track table 610 is format 686 or format 688. Format 686 is composed of 3 parts: TYPE, BN2X and BN2Y. TYPE includes instruction type, including non-branch instruction, unconditional direct branch instruction, conditional direct branch instruction, unconditional indirect branch instruction, and conditional indirect branch instruction. As used herein, the unconditional direct branch instruction, the conditional direct branch instruction, the unconditional indirect branch instruction, and the conditional indirect branch instruction are collectively known as a branch instruction, and the track point corresponding to the branch instruction is a branch point. TYPE may also include address type, which is L2 cache address type BN2 in 686. Format 688 is also composed of 3 parts: TYPE, BN1X and BN1Y. The instruction type in format 688 is the same as the instruction type in format 686. However, the address type in format 688 is a L1 cache address BN1. The format of memory 920 in block address mapping module 620 is shown as 684 which is a combination of BN1X and BN2Y.

The track table 610 includes a plurality of track points. A track point is a single entry in the track table 610 containing information about at least one instruction, such as information about instruction type, and the branch target address, etc. As used herein, a track point address corresponds to an instruction address of the instruction represented by the track point. The track point of a branch instruction includes the track point address of the branch target, and the track point address corresponds to the branch target instruction address. A plurality of continuous track points corresponding to an instruction block containing a series of contiguous instructions in the L1 cache 602 is called a track. The L1 instruction block and the corresponding track are indicated by the same BN1X. The track table includes at least one track. The total track points in a track may equal to the total number of entries in one row of track table 610. Other configurations may also be used in track table 610.

Thus, a track table is a table, in which a track entry address corresponds to a branch source instruction address and the entry content corresponds to the branch target address. In addition, an extra L2 block number entry may be added to each row in the track table 610, which is used to record BN2 of the guest instruction corresponding to the first track point in the row. Therefore, when certain L1 instruction block is replaced, BN1 in other row of the track table using the row as the branch target can be converted to BN2. Therefore, the row can be written by rows corresponding to other instruction blocks without causing any error.

Track table 610 records possible traces along which a program runs or possible directions of a program execution flow. Therefore, based on the program flow in the track table 610 and the feedback of processor core 601, tracker 614 can perform a tracking operation along the program flow. Because L1 cache 602 stores host instructions corresponding to entries of track table, tracker 614 tracks the control flow in track table and addressing L1 cache 602 via bus 631, 602 in term sends instructions via bus 695 for processor core 601 to execute. Some branch targets in track table 610 are recorded in L2 cache address BN2. Thus, only the needed guest instructions are converted to the host instructions and the host instructions are stored in L1 cache, so the L1 cache may be of smaller capacity and faster speed than L2 cache. When a branch in the entry read out by the tracker 614 are recorded using L2 cache address BN2, the BN2 is sent to block address mapping module 620 to perform a matching operation, or to scan converter 608 to obtain the BN1 address. Then, the converted instruction is filled into L1 cache 602 in a block designated by the BN1 address, and the BN1 address is also filled into the entry in the track table. Based on the BN1 and the instruction execution result sent from processor core 601 (e.g., execution result of the branch instruction), tracker 614 controls L1 cache 602 to provide the instructions for processor core 601 to execute.

As used herein, the first address and the second address can be used to represent the location of a track point in the track table. The instruction type of the direct branch point also contains information about whether the addressing address of branch target is represented by the BN1 (i.e., a direct branch instruction with BN1 as the branch target) or BN2 (i.e., a direct branch instructions with BN2 as the branch target). When BN1 is stored in a branch point, it indicates that the host instruction block containing the host instruction of the branch target of the branch point is stored in the memory block pointed to by the BN1X in the L1 cache 602, and the host instruction of the branch target can be found according to the BN1Y. When BN2 is stored in a branch point, it indicates that the guest instruction block containing the guest instruction of the branch target of the branch point is stored in the memory block pointed to by the BN2X in the L2 cache 606. Based on the BN2Y, the guest instruction of the branch target can be found, but whether the host instruction corresponding to the guest instruction of the branch target is stored in L1 cache 602 cannot be directly determined.

The row in the offset address mapping module 618 and the row in the track table 610 as well as the cache block in L1 cache 602 are one-to-one correspondence, and are pointed to by the same BN1X. Offset address mapping module 618 is configured to store a corresponding relationship between the offset address of the guest instruction in L2 cache 606 and the offset address of the host instruction in L1 cache 602. Based on the mapping relationship (that is, the mapping relationship between BN2Y and BN1Y) pointed to by BN1X sent from the offset address mapping module 618, the offset address convertor 622 may convert the received BN2Y to the corresponding BN1Y, or convert the received BN1Y to the corresponding BN2Y.

Therefore, when the BN2 needs to be converted to the BN1, based on BN2X and BN2Y, BN1X is obtained by block address mapping module 620. Then, based on the mapping relationship in the row pointed to by the BN1X in the offset address mapping module 618, BN2Y is converted to BN1Y, completing the conversion from BN2 to BN1.

When the BN1 needs to be converted to the BN2, the corresponding BN2 is read out from the extra entry in the row pointed to by the BN1X in track table 610, where the BN2X is the number of the guest instruction block corresponding to the host instruction block pointed to by the BN1X, and BN2Y is a starting location of the guest instruction in the guest instruction block corresponding to the host instruction block pointed to by the BN1X. Based on the mapping relationship in the row pointed to by the BN1X in the offset address mapping module 618 and the starting location, BN1Y is converted to BN2Y, completing the conversion from BN1 to BN2.

In FIG. 6, the buses are divided into 3 groups: guest instruction address buses, BN1 buses and BN2 buses. The guest instruction address buses include bus 657, bus 683 and bus 675. The BN1 buses include bus 631 and bus 693. The BN2 buses include bus 633 and bus 687. There are also other buses, such as BN2X bus 639, BN2Y bus 637, and mapping relationship bus 691.

Specifically, content on bus 675 is the guest instruction block address (i.e., L2 cache block address) stored in the row pointed to by BN2X in active list 604. The guest instruction block address is sent back to the scan converter 608 for calculation of the branch target address of the direct branch instruction.

Content on bus 657 is the branch target instruction address of the direct branch instruction outputted by the scan converter 608 when the scan converter 608 finds a branch instruction. Content on bus 683 is the branch target instruction address outputted by the processor core on 601 when the indirect branch instruction is executed. The formats of bus 657 and bus 683 are the same as the format of the guest instruction address. After the block address part (more significant bits part) is selected by selector 680, the block address part is sent to active list 604 via bus 681 to match with the guest instruction block address stored in track table to obtain a L2 block number BN2X and read out the guest instruction from L2 cache 606 via bus 671. The format of bus 671 is a BN2X. BN2X and BN2Y of the guest instruction address offset part (less significant bits part) on bus 657 are spliced to a complete BN2 address. The BN2 address is sent to track table 622 for storing. The BN2X on bus 671 is also sent to the selector 640. Selector 640 selects one of the content outputted by bus 671 and the content outputted by track table 610 via bus 633 as BN2X to put BN2X on bus 639. The BN2X is used to read out a row of data in the block address mapping module 620 to perform a mapping operation from BN2 to BN1.

Bus 637 is the output of three-input selector 638. The three input selector 638 selects BN2Y on bus 633, bus 657, or bus 683. The BN2Y is sent to the block address mapping module 620 to match with the row pointed to by BN2X on bus 639 to obtain the corresponding BN1X.

The content on bus 633 is the output of the track table 610, and its format can be BN1 or BN2. When the format is BN2, the content on bus 633 is sent to the block address mapping module 620 and the offset address mapping module 618 to map BN2X to BN1X. BN2Y in BN2 needs to be sent to subtractor 928 via bus 637 to perform a subtraction operation with a starting address of the corresponding level two sub block outputted by the block address mapping module 620. Then, the correct block offset address is obtained and is used by the offset address converter 622, converting the BN2Y to the BN1Y. The BN1X and the BN1Y are combined to form the BN1 and the BN1 is written back to the track table 610. The BN2X on bus 633 can also be sent to the active list 604 to read out the corresponding guest instruction block address. The guest instruction block address is sent to the scan converter 608 via bus 675. The guest instruction block address with the BN2Y which is sent directly to the scan converter 608 via bus 633 form the guest instruction address. In addition, the BN2X on bus 633 can also be sent to L2 cache 606 via bus 673 to read out the corresponding guest instruction block.

Bus 631 is the output of the tracker 614 and its format is BN1. The output is sent to L1 cache 602 as an address to read instructions for processor core 601 execution.

The content on bus 693 is the output of the replacement module 611, and its format is BN1X. The bus 693 may provide a next available level one block number BN1X (or track number) for the scan converters 608 to fill the host instruction obtained by conversion. The BN1X on bus 693 and the BN2Y from bus 657 together are put on bus 665 (and constitute content of the entry in the block mapping module 620) and sent to selector 940 for storing BN1X and BN2Y in the block address mapping module 620 according to the order of address. Therefore, the format on bus 665 is BN1X and BN2Y.

The host instruction obtained by conversion of the scan converter 608 is filled via bus 667 into L1 cache 602 in a location addressed by BN1X on bus 693 and BN1Y from converter 608 via bus 669. At the same time, the type of the corresponding host instruction (output by the scan converter 608 via bus 687) and the branch target (the branch target is spliced to bus 687 by BN2X on bus 671 and BN2Y on bus 657) are written via bus 687 in track table 610 at a location addressed by bus 693 and bus 669 together.

Bus 687 splices the instruction type, BN2Y and BN2X from bus 671 into content of an entire track point, and the content of an entire track point is sent to and stored in track table 610.

Bus 954 is the output of the block address mapping module 620. The BN1X in bus 954 is used to read out from the offset address mapping module 618 the corresponding offset address mapping information which is sent to the offset address converter 622. The BN2Y on bus 954 is sent to the subtractor 928 and is subtracted from the BN2Y sent from bus 637. The subtraction result is sent to the offset address converter 622. The offset address converter 622 maps the BN2Y on bus 954 to the BN1Y address based on the inputs. The BN1X address from bus 954 and the BN1Y address outputted by the offset address converter 622 are spliced into a complete BN1. The BN1 is sent to an input port of the three input selector 692 via bus 685.

Selector 692 selects BN1 on bus 685, or BN2 on bus 687 or BN1 on bus 693 (BN1X from bus 693 and BN1Y that is '0' are spliced to a complete BN1) to send to the track table 610 as the content of the track point.

Figure 7A:
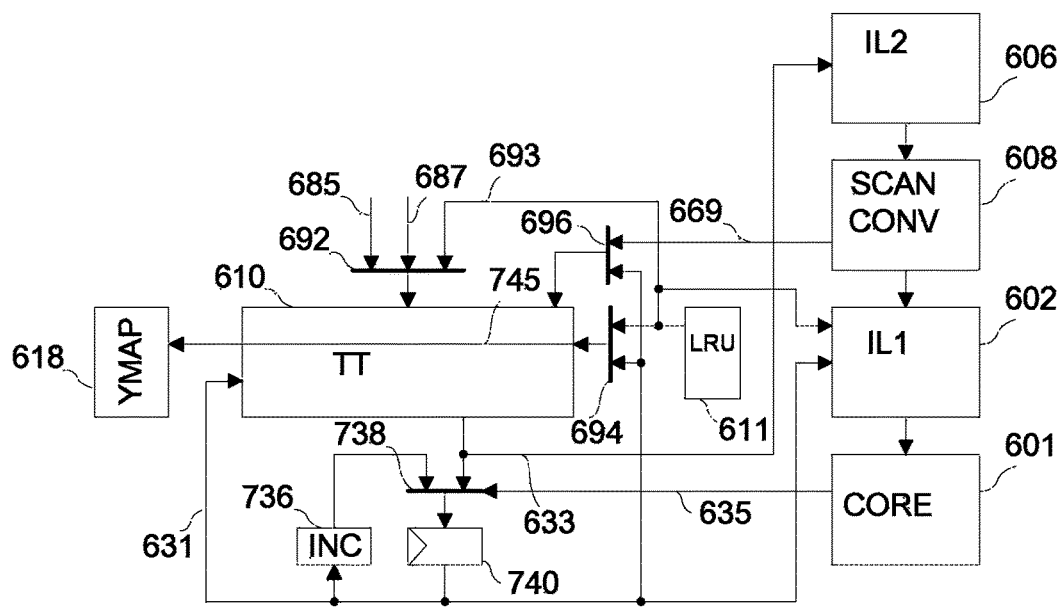
FIG. 7A illustrates a schematic diagram of an exemplary cache structure based on a track table consistent with the disclosed embodiments.

FIG. 7A illustrates a schematic diagram of an exemplary cache structure based on a track table consistent with the disclosed embodiments. For illustrative purposes, only a part of the components are shown in FIG. 7A. Similar to the previous embodiments, the row of track table 610 and the memory block of L1 cache 602 have one-to-one correspondence. The number of the entries (that is, track points) in the row (that is, track) of the track table is one more than the number of instructions in L1 memory block. The last track point in the track stores position pointing to the next track to be executed in sequence. The remaining entries and the instructions in L1 memory block have one-to-one correspondence, and the entries store information about a program execution flow (e.g., instruction type, branch target address, and so on). The addresses corresponding to the track points in the track is in an ascending order from left to right.

The read pointer 631 outputted by the tracker 614 addresses track table 610 outputs content of the corresponding track point via a read port and put the content on bus 633. The controller detects the content on bus 633.

If the instruction type contained in the content is a non-branch instruction, selector 738 selects the output of incrementer 736, such that the tracker moves right to the next address (that is, the larger address).

If the instruction type contained in the content is an unconditional branch instruction, selector 738 selects the branch target address on bus 633, such that the read pointer 631 turns to the position of the track point corresponding to the branch target address on bus 633.

If the instruction type contained in the content is a conditional branch instruction, the tracker 614 pauses updating and waits until processor core 601 generates TAKEN signal 635 which indicates whether the branch is taken. If the branch is not taken, the operations are similar to the operations of the non-branch instruction. If the branch is taken, the operations are similar to the operations of the unconditional branch instruction.

There are two sources for the write address corresponding to the write port of the track table 610: selector 694 (BN1X) and selector 696 (BN1Y). When building a track, replacement module 611 outputs a row address BN1X, whereas scan converter 608 outputs a column address BN1Y. When BN2 is contained in the track point content read out by tracker 614, the BN2 is sent to the block address mapping module 620 or the scan converter 608 to produce BN1. The BN1 needs to be written back to the track point (that is, read, modify and write). When the instruction type contained in the track point content read out by tracker 614 is an indirect branch instruction, the indirect branch target address generated by processor core 601 is sent to the active list 604 and the block address mapping module 620 to generate BN1. The BN1 also needs to be written back to the track point. In both cases, the write address of track table 610 is the previous read address.

The write port of the track table 610 has three sources: bus 685, bus 687 and bus 693. The values on bus 685, bus 687 and bus 693 can be used as the written content after selected by selector 692. The value on bus 685 is the BN1 outputted by the block address mapping module 620 and the offset address converter 622. The value on bus 687 is the branch target address of L2 cache address format (BN2). The value on bus 693 is the BN1 to be written into the last entry of the track, where the BN1 points to the next track to be executed in order.

In one embodiment, when the guest instruction is converted to the host instruction, the scan converter 608 examines and extracts the corresponding information. The content of the track table includes three parts: if the host instruction is a non-branch instruction or an indirect branch instruction, selector 694 selects BN1X 693 corresponding to the host instruction generated by the replacement module 611 as the first address of the write address of the track table 610; the selector 696 selects the block offset 669 of the host branch instruction in the instruction block outputted by the scan converter the 608 as the second address of the write address of the track table 610; and the instruction type (that is, a non-branch instruction or an indirect branch instruction) is written into the track table 610 as written content to complete building the track point. If the host instruction is a direct branch instruction, the scan converter 608 calculates the branch target address. The block address in the branch target address via bus 657 is sent to active list 604 to perform a matching operation. If the matching is successful, the corresponding BN2X is sent to the block address mapping module 620 via bus 671 and bus 639, and the block offset (that is, BN2Y) in the branch target address is sent to the block address mapping module 620 via bus 657 and bus 637. The corresponding BN1X is searched in the row pointed to by the BN2X in the block address mapping module 620. If there is a valid BN1X, the mapping relationship in the row pointed to by the BN1X is read out from the offset address mapping module 618 and the mapping relationship is sent to the offset address converter 622 to convert the BN2Y to BN1Y.

Selector 694 selects BN1X 693 corresponding to the host instruction generated by the replacement module 611 as the first address of the write address of the track table 610. Selector 696 selects the block offset 669 of the host branch instruction in the instruction block outputted by the scan converter selector 608 as the second address of the write address of the track table 610. The said BN1X and the BN1Y are combined as BN1 which is put on bus 685. After the BN1 is selected by selector 693, the BN1 and the extracted instruction type together as the track point content are written in the track table 610, thereby completing the building of the track point. At this point, the track point contains the BN1.

If block address mapping module 620 does not contain the BN2X and the valid BN1X corresponding to the BN2Y, selector 694 selects BN1X 693 corresponding to the host instruction generated by the replacement module 611 as the first address of the write address of the track table 610. Selector 696 selects the block offset 669 of the host branch instruction in the instruction block outputted by the scan converter 608 as the second address of the write address of the track table 610. The BN2X on bus 671 and the BN2Y outputted by the scan converter 608 are spliced to BN2 which is put on bus 687. The BN2 is selected by selector 692, the BN2 and the extracted instruction type together as the track point content are written in the track table 610, thereby completing the building of the track point. At this point, the track point contains the BN2.

If the block address of the branch target address is matched unsuccessfully in the active list 604, it indicates that the guest instruction corresponding to the branch target address has not been stored in L2 cache 606. The replacement algorithm (such as LRU algorithm) assigns a BN2X, and the branch target address is sent to a lower level memory to take out the corresponding instruction block. The corresponding instruction block is stored in the memory block pointed to by the BN2X in L2 cache 606. Selector 694 selects BN1X 693, which corresponds to the host instruction, generated by the replacement module 611 as the first address of the write address of the track table 610. Selector 696 selects the block offset 669 of the host instruction in the instruction block outputted by the scan converter 608 as the second address of the write address of the track table 610. The BN2X and the block offset address (BN2Y) of the branch target address are directly combined to BN2. The BN2 is put on bus 687. After the BN2 is selected by selector 692, the BN2 and the extracted instruction type together as the track point content are written in the track table 610, thereby completing the building of the track point. At this point, the track point contains the BN2.

In the above process, the first address (BNX) of the write address to the track table 610 via bus 745 also points to the corresponding row in the offset address mapping module 618, such that the mapping relationship between each host instruction block and the guest instruction is stored in the row. In addition, if the number of the host instructions corresponding to the guest instructions that are converted is more than the number of the host instructions that can be contained in a L1 memory block, the excess part is filled into the L1 memory block pointed to by the BN1X generated by the replacement module 611 in order and the corresponding track is built. The above process is repeated, such that the conversion and instruction filling from L2 cache to L1 cache is implemented and the corresponding track is built.

The tracker 614 is composed of a register 740, an incrementer 736 and a selector 738. The read pointer 631 (that is, the output of the register 740) points to the track point, which corresponds to the instruction to be executed (the current instruction) by processor core 601, in the track table 110, and read out the track point content to send the content to selector 738 via bus 633. At the same time, read pointer 631 performs an addressing operation for L1 cache 602, and read out the current instruction. The current instruction is then sent to the processor core for execution.

If the instruction type contained in the track point content shows that the instruction is a non-branch instruction, selector 738 selects the result from the incrementer 736 (the value of register 740 added by 1) as an output. The output is sent back to register 740, such that the value of the register 740 is incremented by 1 in the next cycle. That is, the read pointer 631 points to the next track point and read out the corresponding host instruction from L1 cache 602 for processor 601 execution.

If the instruction type contained in the track point content shows that the instruction is an unconditional direct branch instruction whose branch target is BN1, selector 738 selects the BN1 as an output. The output is sent back to register 740, such that the value of register 740 is updated to the BN1 in the next cycle. That is, the read pointer 631 points to the track point corresponding to the branch target host instruction and read out the branch target host instruction from L1 cache 602 for processor core 601 execution.

If the instruction type contained in the track point content shows that the instruction is a conditional direct branch instruction whose branch target is BN1, the selector 738 performs a selection operation according to TAKEN signal 635 generated when the processor core executes the branch instruction, where the TAKEN signal 635 indicates whether the branch is taken. At the same time, the updating of the register 740 is paused until a valid TAKEN signal 635 is sent from processor core 601. At this time, if the value of the TAKEN signal 635 is '1', it indicates that the branch is taken, and the BN1 outputted by the track table is selected as the output to be sent back to register 740, such that the value of the register 740 is updated to the BN1 in the next cycle. That is, the read pointer 631 points to the track point corresponding to the branch target host instruction and reads out the branch target host instruction from L1 cache 602 for the processor core execution. If the value of the TAKEN signal 635 is '0', it indicates that the branch is not taken, and the result that the value of the register 740 is plus '1' by the incrementer 736 is selected as the output to send back to the register 740, such that the value of the register is added by '1' in the next cycle. That is, the read pointer 631 points to the track point and reads out the corresponding host instruction from L1 cache 602 for processor core 601 execution via bus 695.

If the instruction type contained in the track point content shows that the instruction is a direct branch instruction (including conditional and unconditional direct branch instruction) whose branch target is BN2, the BN2 is sent to the block address mapping module 620. If a valid BN1X corresponding to the BN2 is contained in the block address mapping module 620, the BN1X is outputted. The offset address converter 622 converts the BN2Y in the BN2 to the corresponding BN1Y. The BN1X and the BN1Y are combined to BN1. Then, the BN1 is put on bus 685. At this point, selector 694 selects BN1X in the value of the read pointer 631 (that is, branch point BN1 corresponding to the branch instruction itself) as the first address in the write address. Selector 696 selects BN1Y in the value of the read pointer 631 as the second address in the write address. Selector 692 selects BN1 on bus 685 as write content to write back to the branch point.

If a valid BN1X corresponding to the BN2 is not contained in the block address mapping module 620, a valid BN1X is generated by the replacement modules 611, and an available track (and a corresponding memory block) is specified in the track table 610 (and L1 cache 602). At the same time, the guest instructions in L2 cache starting from the guest instruction corresponding to the BN2 until the end of the L2 instruction block are converted and examined by the scan converter 608. The track point information corresponding to the host instruction is extracted and filled into the row pointed to by the BN1X in the track table 610. The mapping relationship between the BN1X and the BN2X is stored in the offset address mapping module 618. The host instruction obtained by the conversion is filled into the memory block pointed to by the BN1X in L1 cache 602.

It should be noted, because the conversion and filling begins from the branch target guest instruction, the host instruction corresponding to the branch target guest instructions is the first instruction in the L1 memory block containing the host instruction. That is, the value of BN1Y is '0'. In this way, the branch target instruction of the branch point is stored in L1 cache 602. The BN2X in BN2 is converted to BN1X (generated by replacement module 611) corresponding to the branch target host instruction. The BN1X and the BN1Y (the value of BN1Y is '0') are combined together to form BN1. The BN1 is put on bus 693. At this point, selector 694 and selector 696 select the value of the read pointer 631 (that is, the branch point corresponding to the branch instruction itself) as the write address. Selector 692 selects BN1 on bus 693 as write content to write back to the branch point. In this way, the track point content outputted by the track table 610 contains the BN1. The following operations are the same as the condition that the direct branch instruction whose branch target is BN1, which are not repeated herein.

If the instruction type contained in the track point content shows that the instruction is an indirect branch instruction (including conditional and unconditional indirect branch instruction), the block address in the branch target address generated when processor core 601 executes the branch instruction is sent to the active list 604 to perform a matching operation. If the matching is successful, BN2X can be obtained, and the block offset in the branch target address is as BN2Y. The BN2X and the BN2Y are sent to the address mapping module 620 to perform a matching operation. If there is a hit, the corresponding BN1 is obtained and the following operations are the same as the condition that the direct branch instruction whose branch target is BN1. If there is a miss, the following operations are the same as the situation of the direct branch instruction whose branch target is BN2.

If the matching is unsuccessful, it indicates that the guest instruction corresponding to the branch target address is not yet stored in L2 cache 606. A level two memory block number BN2X is assigned by the active list 604 based on a replacement algorithm (such as a LRU algorithm). The branch target address is sent to a lower level memory to take out the corresponding instruction block. The corresponding instruction block is stored in the memory block pointed to by the BN2X in L2 cache 606. The guest instruction block is then converted and filled into L1 cache 602. The corresponding track is built and the mapping relationship is recorded. The BN2 is converted to the BN1. The BN1 is filled back into the branch point (the generated BN2 is not filled into the track table 610, whereas the BN1 is directly filled into the track table 610), such that the track point content outputted by the track table 610 contains BN1. The following operations are the same as the situation that the direct branch instruction whose branch target is BN1, which are not repeated herein.

When the tracker reads out again the entry containing the indirect branch target in the next time, the instruction type of the entry is an indirect branch instruction, but the address type is BN1, the controller determines that the indirect branch instruction is previously accessed, and speculative execution can be performed using the BN1. The corresponding guest instruction address can be obtained using the BN1 address (for example, using the BN2X stored in the track corresponding to the BN1X to address the active list 604 to read out the guest instruction block address, the block address of the guest instruction block is obtained by offset address mapping module 618, thereby obtaining the complete guest instruction address). When processor core 601 executes the indirect branch instruction to generate the branch target address, the branch target address is compared with the guest instruction address. If the branch target address is the same as the guest instruction address, then continue execution. If the branch target address is not the same as the guest instruction address, the instructions after the branch point are cleared and the result is not saved. The execution starts from the branch target address provided by processor core 601, and the branch target address is mapped to BN1 which is stored in the branch point.

Figure 7B:
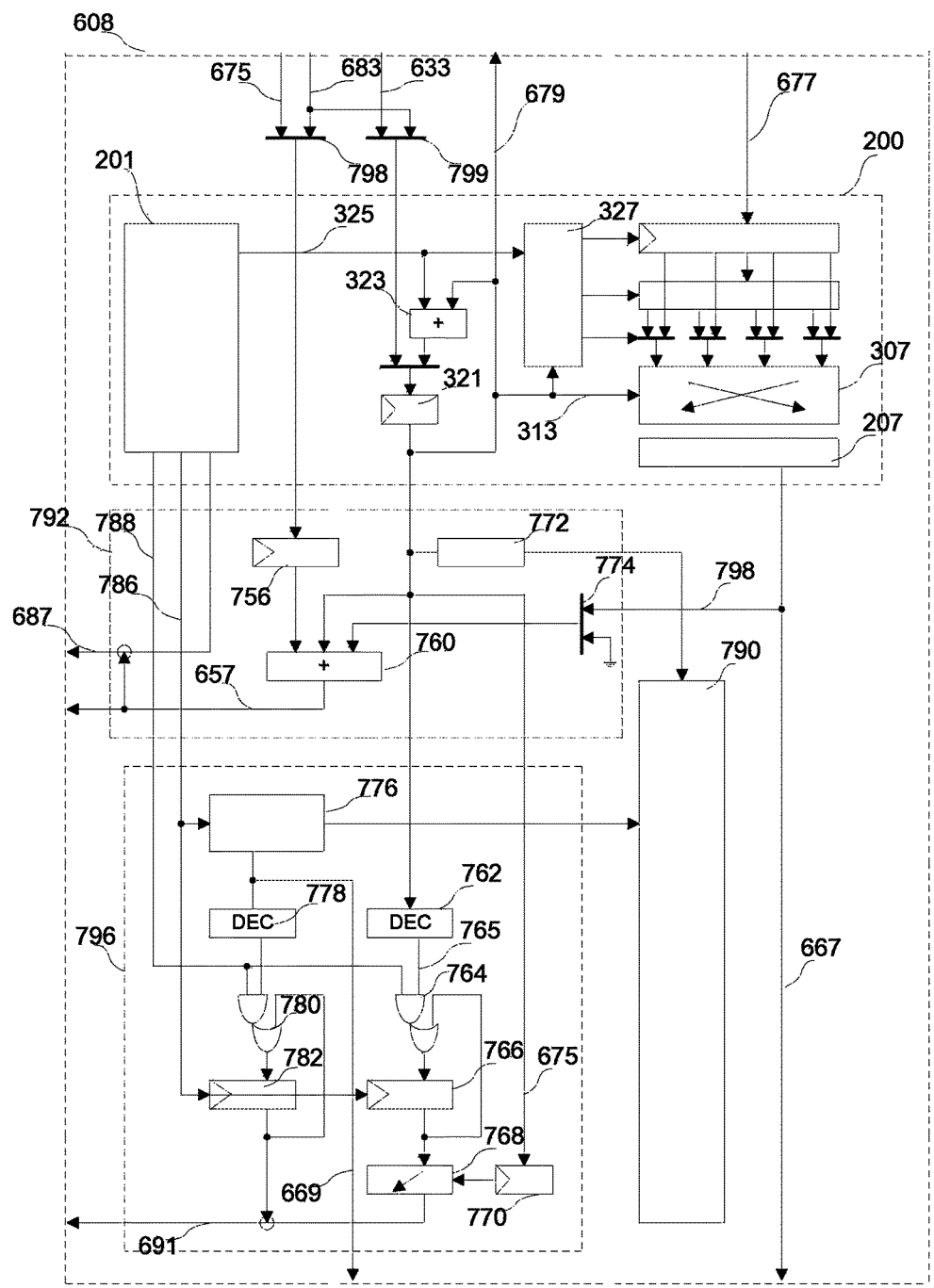
FIG. 7B illustrates a schematic diagram of an exemplary scan converter consistent with the disclosed embodiments.

Returning to FIG. 6, the scan converter 608 converts the guest instruction to the host instruction to fill into L1 cache. During the conversion, the scan converter 608 also calculates the branch target address of the guest instruction, extracts the instruction type and fills the target address and the type information into the corresponding entry of the track table. FIG. 7B illustrates a schematic diagram of an exemplary scan converter consistent with the disclosed embodiments.

In one embodiment, the scan converter 608 receives inputs from two sources. The first source is described in the following. The track table 610 sends out a direct branch guest instruction address BN2 via bus 633. The BN2 is not matched in the block address mapping module 602. At this time, the needed guest instruction block is stored in L2 cache 606 and the active list 604 has the program counter (PC) high bit address of the corresponding guest instruction. But the guest instruction is not converted to the host instruction to store in L1 cache 602. The BN2X address on bus 633 is sent to the active list 604 to read out the corresponding high bits. The high bits is sent to the scan converter 608 via bus 675. The block offset BN2Y on bus 633 is also sent to the scan converter 608. At this point, selector 660 selects BN2X on bus 633 and puts BN2X on bus 673, thereby providing the block address for L2 cache 606.

The second source is described in the following. When the track table 610 sends out an indirect branch guest instruction type and the address format is guest instruction address format via bus 633, it indicates that the target of the indirect branch instruction needs to be calculated by processor core 601. At this time, the controller sends the guest branch target address obtained when processor core 601 executes the corresponding indirect conditional branch instruction to the active list 604 via bus 683, selector 680, and bus 681 to perform a matching operation. If the matching is unsuccessful, it indicates that the guest instruction block is not in L2 cache 606. The active list 604 sends the guest instruction address on bus 681 to a lower level memory to read out the corresponding instruction block. The corresponding instruction block is filled into the L2 memory block in L2 cache 606, where the L2 memory block is assigned by the active list 604 and the L2 memory block is pointed to via selector 660 and bus 673. Meanwhile, the high bits of the guest instruction is stored in the corresponding tag field in the active list 604. If the matching is successful, the active list 604 via selector 660 and bus 673 points to the L2 memory block corresponding to the matching tag in L2 cache 606. Meanwhile, program counter (PC) address on bus 683 is sent to the scan converter 608.

Referring to the structure of the scan converter 608 shown in FIG. 7B, the scan converter 608 includes a converter 200, a direct branch target address calculator 792, a block offset mapping generator 796, a controller 790, input selectors 798 and 799. The controller 790 receives status signals from other modules and controls other modules to work together.

Selector 798 selects the PC high bits address from bus 675 or bus 683 and stores the PC high bits address in register 756. Selector 799 selects the PC low bits address (BN2Y) from bus 633 or bus 683 to store the PC low bits address in register 321. The address from bus 675 and bus 633 is used to convert BN2 in the track table to BN1 address. During the conversion, the corresponding guest instruction is converted to the host instruction, and the converted host instruction is stored in L1 cache 602. The address from bus 683 is used to convert the guest instruction corresponding to the indirect branch target to the host instruction and store the host instruction in L1 cache 602. The block number BN1X of L1 cache 602 together with the block offset BN1Y are stored in the entry corresponding to the indirect branch instruction in the track table 610. No matter which source, after selecting by selector 798 and selector 799, the following operations are the same. The process that BN2 is converted to BN1 address listed below is used as an example.

The address of L2 cache 606 is BN2, and its format is '8XYY', where '8X' is the block address BN2X and its value is '80'~'82'. Every L2 cache block (one row in FIG. 7B) in L2 cache 606 has 32 bytes. The block offset BN2Y is byte address 'YY', and its value is '0'~'31'. The byte stores the variable-length guest instruction. The address of L1 cache 602 is BN1 and its format is '7XY', where '7X' is the block address BN1X and its value is '70'~'75'. Every L1 instruction block in L1 cache 602 contains 4 fixed length host instructions, and its block offset BN1Y is block word address 'Y'. To distinguish from BN2Y, the value of BN1Y is tagged using letters A~D. In one embodiment, the length of a host instruction is a word. The host instruction may have other length. Every row in the track table 610 has five entries A~E, where entries A~D correspond to four host instructions A~D in L1 cache 602, and entry E is used to store the address of the next cache block after the row.

The direct branch target address calculator 792 includes a three-input adder 760 which is used to calculate the direct branch target address. The direct branch target address calculator 792 also includes a border comparator 772, and its input is connected to bus 679. The border comparator 772 stores a maximum address in the L2 cache block ('31' is used here). When the BN2Y value on bus 679 goes cross the L2 cache block boundary (greater than '31'), the border comparator 772 generates a L2 cache address cross border signal to inform the controller 790. The direct branch target address calculator 792 also includes a selector 774. The controller 790 can control the selector to select the branch offset outputted by the converter 200 or all '0' and send the selected result to the adder 760. When all '0' is selected, the address of the next guest instruction block is calculated.

Referring to FIG. 6, it is assumed that the tracker 614 points to an entry in the track table and reads out an guest instruction, where the type of the guest instruction is a direct branch instruction, and the branch target is BN2 address '8024' (it indicates that the guest instruction whose block offset is '24' in number '80' L2 cache block of L2 cache 606). The BN2 address via bus 633 is sent to the block address mapping module 620 to perform a matching operation. The BN2X is selected by selector 640 to put on bus 639, and then address the memory module 920 in the block address mapping module 620 is selected so the BN2Y values stored in row '80' are outputted. The obtained BN2Y values are compared with the BN2Y selected by selector 638 and sent in via bus 637. If comparison result is a miss, it indicates that the branch instruction is a guest instruction stored in the L2 cache and the branch instruction is not converted to the host instruction stored in L1 cache 602. After receives the miss signal, the controller using the BN2X on bus 633 controlling the read out a tag (assuming it is '9132') from row '80' of active list 604, and the tag is sent to the scan converter 608 via bus 675. Referring to FIG. 7B, the controller also controls selector 798 in the scan converter 608 to select bus 795, and the controller also controls selector 799 to select bus 633. Further, the controller informs the controller 790 in the scan converter 608 to start a conversion operation for the instruction.

The controller 790 controls register 756 to store the output ('9132') of selector 798, and the controller 790 also controls register 321 to store the output ('24'; which is '1100' in binary) of selector 799. That is, the PC address of the branch target is '913224', and the PC address of the branch target is stored in number '80' row of L2 cache. So the BN2 address is '8024'. Assuming that 16 bytes at one time can be read out from L2 cache 606, only the highest bit of the 4-bit block offset address on register 321 is sent to L2 cache 606. The highest bit of offset address and the block address from bus 673 are combined to form the address '8016'. The corresponding bytes are read out from the L2 cache 606 and are sent to the aligner 203 in the converter 200 via bus 677. The least significant byte inputted in the aligner 203 is byte '16'. The converter 200 uses the lowest 3-bit binary '100' on register 321 as an original offset to shift byte '24' to the lowest byte outputted by the aligner 203, and then starts the instruction conversion. Memory 201 in the converter 200 provides a signal 786 for each instruction. The signal 786 controls the block offset mapping generator 796 to record the block offset of the corresponding instruction. Memory 201 also sends out the value on bus 788 to control logic gate 780 and logic gate 764 in the block offset mapping generator 796, thereby prohibiting from recording certain block off-sets. Therefore, the mapping between multiple host instructions (or guest instructions) and one guest instruction (or host instruction) can be implemented.

The binary value '1100' on register 321 is sent to decoder 762 via bus 679 and is decoded to one-hot-code '0000000000000000000000100000000'. In digital circuits, one-hot-code refers to a group of bits among which the legal combinations of values are only those with a single high (1) bit and all the others low (0). The one-hot-code via AND OR gate 764 is stored in memory 766. Correspondingly, the counter 776 is set to '0' when a conversion operation is started on a segment of guest instructions. The value '000' on the output bus 669 is also decoded to one-hot-code '1000' by the decoder 778, and is sent via logic gate 780 to be stored in memory 782. The block offset mapping generator 796 also includes a shifter 768 and a register 770. The value on bus 679 is stored in register 770 to control the shifting of shifter 768 when a conversion operation is started on a segment of guest instructions. In this example, '1100' is stored in register 770 to control shifter 768 to left shift 24 bits, such that information corresponding to byte '24' in register 766 is shifted to the position of byte '0' and is put on bus 691.

The replacement module 611 assigns number '72' cache block of L1 cache 602 for the host instruction being generated according to the replacement algorithm. The controller controls selector 692 to select BN1X address '72' on bus 693. The BN1X address together with BN1Y address A ('00') are written in the track table 610. At this time, selector 694 and selector 696 select the address on bus 631. Therefore, BN1 address '72A' is written to an entry to replace the BN2 address '8026', but the instruction type is not changed. If the tracker 614 takes branch at this entry based on the instruction type and/or the control signal of processor core 601, the '72A' is put on bus 631 which then points to the first entry on row '72' of the track table 610 and continue execution form there.

The replacement module 611 sends out the BN1X address '72' via bus 693 to select number '72' L1 cache block in L1 cache 602, and selects row '72' in offset address mapping module 618 and in track table 610 to be filled by the host instruction and the corresponding program flow, as well as the block offset information generated by the scan converter 608. The scan converter 608 drives the first level block offset address BN1Y value on bus 669 to L1 cache 602 and track table 610 controlling the filling of the L1 cache block and its corresponding track. The branch instruction starting from BN2 address '8024' in L2 cache 606 is converted to a non-branch host instruction by the converter 200. The non-branch host instruction is sent to L1 cache 602 via bus 667 and is filled into A entry (the block offset is '00') of number '72' L1 cache block. The corresponding instruction type (e.g., a non-branch instruction) is also outputted by memory 201 and sent via bus 687 to the track table 610 for storing in entry '72A'.

The controller also controls that BN2Y value '24' on bus 633 be selected by selector 698. Then, BN1X address '72' on bus 693 and the BN2Y value '24' are spliced into to BN1X,BN2Y format '7224' and is written into the left most entry of number '80' row in the block address memory module 920 of the block address mapping module 620 via bus 665, where the entry is addressed by BN2X on bus 633 which is selected by selector 640 and sent to 620 via bus 639. BN2Y '24' on bus 633 is selected by selector 638, and BN2Y '24' is sent to the block address mapping module 620 via bus 637 to compare with the BN2Y value '32' of each entry in the row to determine the entry. The value and the position indicate that the segment of the guest instruction starting from the number '24' byte of number '80' L2 cache block in L2 cache are stored in number '72' L1 cache block, but the guest instructions whose byte address less than '24' in the number '80' row of L2 cache are not yet converted to the host instructions. The structure and the operations may refer to the embodiment shown in FIGS. 8A-8D.

During the conversion, the converter 201 detects that the length of the guest non-branch instruction is 2 bytes. Under the control of bus 325, the aligner 203 left shifts 2 bytes the guest instructions inputted via bus 677 to start the next instruction conversion. The byte length of the instruction is also sent to the adder 323 to be added with the contents of the register 321. The sum '26' is stored in the register 321 again. The output of the register 321 is decoded to one-hot-code '00000000000000000000000000100000' by the decoder 762 again. Bitwise OR operation are performed on the one-hot-code and the content in register 766 via AND OR gate 764. The result '00000000000000000000000010100000' is stored in the register 766 again. It indicates that '24' byte and '26' byte in the number '80' L2 cache block are a starting byte of a guest instruction, respectively.

The converter 200 converts the guest instruction starting from '26' byte. During the conversion, the converter 200 finds that the instruction is a direct branch instruction having 4 bytes. The converter 200 does not make any change to the branch offset. The branch offset and the other parts of the host instruction obtained by the conversion are put directly on bus 667. The type of the branch instruction is outputted via bus 687. The counter 776 adds '1' under the control of bus 786, so the value on bus 669 is '001'. Because the instruction is a branch instruction, the controller 790 controls the adder 760 to add together the PC high bits address in register 756, the block offset in register 321 and the branch offset portion 798 (assuming that the value is '24' at this time) of bus 667. The sum is branch target PC address '913316' and the sum is put on bus 657. The lower bits BN2Y (the part that is not greater than the number of bytes in the L2 cache block) in the sum is spliced to bus 687 and output.

The higher bits of PC address on bus 657 is selected by selector 680 and sent to active list 604 via bus 681 to perform a matching operation. If the result is a miss, the active list 604 sends the higher bits address of PC address '9133' to the lower level memory via bus 681 to read out the corresponding guest instruction block. The active list 604 also assigns the number '81' L2 cache block in L2 cache for storing the guest instruction block. The L2 cache block number BN2X ('81') is sent out via bus 671. The BN2X and the low bit BN2Y ('18') on bus 687 are spliced to a complete BN2. The BN2 and the direct branch instruction type on bus 687 are sent to the track table 610 via selector 692 and written in B entry (address '001') pointed by bus 669 in number '72' row pointed to by the replacement module 611 via bus 693. At the same time, the host branch instruction obtained by the conversion via bus 667 is written into '72B' in L1 cache 602.

The value '001' on bus 669 is also decoded to one-hot-code '0100' by the decoder 778. An OR operation is performed on the one-hot-code '0100' and the value in register 782 to obtain the value '1100'. The value '1100' is written back to register 782, representing that the first host instruction and the second host instruction in the host instruction block each corresponds to a guest instruction, respectively. If one host instruction does not correspond to the starting byte of one guest instruction (that is, the host instruction is one, but not the first, of the multiple host instructions corresponding to one guest instruction), the content in memory 201 controls AND OR gate 780 though the signal (similar to the situation: an ending value YZ is '10' in FIG. 5D) via bus 788, such that an OR operation is performed on the signal in register 782 and all '0', and the bit of the corresponding instruction in register 782 is recorded as '0', indicating that the host instruction does not correspond to a guest instruction and the host instruction cannot be a branch target.

On the other hand, when multiple guest instructions are combined into one host instruction, the content of memory 201 controls AND OR gate 764 through signal sent out via bus 788 ((similar to the situation: ending value YZ is '01' in FIG. 5D). AND OR gate 764 erases the corresponding records of other instructions after the first instruction among the multiple guest instructions, such that the number of the guest instruction is the same as the number of the host instructions. When a segment of guest instructions are converted to the corresponding host instruction, the number of '1' in register 782 is the same as the number of '1' in register 766, although the positions are different. The position of '1' in register 766 represents the address of the starting byte of the guest instruction. The position of '1' in register 782 represents in the address of the starting instruction of the host instruction.

During the conversion, memory 201 detects that the length of the guest instruction starting from '26' byte is 4 bytes. Via bus 325, 201 controls the aligner 203 left shifting 4 bytes the guest instruction inputted via bus 677 to start the instruction conversion. The length of the guest instruction is also sent to the adder 323 to be added with the content of the register 321. The sum '30' is again stored in the register 321. The output of the register 321 is decoded to one-hot-code by the decoder 762 again. A bitwise OR operation performed on the one-hot-code and the content stored in the register 766 are performed to obtain the result '00000000000000000000000010100010'. The result is again stored into the register 766. The counter 776 increments '1' as before, such that the bus 669 points to C entry.

During the conversion, the converter 200 reads out the length (i.e., 4 bytes) of the guest instruction starting from '30' byte from the memory 201 via bus 325. The length of the guest instruction is sent to the adder 323 to be added with the content of register 321. The sum '34' is stored in the register 321 again. The output 679 of the register 321 is compared with byte '31' of L2 cache block stored in the comparator 772. The comparison result notifies, the controller 790 that it has crossed the L2 cache block boundary. Based on that, the controller 790 controls selector 774 to select all '0', and the controller 790 also controls the adder 760 to add PC higher bit address in memory 756, the block offset in the register 321 and all '0' sent from selector 774 together to obtain the block address of the next guest instruction block. The result (i.e., PC address '913302') is sent out via bus 657, where high bit '9133' of PC address is sent to the active list 604 to perform a matching operation and BN2X value '81' is obtained. The BN2X values selects number '81' L2 cache block in L2 cache 606 via selector 660 and bus 673. According to previous embodiment, the converter 200 reads '0'~'15' bytes of number '81' L2 cache block and extract '0'~'1' bytes. '0'~'1' bytes is shifted and spliced after '30'~'31' bytes of number '80' L2 cache block in the converter 200 to complete the conversion of the guest instruction. The host instruction obtained by the conversion is sent to '72C' entry of L1 cache 602 via bus 667 for storing. The content in register 782 is updated to '1110'.

Because the boundary of L2 cache block is crossed when the instruction is converted, the controller 790 controls the converter 200 to stop the instruction conversion and controls the counter 776 to add 1, such that the address on bus 669 points to '72D'. The controller controls the BN2X value '81' on bus 671 to be sent to the block address memory module 920 in the block address mapping module 620 via selector 640 and bus 639, and reads out the content of number '81' row to be matched with BN2Y address '02' that is sent to the block address mapping module 620 via bus 657, selector 638 and bus 637. If the match is a hit, BN1 obtained by the matching operation and the unconditional branch instruction type generated by the controller are stored in '72D' entry of the track table 610 via bus 685 and selector 692. If there is a miss in the match, it means that the corresponding guest instruction block is in the L2 cache but has not been converted to the host instruction. At this point, the controller 790 generates a direct branch instruction type and put it on bus 687. The direct branch instruction type and low bit BN2Y (corresponding to the block offset bytes) '02' from the adder 760 are outputted together via bus 687. The controller splices the BN2X on bus 671 and the BN2Y on bus 687 to BN2 address '8102'. The BN2 address '8102' along with the unconditional branch instruction type are written into '72D' entry of the track table via selector 692. At this point, there is no corresponding host instruction for '72D' entry of the track table, so the '72D' entry of L1 cache 602 is not filled.

At this point, the controller 790 also controls shifter 768 left shift 24 bits the content in register 766 and the shifted content is put on bus 691, where the value of the shifted content is '10100010', and the format is the same as the data format in row 751 of FIG. 8B. The controller 790 also controls to put the content '1110' in register 782 on bus 691. The format in register 782 is the same as the data format in row 771 of FIG. 8B. The content on bus 691 is sent and written into No. '72' row in the offset address mapping module 618 indexed by L1 cache replacement module 611, to be used later for mapping the block offset of the guest instruction to the block offset of the host instruction.

At this point, the scan converter 608 works together with other modules to complete the conversion of a segment of guest instructions, extracts the program flow information from the segment, and stores the program flow information and the host instruction obtained by the conversion into the corresponding entry of the track table 610 and L1 cache 602, such that the tracker 614 may reads and tracks the program flow in track table 610. Thus, the corresponding host instructions can be provided for the processor core execution. The value in the track table 610 and the block address mapping module 620 at this time can refer to FIG. 9A.

During the conversion of a segment of guest instructions, L1 cache block may be filled before the L2 instruction segment conversion is completed. The counter 776 also has a comparator similar to the border comparator 772. When the boundary of the L1 cache is crossed, the comparator informs the controller 790. In this case, the controller 790 requests a new L1 cache block from the L1 cache block replacement module 611 and controls the BN1X address of the new cache block and BN1Y address ('0') to be written in the last entry of the fully filled row of the track table via bus 693 and selector 692. Each row of the track table has one more entry than the corresponding L1 cache block, such that the program flow can extends to the next new track when the L1 cache block is fully written. Because the new L1 cache block is filled starting from the first entry, its BN1Y address is always '00'. Then, the counter 776 is reset. The replacement module 611 points to the new L1 cache block and its corresponding row in the track table via bus 693. Further, the converted host instruction and the corresponding program flow information is filled starting from entry A of the cache block and row of the track table designated by bus 963.

FIG. 8A illustrates a schematic diagram of an exemplary corresponding relationship between a guest instruction block and a host instruction block consistent with the disclosed embodiments. The guest instruction set can be a fixed length instruction set or a variable length instruction set. The variable length instruction set is used as an example. The fixed length instruction set can be a special case of the variable length instruction set.

In one embodiment, it is assumed that the length of a guest instruction block is 16 bytes (from byte 0 to byte 15), and the length of each host instruction is 4 bytes. As shown in FIG. 8A, guest instruction block 701 includes 6 variable length guest instructions. As previously described, byte 0 in the guest instruction block is the last byte of the previous instruction. Therefore, byte 0 belongs to the previous guest instruction block. That is, the guest instruction of the current guest instruction block starts from byte 1 of the guest instruction block. The guest instruction 703 occupies 3 bytes (byte 1, byte 2 and byte 3); the guest instruction 705 occupies 5 bytes (byte 4, byte 5, byte 6, byte 7 and byte 8); the guest instruction 707 occupies 2 bytes (byte 9 and byte 10); the guest instruction 709 occupies 1 byte (byte 11); the guest instruction 711 occupies 3 bytes (byte 12, byte 13 and byte 14); the guest instruction 713 occupies 1 byte in this guest instruction block; and the remaining part of the guest instruction 713 is in the next guest instruction block.

In one embodiment, it is assumed that the guest instruction 705 can be converted to 2 host instructions (that is, host instruction 725 and host instruction 727); the guest instructions 703, 707, 709, 711 and 713 can be converted to 1 host instruction (that is, host instructions 723, 729, 731, 733 and 735), respectively. Therefore, the host instruction block 721 obtained through the converting operation performed by the scan converter 608 contains 7 host instructions (from the host instruction 0 to the host instruction 7). In addition, when the instruction block is converted by the scan converter 608, the corresponding relationship between the block offset BN2Y of the guest instruction and the block offset BN1Y of the host instruction is also generated. The corresponding relationship is stored in the offset address mapping module 618.

It should be noted that one guest instruction may be converted to one or more host instructions. One guest instruction corresponding to multiple host instructions is taken as an example, whereas one guest instruction corresponding to one host instruction is a special case. That is, when a guest instruction corresponds to a host instruction, both the first host instruction and the last host instruction corresponding to the guest instruction is the host instruction corresponding to the guest instruction.

FIG. 8B shows a storage form of an offset address mapping relationship consistent with the disclosed embodiments. As shown in FIG. 8B, row 751 and row 771 constitute a group of mapping relationships, and the group of mapping relationships correspond respectively to a guest instruction block and a host instruction block for storing the offset address mapping relationship between the guest instruction and the host instruction shown in FIG. 8A. Row 751 includes 16 entries, and each entry only stores one bit data (that is, '0' or '1'), where '0' indicates that the offset address of the guest instruction corresponding to the entry is not the starting position of the guest instruction; and '1' indicates that the offset address of the guest instruction corresponding to the entry is the starting position of the guest instruction.

Every entry in the second row (that is, row 771) of each group of mapping relationship corresponds to an offset address of a host instruction. That is, the number of the entries is the same as the maximum number of host instructions that can be included in the host instruction block. Each entry only stores one bit of data (that is, '0' or '1'), where '0' indicates that the host instruction corresponding to the entry is not the first host instruction of the corresponding guest instruction; and '1' indicates that the host instruction corresponding the entry is the first host instruction of the corresponding guest instruction.

Thus, by performing the corresponding operation for '1' in row 751 and row 771 respectively, the offset address of the guest instruction can be converted to the offset address of the host instruction. FIG. 8C illustrates a schematic diagram of an exemplary offset address converter 622 consistent with the disclosed embodiments. As shown in FIG. 8C, the process for converting the offset address of the guest instruction to the offset address of the host instruction is taken as an example. The form of the mapping relationship sent from the offset address mapping module 618 can refer to the embodiment shown in FIG. 8B.

The number of columns in selector array 801 is the same as the number of offset addresses contained in the guest instruction block, whereas the number of rows in selector array 801 equals to the number of columns plus one (that is, 17 rows and 16 columns). For illustrative purposes, only 4 rows and 3 columns are shown in FIG. 8C (that is, the first 4 rows from bottom to top and the first 3 columns from left to right). The row number of the bottom row is 0, and the row number is in an ascending order from bottom to top. The column number of the left most column is 0, and the column number is in an ascending order from left to right. Each column corresponds to an offset address of the guest instruction. The inputs A and B of each selector in column 0 are all '0', except input A of the selector in row 0 is '1'. The inputs B of all selectors in row 0 are '0'. The inputs A of the selectors in other columns are from the output value of the selector in the same column and same row, and the inputs B are from the output value of the selector in previous column and the immediate lower row.

The structure of selector array 803 is similar as the structure of selector array 801. The number of rows in selector 803 is the same as the number of row in selector array 801. The difference is that the number of columns in selector array 803 is the same as the number of host instructions contained in the host instruction block. Similarly, for illustrative purposes, only 4 rows and 5 columns are shown in FIG. 8C, that is, the first 4 rows from bottom to top and the first 5 columns from left to right. The naming of the row number and the column number is the same as selector array 801. In addition, the inputs B of all selectors in row 0 of the selector array 803 are all '0'. The inputs A of all selectors in the topmost row (row 16) are all '0' and the outputs of all selectors in row 0 are sent to encoder 809 to perform an encoding operation according to the position of the output column. The inputs A of other selectors are from the output value of the selector in the previous column and the immediate upper row; and the inputs B are from the output value of the selector in the previous column and the same row. The input A of row 0 is from the output value of selectors in the immediate upper row of selector array 801; and the input B is from the output value of selectors in the same row of selector array 801.

The decoder 805 decodes the offset address of the guest instruction, and the obtained mask value is sent to the mask unit 807. Because one guest instruction block contains 16 offset addresses, the width of the mask value is 16 bits, where the mask bit value corresponding to the offset address of the guest instruction and the mask bit value of guest instruction before it in program order are all '1', and the value of the mask bit after the mask bit corresponding to the offset address of the guest instruction are all '0'. Then, performed a bitwise AND operation on the mask value and the row 751 in the mapping relationship sent from the offset address mapping module 618, such that the value on row 751 on or before the bit corresponding to guest offset address are kept but the other values on row 751 are clear to '0'. The resulting 16-bit control word is sent to selector array 801.

Every bit of the control word controls one column of selectors in selector array 801. When the value of the bit is '1', the selectors in the corresponding column select input B. When the value of the bit is '0', the selectors in the corresponding column select input A. That is, for every column of selectors in selector array 801, if the corresponding bit is '1', the output from previous column and immediate lower row is selected as the input, such that the output of the previous column is shifted up one row and the row on the bottom is filled with '0' as the output of this column; if the corresponding bit is '0', the output from the previous column and the same row is selected as the input, and the output of the previous column is kept as the output of this column. Thus, the number of rows that the input of the first column in selector array 801 is shifted up equals to the number of '1' in the control word. That is, the only '1' in the input of the selector array 801 is shifted up the corresponding number of rows. Because the number of rows and columns in the selector array 801 equals to the number of offset addresses contained in the guest instruction block, the output of the selector array 801 only contains one '1' and the position of the row containing the '1' is determined by the number of '1' in the control word.

Meanwhile, row 771 sent from the offset address mapping module 618 is directly as the control word sent to the selector array 803. Similar to the selector array 801, every bit of the control word controls one column of selectors in selector array 803. When the value of the bit is '1', the selectors in the corresponding column select input A. When the value of the bit is '0', the selectors in the corresponding column select input B. That is, for every column of selectors in selector array 803, if the corresponding control bit is '1', the output from the previous column and the immediate upper row is selected as the input, such that the output of the previous column is shifted down one row and the row on the top is filled with '0' as the output of this column; if corresponding bit is '0', the output from the same column and the same row is selected as the input, and the output of the previous column is kept as the output of this column. Thus, every time passing one '1', the input of the selector 803 is shifted down one row. That is, the only '1' in the input of the selector array 803 is shifted down one row. Therefore, when the encoder 809 receives the '1' sent from the bottom row in the selector array 803, the corresponding host instruction offset address can be generated based on the position of the column containing the '1'.

The mapping relationship shown in FIG. 8B is taken as an example. If the guest instruction offset address is '9' (the tenth byte in the corresponding guest instruction block, that is, the third instruction), the mask value outputted by the mask unit 807 is '1111111111000000'. The value '1111111111000000' and the value '0100100001011001' in row 751 are performed a bitwise AND operation to obtain the value '0100100001000000'. That is, there are three '1' in the control word. Thus, the '1' in the input of the selector array 801 is shifted up 3 rows. That is, the '1' of the output is in the 3rd row. Therefore, after passing through the columns of selectors corresponding to three control bit whose value is '1' in the selector array 803, the '1' reaches the encoder 809. Because the value in row 771 is '1101111', the selector array 803 shifts down the input '1' one row at No. 0, 1st and 3rd column, respectively. The output for the encoder 809 at the third column is '1', and the output corresponds to the fourth instruction in the host instruction (the offset address is '3'). The encoder 809 obtains '3' based on this code, thereby converting the guest instruction offset address '4' to the host instruction offset address '3'.

Figure 8D:
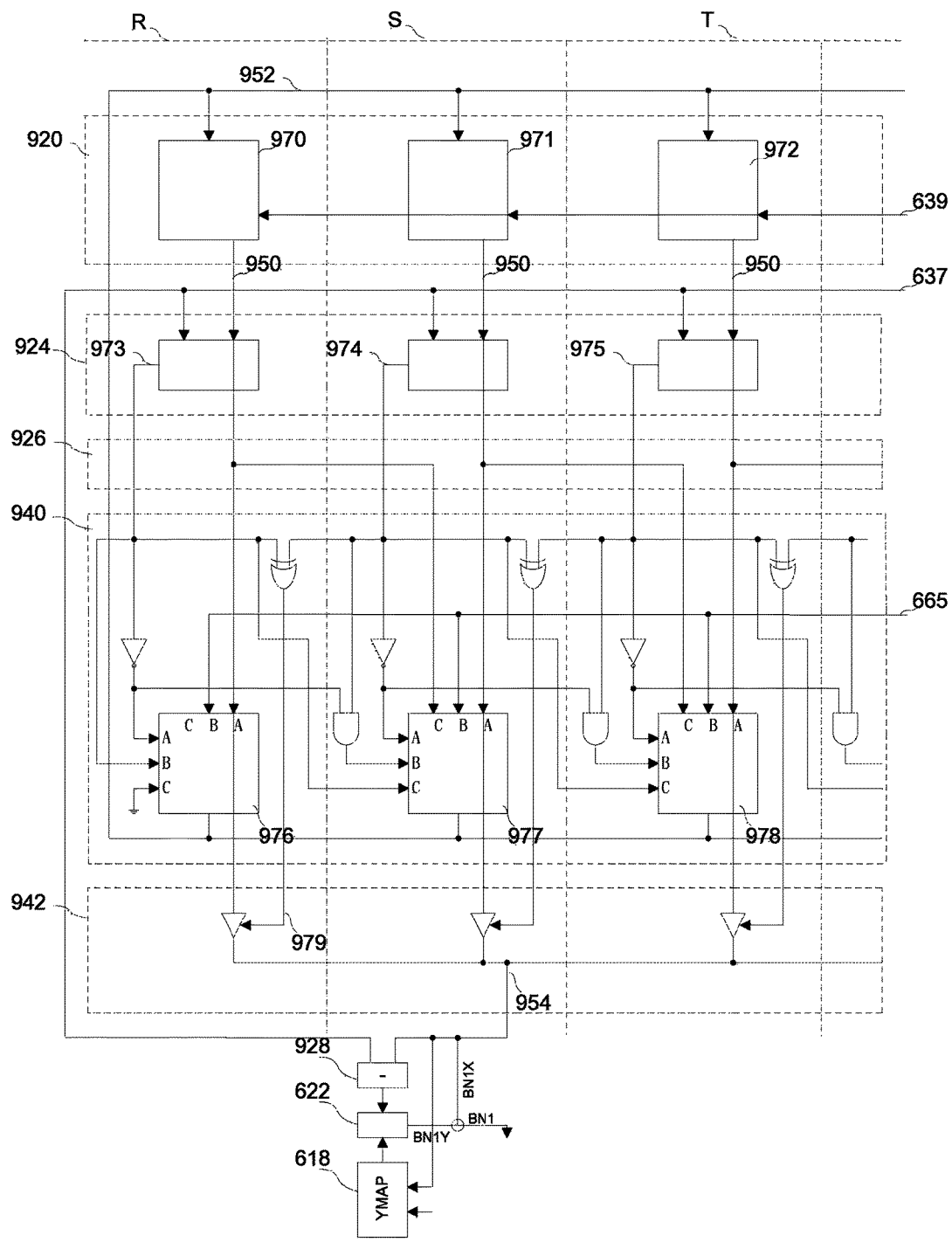
FIG. 8D illustrates a schematic diagram of an exemplary block address mapping module consistent with the disclosed embodiments.

By comparing the BN2Y to be sorted with the BN2Y stored in every entry of the block address mapping module 620, the BN1X and the BN2Y currently being written can be stored in the correct position. FIG. 8D illustrates a schematic diagram of an exemplary block address mapping module consistent with the disclosed embodiments.

As shown in FIG. 8D, the block address mapping module 620 includes a block address memory module 920, a comparison module 924, a shifter 926, a multiplexer 940, a multiplexer 942 and some selector control logics. Each module is divided into a plurality of columns (such as R, S and T). Each column has its own block address memory module 920, comparison module 924, shifter 926, multiplexer 940 and multiplexer 942. The block address memory module 920 is a memory array containing a plurality of entries organized into a plurality of rows and a plurality of columns (such as memory blocks 970, 971 and 972 shown in FIG. 8D). Each entry has two parts: the L1 cache block number (BN1X) and the L2 cache block offset (BN2Y). One row of the memory array is selected by address bus 639 and outputted via bus 950; similarly, and another row of the memory array is selected by bus 639, such that the data on bus 952 can be written into this row selected by bus 639. The columns in the block address memory module 920 are sorted. Every column in the function module has its own corresponding comparison module 924 for comparing the block offset BN2Y.

Except for the comparison module 924, the bit width of every function module and bus equals to entry width of the block address memory module 920. The comparison module 924 is a greater than comparator whose bit width is BN2Y. When the BN2Y on bus 950 of a column is greater than the BN2Y sent from bus 635, the output of the comparator is '1' in the column. When the BN2Y on bus 950 is less than or equal to the BN2Y sent from bus 635, the output of the comparator is '0'. When the output of the comparator is '0', selector 940 selects content of the entry on bus 950 of this column and puts the content on bus 952. When the output of the comparator is '1', the selectors in the column to the right select the data on bus 950 in the column containing the comparator. After the data is shifted by the shifter 926, the data is put on bus 952. That is, when the output of the comparator is '1', the controller shifts the data on bus 950 of this column to right one column.

When the output of the comparator in a column is '1' and the output of the comparator in the column to its left is '0', the column selects the data on bus 665 and the selected data is put on bus 952. Bus 952 sends the output of selector 940 to the block address memory module 920 in the same column. For example, the output of selector 976 is only sent to the memory module 970, and the output of selector 977 is only sent to the memory module 971. When the output of the comparator in certain column is '0', and the output of the comparator in the column to its right is '1', the control logic selects the data on bus 950 of this certain column, and the selected data is put on bus 954 and sent to the track table 610 and the offset address mapping module 618.

Assuming that the maximum offset address in every row of a L2 instruction block is '31' (that is, the range of the offset address is '0'~'31'), when a L2 instruction block is written into L2 cache 606, the block offset (BN2Y) 982 are all set to '32' (which is the maximum offset address of this row plus '1'). Now assume that the high bit (BN2X) on bus 639 is '81', which selects one row in the block address mapping module 620, on this row the BN2Y in the entries in the memory modules 970, 971 and 972 is '32'. The BN2Y sent in via bus 637 is '18' (it indicates that BN2 address '8118' is used in the match and sort). The comparison result of the comparison module 924 is that the outputs 973, 974 and 975 are all '1' (when the output 973 is '1', it indicates that there is no valid entry corresponding to the BN2Y on bus 637 in the block address memory module 920), controlling the selector 977 and the selector 978 in the multiplexer 940 to select input C, which connect to the outputs of the shifter 926, to drive bus 952. Whereas the selector 976 selects the data on bus 665 to drive bus 952. The data on bus 952 is written in the row which has been read out in the block address memory module 920. The result is that now the entry of the memory module 970 stores the data sent from bus 665, and the entry of the memory module 971 stores the data previously stored in the entry of the memory module 970. The entry of the memory module 972 stores the data previously stored in the entry of the memory module 971.

The BN2Y inputs of the corresponding comparators in the columns to the right (not shown in FIG. 8D) are all '32' (greater than '18'), so all the comparison results are '1', controlling shifting the data in the corresponding column to the right. That is, the column whose BN2Y is greater than the BN2Y of the new data is shifted to the right, such that the entries containing the new data is arranged in an ascending order according to the BN2Y value. The controller detects the output 973 of the left most comparator in the comparison module 924 to determine whether the input BN2Y has the corresponding L1 cache block. If the output 973 of the comparator is '1', it indicates that the input BN2Y has no corresponding L1 cache block. If the output 973 of the comparator is '0', it indicates that the input BN2Y has the corresponding L1 cache block.

Assuming that the above row is read out by '81' address on bus 639, the corresponding BN2Y values in the entries of the memory module 970, memory module 971 and memory module 972 are '18', '32', and '32'. These BN2Y values and the BN2Y value sent from bus 637 are compared by the corresponding comparators in the comparison module 924. The result shows that the comparator output 973 is '0'; the comparator output 974 of the and the comparator output 975 are '1'. The output 973 of the comparator makes that the selector 976 selects input A to put the data on bus 950 of the same column on bus 952; the output 974 of the comparator makes that the selector 978 selects input C, that is, the output of the shifter 926; the output 975 of the comparator makes that the selector in the column to its right selects input C, that is, the output of the shifter. The output 973 '0' and the output 974 '1' makes that the selector 977 selects input B, that is, data on bus 665. After the selected result is written back to the block address memory module 920, the BN2Y value of the entry in the memory module 970 is '18'; the BN2Y value of the entry in the memory module 971 is '27'; the BN2Y value of the entry in the memory module 972 is '32'; and the BN2Y of other entries on the right are all '32'. Therefore, the data in the entry are sorted according to the BN2Y value, and the corresponding L1 cache block numbers are also sorted according to the block offset in L2 cache block, such that the BN1 address of the corresponding host instruction can be obtained by mapping the BN2 address of the guest instruction.

Now assume a new BN2 address '8123' is received from bus 637 and bus 639. At this time, number '81' row is read out, and the BN2Y values in the entries of the memory module 970, memory module 971 and memory module 972 are '18', '27' and '32', respectively. The BN2Y value on bus 637 is '23'. After performing a comparison operation, the output 973 of the comparator 924 is '0', and the output 974 of the comparator 924 and the output 975 of the comparator 924 are '1'. At this time, only control signal 979 on the selector 954 is '1' (signal 979 is XOR of the output 973 and the output 974).

The content on the entry of the memory module 970 is put on bus 954 and sent to the block offset mapping logic (including the block offset mapping module 618, the offset address converter 622 and the subtractor 928). The L1 cache block number BN1X in the content is used as an address to read out the mapping relationship of the row corresponding to the L1 cache block from the offset mapping module 618. The mapping relationship is sent to the offset address converter 622.

The BN2Y (the block offset of the L2 cache block) on bus 637 subtracts the BN2Y on bus 954 (that is, the starting address of the level two sub cache block corresponding to the L1 cache in the L2 cache block) by the subtractor 928. The subtraction result (23−18=5) is the net address offset of the BN2Y on bus 637 in the level two sub cache block. Based on the address offset and the mapping relationship, the offset address converter 622 can obtain the corresponding block offset BN1Y of the L1 cache block. The BN1X on bus 954 and this BN1Y are spliced to obtain the L1 cache address BN1 corresponding to the L2 cache address '8123'. The BN1 can be put into the entry in track table 610 to be referenced by the tracker.

The following descriptions refer to FIG. 6, FIG. 8D, and FIG. 9A~9F. FIGS. 9A~9F shows the operating process of the embodiment shown in FIG. 6.

FIGS. 9A~9F illustrate the corresponding contents in the block address memory module 920, L2 cache 606, the offset address mapping module 618, the track table 610 and L1 cache 602 when the program is running. Every row in the block address memory module 920 corresponds to a L2 cache block in L2 cache 606, and a guest instruction block address in the active list 604. One row in the offset address mapping module 618 and one row in the track table 610 correspond to a L1 cache block in L1 cache 602. The active list 604 in FIG. 6 also allocates L2 cache blocks in L2 cache 606 for recently fetched guest instruction blocks according to the replacement policy. The replacement module 611 is configured to allocate L1 cache blocks in L1 cache 602 for the host instructions according to the replacement policy. The shadow area shown in FIGS. 9A~9F represents the filled host instructions.

The addressing address of L2 cache 606 is BN2, and its format if '8XYY', where '8X' is the block address BN2X. For illustrative purposes, the L2 cache 606 is a set-associative cache. The index address is the block address of L2 cache 606, (the value is '80'~'82'), and the corresponding tag (that is, a block address) is stored in the active list row having the same index address. Every L2 cache block in L2 cache 606 has 32 bytes, the block offset BN2Y is the block byte address 'YY', and its value is '0'~'31'. L2 cache 606 stores variable length guest instructions. Every division li shown in FIGS. 9A~9F represents a guest instruction having different length. The length of the guest instruction in one embodiment is from 2 bytes to 8 bytes.

L1 cache 602 is a fully-associative cache under the control of the track table 610 and the block address memory module 920. The address of L1 cache 602 is BN1, and its format is '7XY', where '7X' is the block address BN1X, and its value is '70'~'75'. Every L1 instruction block in L1 cache 602 has 4 fixed length host instructions. The block offset BN1Y is the block word address 'Y'. In order to make it easily understandable and distinguishable from BN2Y, the value BN1Y can be tagged using A~D. In one embodiment, the length of one host instruction is a word. The host instruction may have other length. Every row of the track table 610 has also 4 entries A~D corresponding to the four host instructions A~D in L1 cache 602. Every row of the track table 610 also has an entry E for storing the address of the next instruction block. Every entry in the track table 610 stores an instruction type. The tracker determines the address of the next step based on the instruction type. The entry can also store a pointer pointing to the target address of the instruction represented by the entry. The format of the target address may be BN2 or BN1. Every row in the offset address mapping module 618 corresponds to one L1 cache block and one row in track table.

Every row in the block address memory module 920 corresponds to one cache block in L2 cache 606. Every row of 920 includes a plurality of entries (such as R, S, T, U, V). Every entry corresponds to a L1 instruction block in the L1 cache. The content of every entry of the block addresses memory module 920 contains the block address BN1X of the corresponding L1 cache block, and the address BN2Y of the guest instruction in the L2 cache block corresponding to the first host instruction in L1 cache block. When the L2 cache block is written, the BN2Y address in the corresponding row of the block address memory module 920 are all reset to '32', representing the first byte of the next L2 cache block.

Figure 9A:
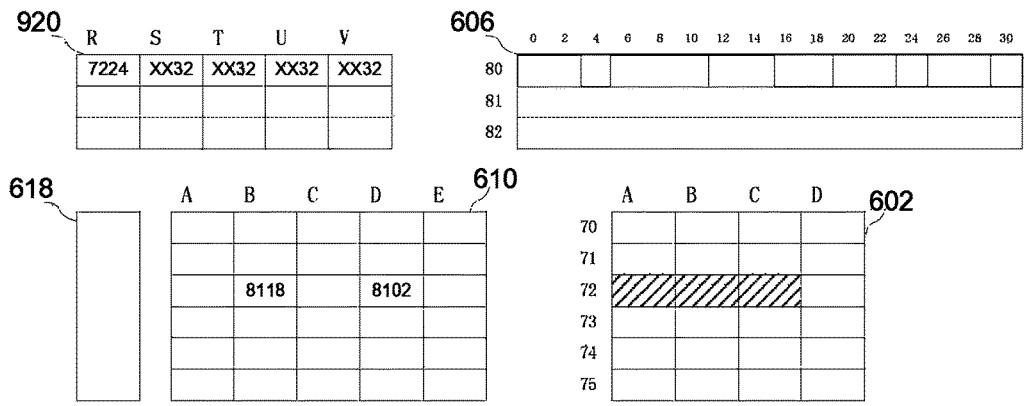
FIGS. 9A—9F illustrate the operating process of a processor system containing multiple-level caches consistent with the disclosed embodiments.
Figure 9B:
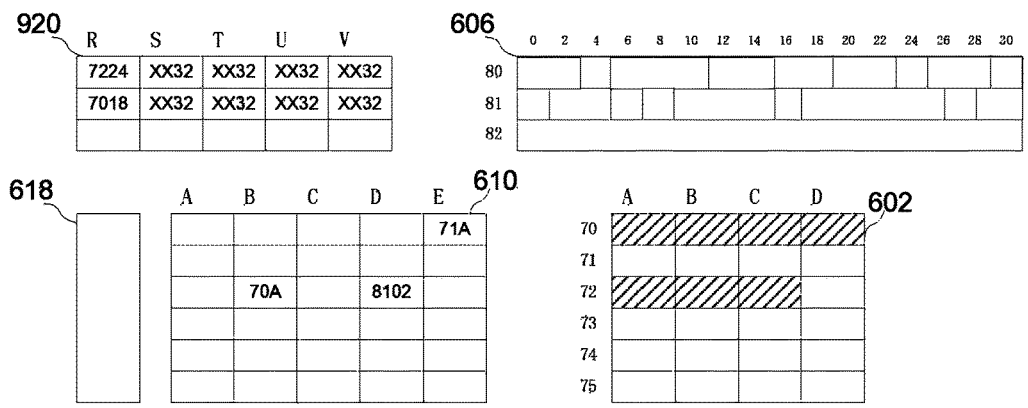
Figure 9C:
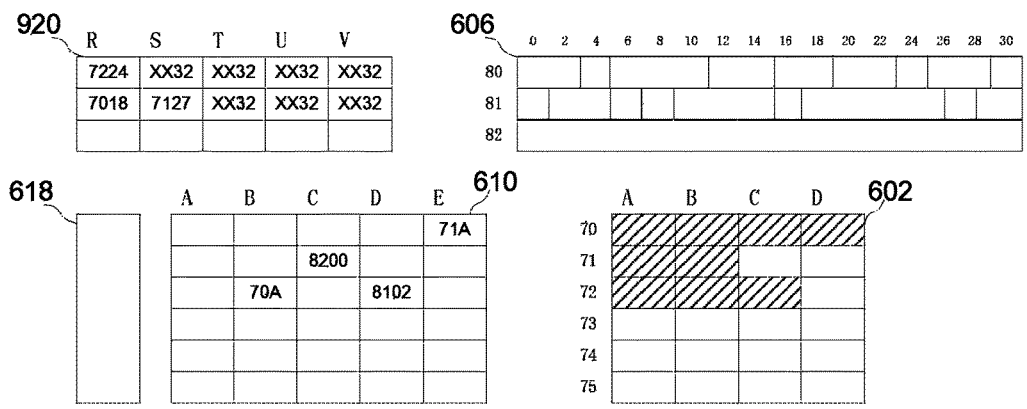
Figure 9D:
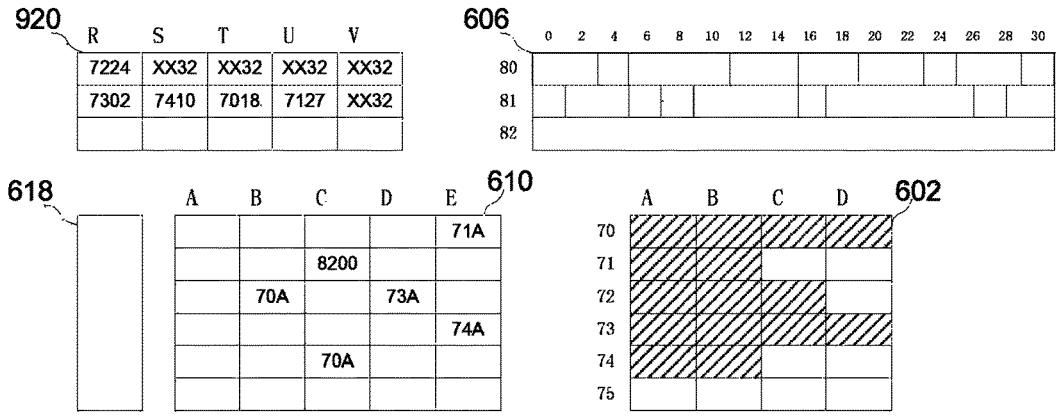

FIG. 9A shows a starting state. At this time, the L2 cache block '80' in L2 cache 606 is filled, while the L2 cache blocks '81' and '82' are not yet filled. The guest instruction starting from number '24' byte in the L2 cache block '80' is converted to the host instruction format by the scan converter 608 and then is filled into the L1 cache block '72' in L1 cache 602 via bus 667 in order. The bytes '24'~'25' in the L2 cache block '80' is a guest instruction, and its corresponding host instruction is filled into entry A of the L1 cache block '72'. The bytes '26'~'29' in the L2 cache block '80' is a guest instruction, and its corresponding host instruction is filled into entry B of the L1 cache block '72'. Four bytes starting from byte '30' in the L2 cache block '80' is a guest instruction, and its corresponding host instruction is filled into entry C of the L1 cache block '72'.

During the conversion, the scan converter 608 finds that the guest instruction starting from '26' byte in the L2 cache block '80' is a branch instruction, the scan converter 608 calculates the branch target by adding the cache block address stored in the active list 604, the block offset '26' and the branch offset together. The most significant bits of the branch target is sent to active list 604 via bus 657 to perform a matching operation. If there is a miss in the matching, the active list 604 allocates a new L2 cache block (cache block '81', i.e., BN2X is '81'); the active list 604 also send the most significant bits of the branch target to a lower level memory to read out the corresponding guest instruction block and the corresponding guest instruction block is stored in the L2 cache block '81'. The BN2Ys in '81' row in the scan converter 608 are all reset to '32'. The active list 604 sends out the recently allocated L2 cache block number '81' via bus 671. The cache block number '81' and the low bit of the branch target on bus 657 outputted by the scan converter 608 are spliced to a BN2 address on bus 687. The scan converter 608 also obtains the address '72B' (that is, the second word in the L1 cache block '72') of the host instruction corresponding to the guest instruction '8026' (that is, byte '26' in the L2 cache block '80'). Therefore, the address bus 669 of the scan converter 608 points to the entry in '72' row and B column of the track table 610. The entry is written in content sent via bus 687. Therefore, the content in the entry '72B' of the track table is BN2 address '8118'.

The low bit (BN2Y value is '18') of the branch target on bus 657 is selected by selector 638 and put on one input 637 of the comparison module 924 to compare with the contents of the entries from row '81' (the BN2X '81' allocated by the active list 604 is selected by selector 640 and sent via bus 639) of the block address memory module 920. The comparison result shows that the value '18' is less than the contents of all entries (that is, '18'<'32'). Therefore, BN1X value ' 72' and BN2Y value '18' (the branch target guest instruction whose address is byte '18' is written into the first memory block of the L1 cache block '72') are written into entry R of row '81' in the block address memory module 920. At this time, the value R is '7218'.

The scan converter 608 resumes the conversion until byte '30' of the L2 cache block '80' is reached in L2 cache 606. The scan converter 608 finds that the length of the instruction is 4 bytes (2 bytes beyond the block). Therefore, the address '30' (block offset) of the current L2 cache block adds '4' (instruction bytes) to generate the address of the next guest instruction block. The address of the next guest instruction block is sent to the active list 604 via bus 657 to perform a matching operation. If it is found that the guest instruction block is in the L2 cache block '81' (or being loaded from the lower level memory into the L2 cache block '81'), the scan converter 608 reads out data from the L2 cache block '81' to complete the conversion of the guest instruction starting from byte '30' of the L2 cache block '80'. The host instruction obtained by the conversion is filled into entry C of the L1 cache block '72' in order. Because it is the last guest instruction in the L2 cache block '80', the scan converter 608 needs to provide the address of the next instruction for the track table 610. At this point, the BN2X address obtained by the matching operation is sent out by the track table 604 via bus 671. The BN2X and the low bit of BN2Y (30+4=34, discarding the part greater than 32 bytes and obtaining the value '2') on bus 657 are combined to a BN2 address '8102' on bus 687. In one embodiment, the way for processing the instruction flow from the last instruction of one instruction block to the next instruction is considered as an unconditional branch instruction. That is, the BN2 address on bus 687 is considered as a target address and put in the entry after the last instruction (address '72C') of an instruction block in the track table, and the instruction type is set as unconditional branch. Therefore, the scan converter 608 via bus 661 sends out the address whose value is '72D', controlling that the BN2 address '8102' is written into the entry D of row '72' in the track table.

The tracker 614 reads the content of the track table starting from entry A in row '72' of the table. Because entry A in row '72' is not a branch instruction, the tracker 614 continues to read the content to the right. When the tracker 614 reads address '8118' from entry B of row '72' and determines that it is a BN2 address, the BN2 address is sent via bus 631 to the block address memory module 920 and L2 cache 606. The BN2 address reads out the content of the entry in row '81' of the block address memory module 920. The control logic finds that all L1 cache block numbers in row '81' of the block address memory module 920 are invalid. Therefore, the control logic determines that the guest instructions corresponding to the BN2 address are not yet converted to the host instruction. The control logic controls L2 cache 606 to read out in order the guest instructions in the L2 cache block '81' starting from the address '8118' until the address '8131' (the last byte of '81' block). The guest instructions are provided for the scan converter 608 for conversion.

The scan converter 608 also requests a replaceable L1 instruction block number from the replacement module 611. The replacement module 611 follows certain replacement policy, such as LRU replacement algorithm, to determine the replaceable L1 memory block, which are '70', '71', '73', '74', and '75' in order. Therefore, number '70' L1 memory block is provided for filling. Therefore, the scan converter 608 converts the guest instructions starting from the address '8118' in L2 cache 606 to the host instructions. The host instructions are filled in order into entries A, B, C and D of memory block '70' in L1 cache 602. The BN1 address '70A' is written to the '72B' entry of the track table 610, replacing the previous BN2 address '8118'. It is assumed that the host instructions corresponding to the guest instructions starting from the address '8118' in L2 cache are stored in the L1 cache block starting from '70A', referring to FIG. 9B.

The scan converter 608 finds that entry D of the L1 cache block '70' is filled, and the conversion of the instructions whose addresses are '8118'~'8131' in the L2 cache block '81' is not completed (the guest instructions before the instruction whose address is '8126' are converted). Therefore, the scan converter 608 requests a replaceable L1 instruction block number from the replacement module 611. The replacement module 611 provides number '71' L1 memory block. The controller writes the BNX value '73A' generated by the replacement module 611 and the unconditional branch instruction type '71A' (the address of the first instruction in the L1 cache block '71') generated by the controller into entry E of row '70' in the track table 610, such that when the tracker 614 reads out this entry, it jumps to the first instruction of cache block '71'. The scan converter 608 continues to convert the guest instructions and fills the converted instructions in order into the L1 cache block '71'. The scan converter 608 stores the block offset address BN2Y of the first byte of the guest instructions whose address are '8118'~'8126' and the block offset address BN1Y of the corresponding host instruction into the row '70' pointed to by the read pointer 631 of the tracker in the block offset mapping module 618 using the format shown in FIG. 7B.

The BN2Y value '27' sent from bus 657 is sent to the comparison module 924 to compare with the entries of row '81'. The comparison result shows that the BN2Y value is greater than BN2Y value '18' in R entry, but less than BN2Y values (e.g., '32') of S entry and other entries. The value '7127' is filled into S entry of row '81' in the block address memory module 920. The value '7018' of R entry is kept unchanged. The values of the entries T, U and V are shifted one entry to the right.

Because the scan converter 608 does not find the branch instruction in the guest instructions whose addresses are '8118'~'8131', the entries A, B, C and D of row '70' in the track table 610 do not contain records of the branch target. The scan converter 608 finds that the guest instructions starting from byte '26' in row '81' ends at byte '31' (the guest instructions do not extend to the next instruction block), and the host instruction corresponding to the guest instruction ends at B entry of cache block '71'. Therefore, the address '8200' of the next guest instruction obtained by calculating, matching and allocating is stored in C entry of row '71' in the track table 610. The track table 604 reads out the corresponding guest instruction block of the L2 cache block '82' from the lower level memory to fill the L2 cache block '82'. The details may refer to the embodiments in FIG. 9C.

The processor core executes the branch instruction corresponding to entry '72B' of the track table. The branch decision result via signal 635 is sent to the tracker 614. At this point, the result shows the branch is not taken. The tracker 614 moves to the next track point '72C' of the same row in the track table to read out the content and finds that the instruction is a non-branch instruction. Then, the tracker moves to the next entry '72D' to read out the content and finds that it is an unconditional branch address whose target is '8102'. The controller determines that the address is a BN2 address, and the BN2 address is sent out via bus 633. The higher bits in bus 633 is sent to the block address mapping module 920 to read out the contents of the entries in row '81' in block address mapping module 920. The contents of 920 are sent to one set of input ports of the comparison module 924. The lower bits (the value is '02') on bus 633 is selected by selector 638 and sent to another set of input ports 637 of the comparison module 924 to perform a comparison operation. The comparison result shows that the BN2Y value on input port 637 is less than the values in all entries. Based on the comparison result, the control logic determines that the host instruction corresponding to the guest instruction whose BN2 address is '8102' is not stored in the L1 instruction block. The control logic controls L2 cache 606 to send the guest instructions starting from the BN2X address '81' sent from bus 633 and the address '00' sent from bus 679 to the scan converter 608 to convert the guest instructions to the host instructions.

The scan converter 608 requests and obtains the L1 cache block '73' for filling the host instructions obtained by the conversion. At the same time, because the BN2Y address '02' on bus 637 is less than the contents of all entries in row '81', similar to the previous embodiment, the value '7302' (representing that the host instruction corresponding to the guest instruction whose BN2Y is '02' is placed into the L1 instruction block '73') is placed in entry R of row '81', whereas all entries of the previous row '81' are shifted one row to the right. The BN2Y value '18' of the entry in which the new value is written in (R entry in this case) is sent to the scan converter 608, informing the scan converter 608 that the conversion ends at the byte prior to '18' byte (that is, '17' byte).

When the host instructions obtained by the conversion are filled into the L1 cache block '73', the BNX value '73A' generated by the replacement module 611 and the unconditional branch instruction type generated by the controller are written into entry '72D' of the track table 610, and the BN2 value '8102' is replaced by the BN1 value '73A'. At this time, the read pointer 631 of the tracker 614 still points to the entry '72D', so '73A' value is read out from bus 633. The control logic determines that the value is a BN1 value. Therefore, the control logic controls L1 cache to read out the corresponding host instruction using the address '73A' for processor core 601 execution.

When the scan converter 608 converts the guest instruction ending at byte '9' of row '81', and finds that the L1 instruction block '73' is filled up to entry D, the scan converter 608 requests and obtains a L1 instruction block '74' to resume the conversion and fill the guest instructions starting from byte '10'. Similar to the previous embodiment, the BNX value '74A' generated by the replacement module 611 and the unconditional branch instruction type generated by the controller are filled into the entry E of row '73' in the track table 610. The BN2Y value '10' sent from bus 657 is sent to the comparison module 924 to compare with the entries of row '81'. The comparison result shows that the BN2Y value is greater than the BN2Y value '02' in entry R, but is less than the BN2Y value '18' in entry S and the BN2Y value in other entries. According to previous embodiment, the value '7410' is filled into entry S of row '81' in the block address memory module 920. The entry of R is kept unchanged. The values of the entries T, U and V are shifted one entry to the right.

The scan converter 608 continues to convert the guest instructions and fill guest instructions into the L1 cache 602. The guest instruction ending at byte '17' is filled into B entry in the L1 cache block '74'. At this point, the scan converter 608 finds the limiting value '18' previously sent by the comparison module 924, and a matching operation is performed on row 81 of the block address memory module 920 using the limiting value '18' to obtain '70'. That is, the unconditional branch instruction type '70A' is stored in entry C of row '74' in the track table 610. Another method is to store the BN2 address '8118' into entry C of row '74' in the track table 610 for the corresponding mapping operation when the tracker reads out the address '8118'. The details may refer to FIG. 9D.

When the instruction is converted and filled into L1 cache 602, the tracker 614 moves forward along number '73' track. Because the entries '73B', '73C', and '73D' in the track table are non-branch instructions, the tracker 614 does not stop at these entries. The tracker 614 reads out the unconditional branch instruction target '74A' from entry '73E'. That is, the tracker 614 jumps to row '74' and moves forward from entry A. The tracker 614 reads out the unconditional branch instruction target '70A' from entry '74C'. That is, the tracker 614 jumps to row '70' and reads out the unconditional branch instruction from entry '70E', and its target is '71A'. The tracker 614 jumps to row '71' to move forward and read out the content of the entry '71C', where the content is the unconditional branch instruction and the target is '8200'. The controller determines that the target is the address of the L2 cache block. Then, the address via bus 631 is sent to the block address memory module 920 to perform a matching operation. It is found that the L2 cache block '82' does not have a valid L1 cache block. Based on the matching result, the scan converter 608 starts to convert all guest instructions in cache block '82' to the host instructions and fill the host instructions into the L1 cache blocks starting from the L1 cache block '75' provided by the replacement module 611 in L1 cache 602. At the same time, the scan converter 608 also fills the instruction type extracted during the conversion and the branch target obtained by calculation into the corresponding entry in the track table 610. The controller controls to write the BN1 address '75A' generated by the replacement module 911 and the unconditional branch instruction type entry '71C' pointed to by the tracker 614 in the track table 610. The new content of the entry is read out from the track table and sent to L1 cache 602 via bus 631. Then, the host instructions are read out for processor core 601 execution.

Figure 9E:
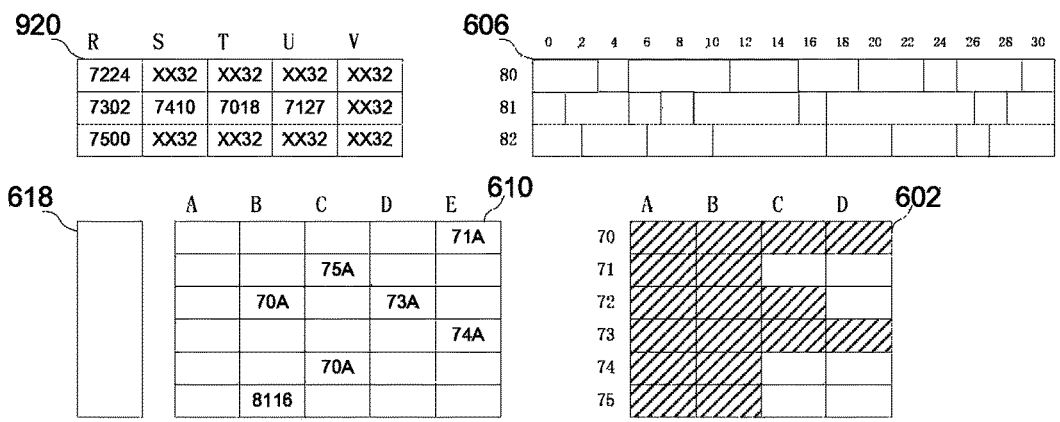
Figure 9F:
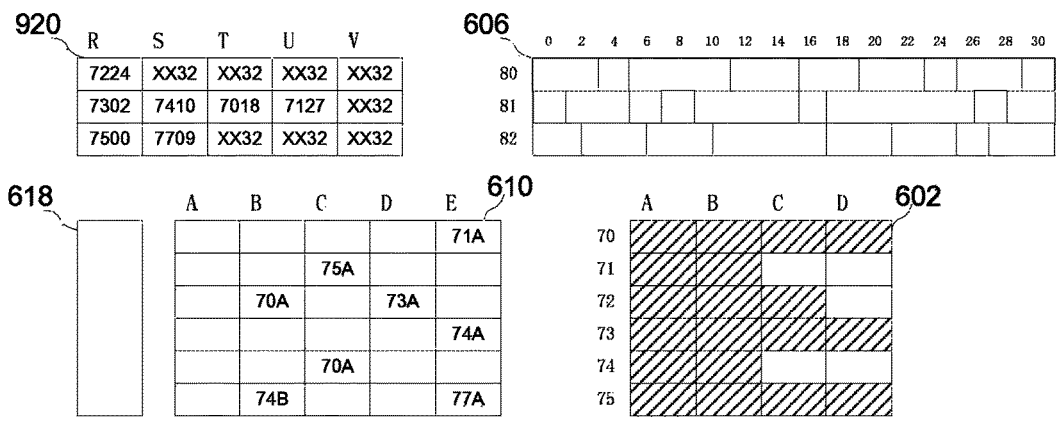

Referring to FIG. 9E, the tracker 614 moves forward along row '75' and finds a conditional branch instruction at '75B'. The target is '8116'. The BN2 whose value is '8116' is sent to the block address memory module 920 to perform a matching operation. The result shows that the BN2Y value '16' is greater than the BN2Y value '10' in entry S of row '81', but is less than the BN2Y value '18' in entry T.

After comparing by the comparison module 924, the output 973 and the output 974 are all '0', and the output 975 is '1'. At this time, for control signals of the selector 954, only signal 981 is '1' (signal 981 is XOR of the output 974 and the output 975). The content '7410' in the entry of the memory module 971 is put on bus 954 and sent to the block offset mapping logic (containing the offset mapping module 618, the offset address converter 622 and the subtractor 928). The L1 cache block number BN1X in the content of the entry is used as an address to read out the mapping relationship from row 74 of the offset mapping module 618. The mapping relationship is sent to the offset address converter 622. The BN2Y (the block offset of the L2 cache) on bus 637 subtracts the BN2Y (the starting address of the level two sub cache block corresponding to L1 cache in the L2 cache block) on bus 954 by the subtractor 928. The subtraction result (16−10=6) is the net address offset of BN2Y on bus 633 in the L2 sub cache block. Based on the net address offset and the mapping relationship, the offset address converter 622 can obtain the corresponding block offset BN1Y of the L1 cache block. The BN1X on bus 954 and the BN1Y are spliced to obtain the L1 cache address BN1 value '74B' corresponding to the L2 cache address '8116'. The BN1 value can be put into entry '75B' of the track table to replace the original value '8116', such that the tracker 614 can control L1 cache 602 to read the instructions based on this BN1 and the feedback of processor core 601. The scan converter 608 continues to convert the guest instructions on row '82' of L2 cache 606. After the L1 cache block '75' is filled, the cache block '77' is allocated as the next cache block. The details may refer to FIG. 9F.

After the branch instruction address needed by the tracker is converted from BN2 to BN1 in the track table, once the tracker 614 reads out the equivalent value, the tracker can directly control the L1 instruction cache to provide instructions for processor core 601 continuously.

In addition, the processor system can support not only different guest instruction sets corresponding to the processor platforms, but also bytecode instruction sets (binary code instruction set) corresponding to the virtual machines, such as bytecode instruction using JAVA™ interpreter. At this point, a byte-code instruction can be converted to one or multiple host instructions for the processor core execution by using the above method. Due to the particularity of the bytecode instruction, certain modification can be made during the conversion to improve the performance. For example, for a bytecode instruction that requires a constant, because the constant is stored in the constant pool of the memory, the instruction can be converted to one data reading instruction and the corresponding operation instruction according to the previous method. However, when the scan converter examines and finds that the bytecode instruction is the instruction that reads the constant, the constant can be filled from the memory into the data buffer in advance. Thus, when the processor core executes the first host instruction (that is, the data load instruction) corresponding to the bytecode instruction, a cache miss does not occur due to loading data.

Further, when the constant is read out from the memory in advance, the constant can be embedded in the corresponding host instruction (that is, the operation instruction) as an immediate instruction format, thereby omitting the data load instruction. Thus, when the processor core executes the host instruction corresponding to the bytecode instruction (that is, the operation instruction embedded with the constant), the operation can be performed directly, further improving the performance of the processor system.

In addition, the stack operation instruction in the bytecode instruction can still be converted to the corresponding host instruction for processor core execution using the same method, thereby avoiding the steps for translating the bytecode instruction to the machine code instruction. As used herein, one stack operation can be converted to one host instruction. The operands of the host instruction are not register values in the register file, but the operands of the host instruction are register values on the top of the operand stack. At this point, the control logic can be added for the existing register files in the processor core, such that the register file can be used as stack registers.

Figure 10A:
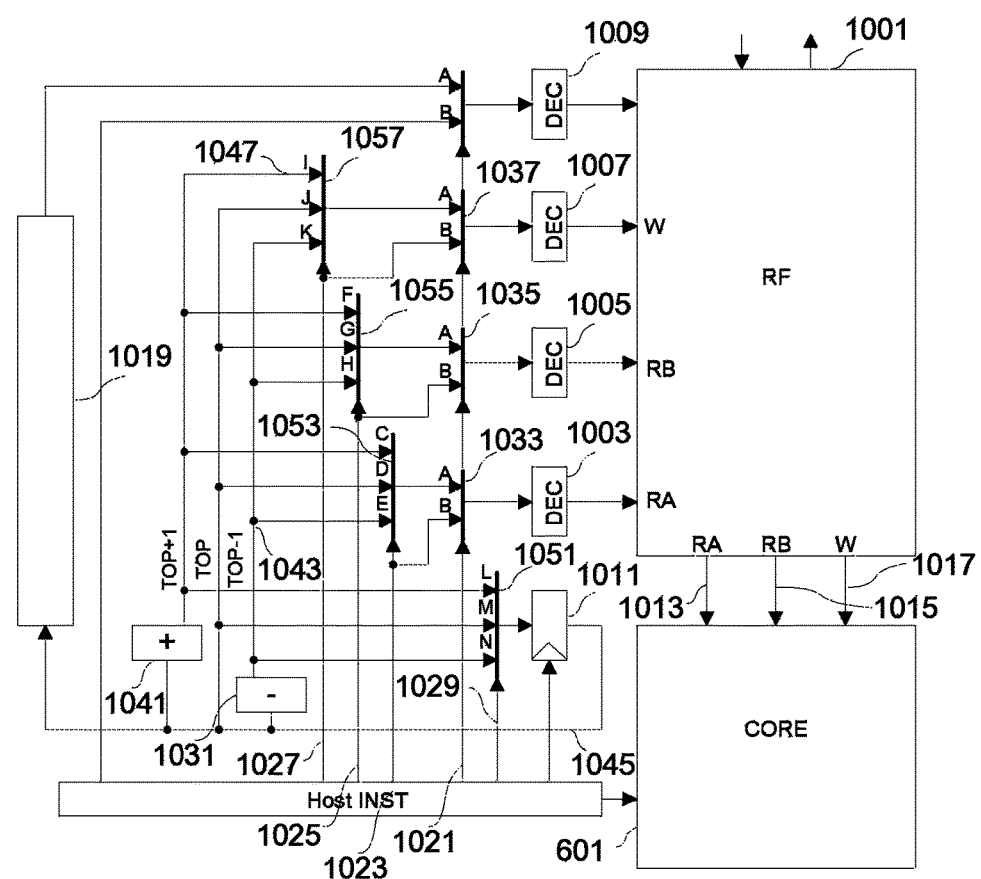
FIG. 10A illustrates a schematic diagram of an exemplary operand stack consistent with the disclosed embodiments.

FIG. 10A illustrates a schematic diagram of an exemplary operand stack consistent with the disclosed embodiments. In one embodiment, a stack operation needs at most two operands and one operation result is obtained. All other situations can use the same manner.

As shown in FIG. 10A, register file (RF) 1001 supports two read operations and one write operation at the same time. The decoder 1003 and the decoder 1005 decode respectively the two register numbers, and then send the decoded results to the first read port and the second read port to read out the corresponding register values from bus 1013 and bus 1015. The decoder 1007 decodes the register number of the register to be written in and sends the decoded result to the write port, such that the value on bus 1017 can be written into the corresponding register. The register 1011 stores the value of the top of stack (TOS) pointer, that is, the register number of the register pointed to by the TOS when the register file is used as an operand stack. The value in register 1011 via bus 1045 is sent to selector 1053, selector 1055, selector 1057, decrementer 1031, incrementer 1041 and controller 1019. The decrementer 1031 and the incrementer 1041 subtracts one and adds one operation for the TOS value sent from bus 1045, respectively. The corresponding results are sent to selector 1053, selector 1055 and selector 1057 via bus 1043 and bus 1047. Because the capacity of the register file 1001 is limited, if the register file is full or nearly full when the register file is used as the operand stack (that is, the distance between the TOS pointer and the bottom of stack (BOS) pointer reaches a certain level), a part of operands need to be stored in an external memory (or cache) in order, and the BOS pointer is moved, such that this part of register can store the operands that are recently pushed into the stack, thereby forming a structure similar to a circular buffer. Similarly, if the operand stack is empty or nearly empty (that is, the distance between the TOS pointer and the BOS pointer reaches a certain level), the operands previously stored in the external memory (or cache) need to be filled back in the operand stack in reverse order, and the BOS pointer moves at the same time, such that the operand stack can continue to provide the operands. In one embodiment, the controller 1019 generates a new BOS pointer value based on the TOS pointer value. After the new BOS pointer value is decoded by the decoder 1009, the new BOS pointer value controls the register file 1001 to store the register values between the previous BOS pointer value and the new BOS pointer value into the external memory, or fill the corresponding operands from the external memory into the registers between the previous BOS pointer and the new BOS pointer in the register file 1001.

Accordingly, there is an instruction field in the host instruction which represents whether the host instruction is a register operation instruction or a stack operation instruction. The value of the instruction field is sent to selector 1033, selector 1035 and selector 1037 via the control line 1021. When the host instruction is a stack operation instruction, selector 1033, selector 1035 and selector 1037 all select input A and send the input A to decoder 1003, decoder 1005 and decoder 1007, respectively. When the instruction is a register operation instruction, selector 1033, selector 1035 and selector 1037 all select input B and the input B is sent to decoder 1003, decoder 1005 and decoder 1007, respectively.

In this way, if a host instruction is a register operation instruction, two source register numbers and one target register number are respectively sent to selector 1033, selector 1035 and selector 1037 via bus 1023, bus 1025 and bus 1027, respectively. After the two source register numbers and the one target register number selected by selector 1033, selector 1035 and selector 1037 and decoded by decoder 1003, decoder 1005 and decoder 1007, and addressing the register file. Therefore, the values can be read out from and written into the registers files entries. The operations are similar to the existing technique, which is not repeated herein.

If a host instruction is a stack operation instruction, the three instruction fields for storing the register numbers are used to store the TOS pointer moving information. For example, for a stack operation instruction that takes two operands from the top of the stack to operate and stores the result back to the top of the stack minus 1, the register number corresponding to one of the operands is the value of the TOS pointer stored in register 1011; and the register number corresponding to the other operand is the value of the TOS pointer minus 1. That is, the two operands on the top of the stack are popped, the operation results are pushed back to the top of the stack. At this time, the selector 1053, under the control of the instruction field on bus 1023, selects input D (that is, the current TOS value) to read out the first operand from the register file. The selector 1055, under the control of the instruction field on bus 1025, selects input H (that is, the current TOS value minus 1) to read out the second operand from the register file. The selector 1057, under the control of the instruction field on bus 1027, selects input K (that is, the current TOS value minus 1). After the input K is decoded, the register that is being written back is selected. At the same time, the selector 1051, under the control of the instruction field on bus 1029, selects input N (that is, the current TOS value minus 1). The input N is written back to register 1011 as new TOS value, thereby completing the update of the TOS pointer.

For another example, for an instruction that pushes an operand into an operand stack, the selector 1057, under the control of the instruction field on bus 1027, selects input I (that is, the current TOS value plus 1). After the input I is decoded, the corresponding register that the operand is written back is selected, thereby realizing the push operation. At the same time, selector 1051, under the control of the instruction field on bus 1029, selects input I (that is, the current TOS value plus 1). The selected input I is written back to the register 1011 as a new TOS pointer value, thereby completing the update of the TOS pointer.

For another example, for an instruction that pops an operand from an operand stack, the selector 1053, under the control of the instruction field on bus 1023, selects input D (that is, the current TOS value). After the input D is decoded, the corresponding register is selected to read out the operand, thereby realizing the pop operation. At the same time, selector 1051, under the control of the instruction field on bus 1029, selects input N (that is, the current TOS value minus 1). The selected input N is written back to the register 1011 as a new TOS pointer value, thereby completing the update of the TOS pointer.

In addition, the controller 1019 stores the current BOS pointer value, and judges the current TOS pointer value sent from register 1011. If the BOS pointer value is close to the TOS pointer value to a certain extent, it indicates that the operand stack is nearly empty. If the operands have been previously stored into the external memory (or cache), a certain number of operands need to be taken out from the external memory (or cache) to fill in the register files in a region beyond the bottom of the stack, and the BOS pointer value is updated. Accordingly, if the BOS pointer value is far away from the TOS pointer value to a certain extent, it indicates that the operand stack is nearly full. A certain number of operands at the bottom of the stack need to be taken out and stored in the external memory (or cache), and the BOS pointer value is updated.

Figure 10B:
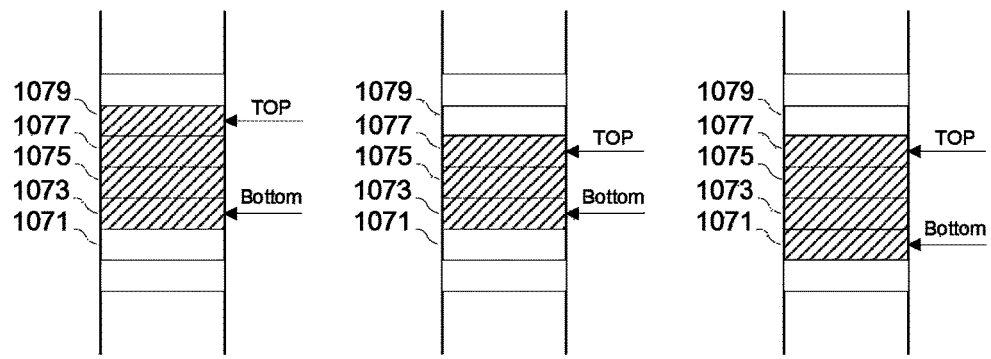
FIG. 10B shows an exemplary process for updating the bottom of stack (BOS) consistent with the disclosed embodiments.

FIG. 10B shows the process for updating the BOS consistent with the disclosed embodiments. As shown in FIG. 10B, it is assumed that when the difference between BOS pointer value and the TOS pointer value is '3', it indicates that operand stack is nearly empty, and one operand is filled each time. At some point, the BOS pointer points to register 1073, and the TOS pointer points to register 1079. When a pop operation is performed, the TOS pointer points to register 1077. At this time, the difference between the BOS pointer value and the TOS pointer value is '3'. The controller 1019 sends a signal to take out the last operand that is previously stored in the external memory (or cache). The operand is then filled in the register whose position is the BOS pointer value minus 1 (that is, register 1071). At the same time, 1 is subtracted from the BOS pointer value, such that the BOS pointer points to the register 1071 and the number of operands in the operand stack is greater than '3'.

Figure 10C:
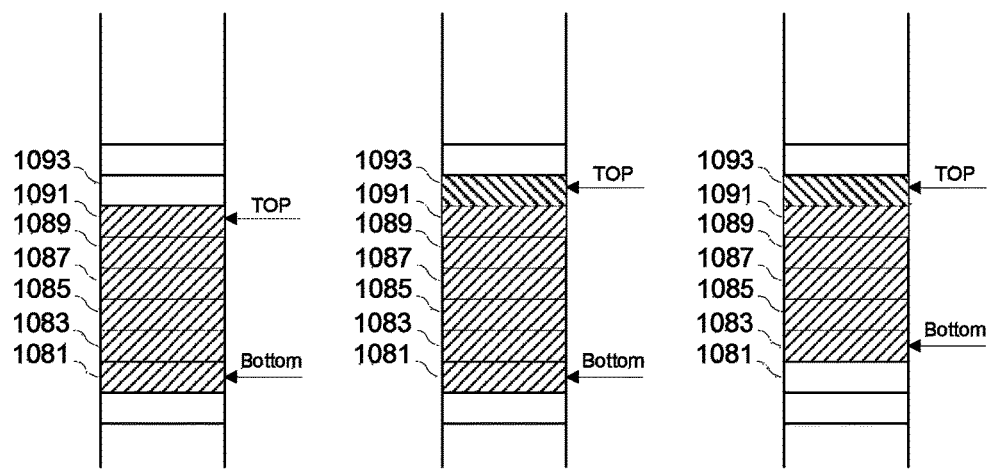
FIG. 10C shows another exemplary process for updating the BOS consistent with the disclosed embodiments.

FIG. 10C shows another process for updating the BOS consistent with the disclosed embodiments. In one embodiment, it is assumed that when the difference between the BOS pointer value and the TOS pointer value is '7', it indicates that operand stack is nearly full, and an operand is stored in the external memory (or cache) each time. At some point, the BOS pointer points to register 1081, and the TOS pointer points to register 1091. When a push operation is performed, the TOS pointer points to register 1093. At this time, the difference between the BOS pointer value and the TOS pointer value is '7'. The controller 1019 sends a signal to store the operand pointed to by the BOS pointer in the external memory (or cache). The BOS pointer value adds 1, such that the BOS pointer points to the register 1083, keeping that the number of operands in the operand stack is less than '7'.

The method for filling or storing multiple operands each time is similar to the method described in FIG. 10B and FIG. 10C, which is not repeated here. In addition, through judging the difference between the BOS pointer value and the TOS pointer, whether the operand stack is nearly empty or nearly full can be determined. However, whether the operand stack is nearly empty or nearly full can also be determined by judging the change of the TOS pointer value. For example, since BOS pointer value is adjusted the last time, if the cumulative increase or cumulative decrease of the TOS pointer value reaches a certain level, the corresponding operation can be performed.

In the embodiment shown in FIG. 7A, the ending track point is considered as an unconditional branch point. Therefore, when the read pointer 631 of the tracker points to the track point (that is, the last instruction in the instruction block) before the ending track point, and the track point is not a branch point, or the branch point that the branch is not taken, the read pointer 631 of the tracker continues to update and move to the ending track point. The BN1 is outputted and sent to L1 cache 602. Because the ending track point does not correspond to a real instruction, and the read pointer 631 of the tracker is updated to the first track point of the next track in the next cycle, in this clock cycle, L1 cache 602 also needs to output an empty instruction (the instruction that does not change the internal status of the processor core, such as NOP) for processor core 601 execution.

In this disclosure, the addressing address sent to L1 cache 602 can be judged. When finding that the addressing address corresponds to the ending track point, there is no need to access L1 cache 602, and the empty instruction can be directly outputted for processor core execution. However, the processor core needs to take one more clock cycle to execute the empty instruction. Therefore, the structure shown in FIG. 7A can be modified, such that when the read pointer 631 of the tracker points to the track point before the ending track point, based on the instruction type of the track point and the feedback generated from the instruction executed by processor core 601, the read pointer 631 can directly point to the branch target track point or the first track point of the next track in the next clock cycle.

Figure 11A:
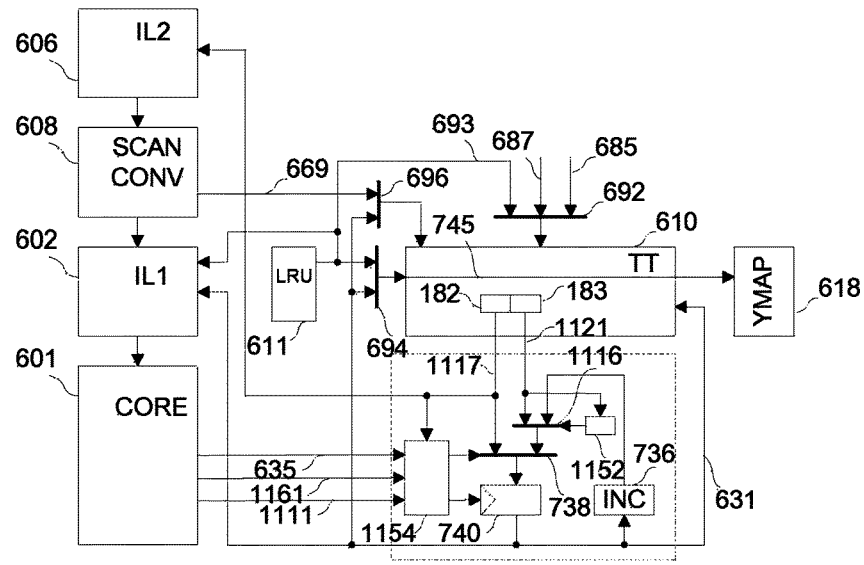
FIG. 11A illustrates a schematic diagram of an exemplary cache structure based on a track table consistent with the disclosed embodiments.

FIG. 11A illustrates a schematic diagram of another exemplary cache structure based on a track table consistent with the disclosed embodiments. In one embodiment, processor core 601, L1 cache 602, the scan converter 608, L2 cache 606, the replacement module 611, the offset mapping module 618, selector 692, selector 696, and selector 694 are the same as the corresponding components shown in FIG. 7A. The difference is described in the followings. The track table 610 outputs the contents (the content 1182 of the track point pointed to by the read pointer 631 of the tracker and the content 1183 of the next track point) of two track points each time, and a type decoder 1152, a controller 1154 and a selector 1116 are added in the tracker. The controller 1154 can perform the functions similar to the functions of the controller not shown in FIG. 7A. For illustrative purposes, the controller 1154 is showed in FIG. 11A.

In one embodiment, the read port of the track table 610, under the addressing operation of the read pointer 631 outputted by the tracker, outputs the contents of two adjacent track points. The contents of the two adjacent track points are put on bus 1117 and bus 1121. The controller 1154 detects the type of the instruction on bus 1117. The type decoder 1152 detects the type of the instruction on bus 1121. At any time point, two entries are read out from the track table 610, that is, the current entry 1182 and the next (right) entry 1183. The content in the current entry is read out 1182 via bus 1117 and sent to one input of selector 738 and the controller 1154. The next entry 1183 is sent to the type decoder 1152 for decoding via bus 1121. The decoding result controls the selector 1116. One input of the selector 1116 is from bus 1121, and another input is from BN1X in the read pointer 631 and BN1Y added 1 from the incrementer 736 (that is, BN1Y in the read pointer 631 plus 1). The type decoder 1152 only decodes the unconditional branch instruction type. If the instruction on bus 1121 is an unconditional branch instruction, selector 1116 is controlled to output the content on bus 1121. If the instruction on bus 1121 is any other type, BN1X from bus 631 and BN1Y added 1 outputted by the incrementer 736 are selected.

When the instruction (that is, the next entry in order) on bus 1121 is not an unconditional branch instruction, selector 1116 selects the output from the incrementer 736 to send the output from the incrementer 736 to one input of the selector 738.

If the controller 1154 decodes that the instruction on bus 1117 (that is, the content of the current entry 1182) is a non-branch instruction, the controller 1154 controls selector 738 to select the output of the incrementer 736 selected by selector 1116 as the input of register 740. The control signal 1111 from processor core 601 controls the input to be stored into register 740, such that the tracker moves to the next address (that is, for an address with bigger value, BN1X is unchanged, and BN1Y+'1'). In one embodiment, the control signal 1111 is a feedback signal that processor core 601 provides to the tracker. The control signal 1111 is '1' when the processor core is in a normal working status, such that the register 740 in the tracker is updated in every clock cycle and the read pointer 631 points to a new entry in the track table and a new instruction of L1 cache 602 for processor core 601 execution. When processor core 601 is in an abnormal working status, and the program flow needs to be stopped or the new instruction cannot be executed, the control signal 1111 is '0', such that the register 740 stops updating, and the tracker and the read pointer 631 remain the status unchanged. Thus, L1 cache 602 stops providing new instructions for processor core 601.

If the instruction type contained in the content on bus 1117 is an unconditional branch, the controller 1154 controls the selector 738 to select the branch target address on bus 1117, such that the read pointer 631 jumps to the track point corresponding to the branch target address on bus 1117.

If the instruction type on bus 1117 is a direct conditional branch, the controller 1154 controls the tracker to stop updating and wait until processor core 601 generates a TAKEN signal 635 indicating whether the branch is taken. At this point, the register 740 is controlled by not only the control signal 1111, but also a signal 1161 generated by the processor core 601, where the signal 1161 indicates whether the TAKEN signal 635 is a valid signal. When the signal 1161 indicates that the TAKEN signal 635 is valid and the signal 1111 is also valid, the register 740 is updated. If the branch is not taken (TAKEN signal 635 is '0'), the selector 738 selects the output of the selector 1116, and the operations are similar to the operations for executing the non-branch instruction. If the branch is taken (TAKEN signal 635 is '1'), selector 738 selects bus 1117, and stores the branch target address into the register 740; the read pointer 631 points to the corresponding entry of the branch target in the track table and the branch target instruction in L1 cache 602 to read out the instructions for processor core 601 execution.

If the instruction type on bus 1117 is a BN2 branch type, the controller 1154 controls the register 740 in the tracker to stop updating and wait. The BN2 address is converted to a BN1 address, and the BN1 address is written back into the previous indirect branch entry in the track table. The entry is read out via bus 1117 and the following operations are similar to the operations in the previous embodiment. The tracker moves along the BN1 and controls L1 cache 602 to provide instructions for processor core 601 for execution based on the execution result sent back by processor core 601.

If the branch is not taken, the operations are similar to the operations of the non-branch instruction. If the branch is taken, the operations are similar to the operations of the unconditional branch instruction.

If instruction type contained in the content is an indirect branch, the controller 1154 controls the register 740 in the tracker to stop updating, and wait until processor core 601 sends out the branch target address via bus 683. Similar to the previous embodiment, the branch target address is sent to the active list 604 and the block address mapping module 620 to perform a matching operation. The subsequent operations are similar to the previous embodiment.

If the instruction contained in the entry 1183 is an unconditional branch instruction, the branch type decoder 1121 decodes the instruction type on bus 1152, such that the selector 1116 selects the branch target on bus 1121, but do not select the BN1 (that is, BN1X, BN1Y+'1') provided by the incrementer 736. Therefore, after processor core 601 executes the instruction corresponding to the entry 1182, the processor core 601 does not execute the instruction corresponding to the entry 1183 (because the track point corresponding to the entry 1183 may be an ending track point, and there is no corresponding instruction in L1 cache 602). Instead, processor core 601 directly executes the instruction corresponding to the branch target address contained in the entry 1183.

If the instruction contained in the entry 1182 is a non-branch instruction, after executing the non-branch instruction, the next instruction to be executed is the instruction pointed to by the branch target contained in the entry 1183. If the instruction contained in the entry 1182 is an unconditional branch instruction, after executing the unconditional branch instruction, the next instruction to be executed is the instruction pointed to by the branch target contained in the entry 1182. The entry 1183 does not affect the above process. If the instruction contained in the entry 1182 is a conditional branch instruction, after executing the conditional branch instruction, the next instruction to be executed is determined based on the TAKEN signal 635 generated by processor core 601. If it is determined that the branch is taken (TAKEN signal 635 is '1'), selector 738 selects the branch target on bus 1117. The signal 1161 indicating that TAKEN signal 635 is valid controls the operation of storing the branch target into the register 740, such that the read pointer 631 points to the branch target and the next instruction to be executed is the instruction pointed to by the branch target address contained in the entry 1182. If it is determined that the branch is not taken (TAKEN signal 635 is '0'), selector 738 selects the branch target on bus 1121 outputted by selector 1116. The signal 1161 indicating that TAKEN signal 635 is valid and the control signal 1111 control the operation of storing the unconditional branch target from the entry 1183 into the register 740, such that the read pointer 631 points to the branch target and the next instruction to be executed is the instruction pointed to by the unconditional branch target address contained in the entry 1183.

The address of the unconditional branch target contained in the ending track point may be a BN2 address. When the type decoder 1152 decodes the entry type read out from bus 1121 and finds that the address is a BN2 address, the BN2 outputted by bus 1121 can be put on bus 1117 and converted to the BN1 address. The BN1 address is stored back into the entry. For illustrative purposes, this trace is not shown in FIG. 11A.

In FIG. 11A, there are four ways to determine the conditional branch instruction. The first way: there is only one type of unconditional branch type, that is, the original unconditional branch instruction existed in the program and the unconditional jump operation in the ending track point added in this disclosure are not distinguished. By using this way, the original conditional branch instruction in the program may be skipped, and not executed by processor core 601. But the program flow, under the control of the track table 610 and the tracker, can execute correctly the target instruction of the branch instruction and the subsequent instructions. Therefore, the clock cycle for executing the unconditional branch instruction is saved. However, because processor core 601 does not execute the original conditional branch instruction, the program counter (PC) value may have an error. If an accurate PC value needs to be maintained, the compensation is needed.

Without the need of the PC value, the cache system of this disclosure can provide correctly the instructions for processor core 601 execution. Therefore, processor core 601 can continue to execute the instructions. If the PC value at some time point (for example, when debugging a program) needs to be obtained, every row of the track table records L2 cache block address BN2X corresponding to L1 instruction block and L2 cache sub block address. Thus, the BN2X can read out the corresponding tag from the active list 604. The tag is spliced with the L2 cache block address, the sub block address and BNY in the read pointer 631. The spliced result is the PC value of the instruction being executed.

The second way: there are two types of unconditional branch. One type is the ending track point unconditional branch corresponding to the ending track point of every track. For the ending track point unconditional branch type, the type decoder 1152 considers that the ending track point does not correspond to an instruction and controls the selector 1116 to select the branch target on bus 1121. Once the instruction on bus 1117 is executed, the program flow jumps directly to the branch target address on bus 1121. The other type is the unconditional branch type in the program. When the type decoder 1152 obtains this type, it is not processed as the branch. The selector 1116 is controlled to select the output from the incrementer 736. After the corresponding instruction of the entry on bus 1117 is executed, the next instruction to be executed is the next instruction in order, that is, the previous unconditional branch instruction in the program. In this way, PC value of the processor core is always kept correct.

The third way is a modification of the structure shown in FIG. 11A. When the scan converter 608 examines the instruction block, if the scan converter 608 finds that the penultimate instruction in L1 instruction block is not a conditional branch instruction, and the last instruction is a non-branch instruction, the scan converter 608 merges the ending track point to the track point corresponding to the last instruction. That is, the instruction type of the last instruction is marked as an unconditional branch instruction, and BN1 or BN2 (if it is BN2, the tracker may convert the BN2 to the BN1) corresponding to the first instruction of the next instruction block is stored in the track point corresponding to the last instruction as the content of the track point. Therefore, when the read pointer 631 of the tracker points to the track point corresponding to the instruction, except that the instruction is read out from L1 cache 602 for processor core execution, the controller 1154 decodes the instruction type on bus 1117 and finds that the instruction is an unconditional branch instruction. Thus, the selector 738 is controlled to select bus 1117. In the next clock cycle, the read pointer 631 is updated as the branch target BN1 (that is, BN1 corresponding to the first instruction of the next instruction block) of the unconditional branch. At this point, processor core 601 does not need to waste a clock cycle to execute the empty instruction.

When the scan converter 608 examines the instruction block, if the scan converter 608 finds that the last instruction (corresponding to the last track point of a track) in L1 instruction block is a branch instruction, the scan converter 608 does not merge the ending track point to the track point corresponding to the last instruction. Whereas the scan converter 608 places the content of the ending track point into the track point (i.e., the right track point of the track point corresponding to the last instruction) after the track point corresponding to the last instruction. When the last instruction is an unconditional branch instruction, the controller 1154 controls the selector 738 to select the branch target on bus 1117 to put on the read pointer 631 base on the unconditional branch type, so read pointer 631 branches to track point specified by the branch target address on bus 1117. Then, the program jumps to the branch target and the ending track point is not executed. When the last instruction is a conditional branch instruction, the controller 1154 controls the tracker to stop according to the conditional branch type on bus 1117, and wait for the TAKEN signal 635 generated by the processor core 601. At this point, the type decoder 1152 decodes instruction type on bus 1121 and determines that the instruction is an unconditional branch instruction, controlling selector 1116 to select bus 1121. When the TAKEN signal 635 shows that the branch is taken, the controller 1154 controls selector 738 to select the conditional branch target on bus 1117 to place the conditional branch target on the read pointer 631. When the TAKEN signal 635 shows that the branch is not taken, the controller 1154 controls selector 738 to select the output of selector 1116, and place the unconditional branch target on bus 1121 on the read pointer 631. L1 cache 602 provides the instructions for the processor core execution according to the read pointer 631.

The above three methods can apply to both the fixed length instruction and the variable length instruction. The ending track point is not required to be in a fixed position of the track. In addition, if the ending track point is in a fixed position of the track, whether the last instruction is reached can be determined based on the BN1Y value in the read pointer 631. The fourth way: there is only one type of unconditional branch in the track table, but the tracker divides it into two types based on the position of the type of unconditional branch in the track table. In this way, the BN1Y in the read pointer 631 is sent to the type decoder 1152; whereas the instruction type on bus 1121 does not need to be decoded. When the BN1Y points to the last entry of a track, the type decoder 1152 controls the selector 1116 to select the branch target on bus 1121. After the instruction on bus 1117 is executed, the program flow directly jumps to the branch target address on bus 1121. When the BN1Y points to any other entry other than the last entry of a track, the type decoder 1152 controls the selector 1116 to select the output of incrementer 1736. After the corresponding instruction of the entry on bus 1117 is executed, the next instruction to be executed is the next instruction in order. In this way, a PC value in the processor core always keeps a correct value. This way can be applied to the fixed length instruction.

Figure 11B:
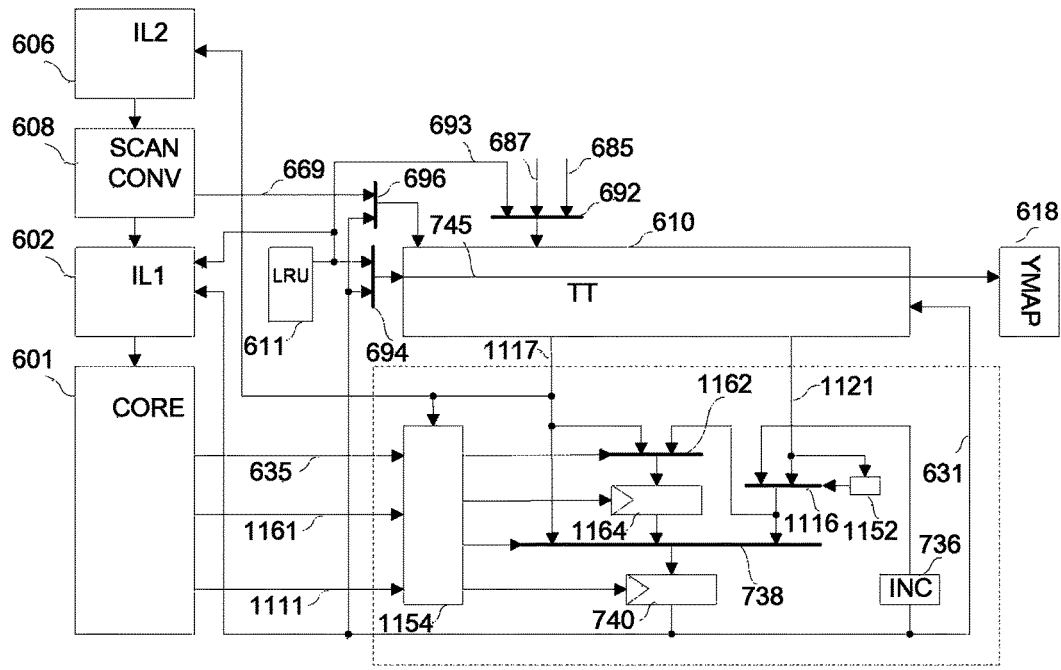
FIG. 11B shows an exemplary process supporting speculative execution consistent with the disclosed embodiments.

In addition, when the entry of the track table 610 read out from bus 1117 is decoded by the control module 1154, and it is determined that the instruction is a conditional branch instruction, the processor cores 601 may perform speculative execution along one of the branches, thereby improving the performance of the processor core. FIG. 11B shows a process supporting speculative execution consistent with the disclosed embodiments. Comparing to the tracker shown in FIG. 11A, a selector 1162 and a register 1164 are added in the tracker shown in FIG. 11B. The selector 1162 and the register 1164 are configured to select and temporarily store the other branch that is not selected by speculative execution, such that the other branch can be used when the speculation is wrong. The direction of speculation execution can be determined by the existing static or dynamic branch prediction technique. The direction of speculation execution can also be determined by the prediction field in the entry corresponding to the branch instruction in the track table.

In this example, the branch prediction shows that the branch is not taken. After decoding a conditional branch type on bus 1117 and obtaining a prediction value showing that the branch is not taken, the controller 1154 controls the selector 1162 and the register 1164 to select the branch target address on bus 1117 and store the branch target address in the register 1164. At the same time, the controller 1154 controls the selector 738 to select the output (the sequential next instruction after the branch instruction) of the selector 1116. The output of the selector 1116 is then stored in the register 740. Therefore, the read pointer 631 controls L1 cache 602 to provide the next instruction of the branch instruction for processor core 601 execution and mark this instruction to the processor core as speculative execution. The read pointer 631 points to the first entry after the branch instruction in the track table 610, such that the first entry after the branch instruction is placed on bus 1117. Then, the controller 1154 determines the subsequent direction of the tracker based on the instruction type on bus 1117, continuing to provide the instructions for the processor core execution. All of these instructions are marked as speculative execution. When bus 1161 informs that the TAKEN signal 635 is valid, the controller 1154 compares the predicted branch direction with the branch direction on TAKEN signal 635. If the comparison result shows the predicted branch direction and the branch direction on TAKEN signal 635 are the same, the execution direction follows the original speculative direction. If the comparison result shows the predicted branch direction and the branch direction on TAKEN signal 635 are different, the controller 1154 sends a 'speculation wrong' signal to the processor core 601, such that the processor core 601 clears every instruction having a speculative execution tags and intermediate execution results of every instruction having the speculative execution tag. At the same time, the controller 1154 controls the selector 738 to select the output of the register 1164, such that the address of the branch without speculative execution is used to control L1 cache 602 to provide the instructions for processor core 601, and then the processor core 601 continues to execute the provided instructions.

For another example, the branch prediction shows that the branch is taken. After decoding a conditional branch type on bus 1117 and obtaining a prediction value showing that the branch is taken, the controller 1154 controls the selector 1162 and the register 1164 to select the output (the next instruction of the branch instruction) of the selector 1116 and store the output of the selector 1116 in the register 1164. At the same time, the controller 1154 controls the selector 738 to select the branch target address on bus 1117. The branch target address is stored in the register 740. Therefore, the read pointer 631 controls L1 cache 602 to provide the branch target instruction of the branch instruction for processor core

601 execution, and mark this instruction to the processor core as speculative execution. The read pointer 631 also points to the entry pointed to by the branch target address on bus 1117 in the track table 610, such that the entry is placed on bus 1117. Then, the controller 1154 determines the subsequent direction of the tracker based on the instruction type on bus 1117, continuing to provide the instructions for processor core 601 execution. All of these instructions are marked as speculative execution. When bus 1161 informs that the TAKEN signal 635 is valid, the controller 1154 compares the predicted branch direction with the branch direction on TAKEN signal 635. If the comparison result shows the predicted branch direction and the branch direction on TAKEN signal 635 are the same, the execution direction follows the original speculate direction. If the comparison result shows the predicted branch direction and the branch direction on TAKEN signal 635 are different, the controller 1154 sends a 'speculation wrong' signal to the processor core 601, such that the processor core clears every instruction having a speculative execution tag and the intermediate execution results of every instruction having the speculative execution tag. At the same time, the controller 1154 controls the selector 738 to select the output of the register 1164, such that the address of the branch without speculative execution is used to control L1 cache 602 to provide instructions for processor core 601, and then the processor core 601 continues to execute the provided instructions.

The existing instruction set conversion technology typically uses a fixed instruction conversion module (sometimes called a decoder) to convert a guest instruction set to a host instruction set (sometimes called micro-ops) for the processor core execution. In general, the conversion module is in between the cache for storing the guest instructions and the processor core. The guest instruction address provided by the processor core can be used to perform an addressing operation for the cache to read out the guest instruction. The guest instruction is converted to the host instruction by the conversion module, and the host instruction is provided for the processor core for execution. Repeated conversion of the guest instruction increases power consumption. In addition, the instruction converter having longer delay may need a deeper instruction buffer at the critical trace for instruction execution. Therefore, the pipeline of the processor core is sharply deepened, thus increasing hardware cost and performance loss when the branch prediction fails.

When the conversion module locates before the cache, the instructions stored in the cache are the host instructions that can be directly executed by the processor core. However, in general, the host instruction (usually fixed length instruction) and the guest instruction (usually variable length instruction) do not have one-to-one correspondence, so the lack of reliable method and system for converting the guest instruction address of the branch target instruction to the host instruction address and performing an addressing operation in the cache to obtain the correct host instruction becomes a problem. Thus, the existing processor core has to bear the loss of power consumption, performance and cost caused by repeatedly converting the same instruction. This is the reason why the instruction conversion module is placed between the cache and the processor core and the guest instructions are stored in L1 instruction cache. Although real-time address conversion can be avoided by using the trace cache and the instruction circular buffer when there is a hit on the program execution trace or circular code is executed, the trace cache may store the same instruction at different traces at the same time, resulting in large volume waste and low performance of the trace cache. In some specific conditions, the addressing operation can be performed for these memory devices using the specific instruction address. However, the processor core cannot perform the addressing operation at any condition. The conversion process for the same guest instruction is performed repeatedly, or the guest instruction is interpreted to the host instruction using a software method. In addition, the existing instruction convert can only convert one or a few type of specific guest instruction sets to a host instruction set for the processor core execution.

By using the instruction set conversion system and method provided in this disclosure, the host instruction obtained by the conversion can be stored in the cache. The address mapping module can complete the conversion of the guest instruction address generated by the processor core to the host instruction address, such that the processor core can directly perform an addressing operation for the host instruction stored in the cache. The processor core does not need to repeatedly perform the addressing operation for the cache that stores the guest instruction to read out the guest instruction and convert the guest instruction to the host instruction for the processor core execution. Therefore, performing repeatedly the conversion for the same guest instruction in the L1 cache can be avoided. The power consumption, longer delay on the critical trace and additional hardware cost can also be avoided. The configurable instruction conversion module described in this disclosure can convert any unspecific guest instruction set to the host instruction set based on configuration.

The system for instruction conversion mainly includes a converter and an address mapping module. The converter may be a fixed converter or a configurable converter. When instructions contained in an instruction set (that is, host instruction set) that can be executed by the processor core have one-to-one correspondence with the instructions contained in any instruction set (that is, guest instruction set) to be executed, the configurable converter and the processor core can work together to convert the guest instruction to the host instruction for the processor core execution. At this point, the branch target address corresponding to the branch instruction in the guest instructions is the same as the branch target address of the host instruction corresponding to the branch instruction. FIG. 12 illustrates a schematic diagram of an exemplary processor system including a configurable converter consistent with the disclosed embodiments. As shown in FIG. 12, the guest instruction 1205 is converted by the configurable converter and stored in instruction memory 1203 for direct execution by the processor cores At this point, the instructions stored in the instruction memory 1203 are the host instructions. The function and structure of the configurable converter 1202 are the same as the function and structure of the converter 200 shown in FIG. 2. Because the guest instruction and the host instruction have one-to-one correspondence, the guest instruction address is the same as the host instruction address. When the processor core 1201 executes a branch instruction, if the branch is not taken, the sum of the branch instruction address and '1' is used as the address of the next instruction. The address of the next instruction is sent to the instruction memory 1203 to read out the host instruction for the processor core execution. If the branch is taken, because the branch target address of the guest instruction generated by adding the branch offset of the guest instruction to the branch instruction address is the same as the branch target address of the host instruction, the branch target address of the guest instruction can be directly used to perform an addressing operation for the instruction memory 1203. Then, the branch target host instruction is read out from the instruction memory 1203. There is no need to convert the guest instruction address to the host instruction address. When the non-branch instruction is executed, the method for generating the address of the next instruction is the same as the method when the branch is not taken.

The processor system including the configurable converter can be configured according to needs, thereby executing different guest instruction sets. FIG. 13A illustrates a block diagram of an exemplary configurable converter consistent with the disclosed embodiments. As shown in FIG. 13A, memory 201 stores conversion rules of the host instruction set and the guest instruction set. Extractor 1302 (that is, operation code extractors 211, 213 and 215 shown in FIG. 3) extracts operation code from the guest instruction 1205 sent via the bus as an addressing address. The addressing address is sent to memory 201 via bus 1307 to perform an addressing operation and read out the conversion rules corresponding to the guest instruction. A mask and a shift control signal in the conversion rules via bus 1308 controls shifting module 1303 (that is, extractors 221, 223, 225 and 227 shown in FIG. 2). The shifting module 1303 can extract, mask and shift instruction fields in the guest instruction to the position specified by a host instruction format. The operation code of the host instruction is sent out via bus 1309, and shifted to the position specified by the host instruction format. Both shifted and masked instructions are merged into a host instruction in merge module 1304 (similar to an instruction splicer 207 shown in FIG. 2) to output the host instruction via bus 1306. Therefore, the configurable converter completes the operation for converting the guest instruction to the host instruction. By changing the conversion rules in memory 1301, the combination of the instruction converter and the processor core that executes the host instruction can execute different guest instruction sets.

In addition, a register can be added in the configurable converter. The added register is configured to store information about whether the guest instruction is fixed length or variable length. When the register is configured as fixed length (the register is configured to '0'), it indicates that the boundary of the guest instructions in the guest instruction block is aligned. Therefore, the conversion process can be started from a starting address of the guest instruction block. When the register is configured as variable length (the register is configured to '1'), it indicates that the boundary of the guest instructions in the guest instruction block is not necessarily aligned. At this time, only the instructions starting from the target instruction until the last unconverted instruction in the guest instruction block can be converted.

Moreover, memory 1301 can store the conversion rules of a plurality of guest instruction sets, where every guest instruction set has its own address space, and different program thread selects different address space of the conversion rules. Besides register 212, register 214 and register 216 (shown in FIG. 2) that control extraction of operation code of the guest instruction, an additional register is added to store a base address of memory 201 for storing the conversion rules of the instruction set corresponding to the thread. The above registers may be added as a plurality of register groups. Each register group corresponds to one kind of guest instruction set and is selected by the selector. A storage field may be added corresponding to every thread in a thread number memory (usually in TLB) of a memory management unit (MMU) of the processor, where the storage field is used to store and select selection signals of the plurality of registers. FIG. 13B illustrates a schematic diagram of an exemplary memory in a configurable converter consistent with the disclosed embodiments. As shown in FIG. 13B, the register set 1311 stores a extraction position of the operation code of P instruction set and a base address 'm' of the corresponding instruction conversion rules in memory 201. The register set 1313 stores a extraction position of the operation code of Q instruction set and a base address 'n' of the corresponding instruction conversion rules in memory 201.

When the guest instruction of thread J is converted by the instruction converter, a selection signal 316 of the J thread in MMU controls selector 315 to select the output of register set 1311. At this time, an operation code extractor 1302 (that is, extractors 211, 213, 215 shown in FIG. 3), under the control of register set 1311, extracts the operation code of the guest instruction to be converted. The extracted operation code and the base address 'm' from register set 1311 are added together by adder 1318 to obtain a result. The result is used as an address to perform an addressing operation for the conversion rule memory 201, control the operation of the instruction converter, and convert the instructions of P instruction set to the host instructions to store the host instructions in the instruction memory 1203 shown in FIG. 12. When the guest instructions of thread K are converted by the instruction converter, control signal 316 of the memory of K thread in MMU controls selector 315 to select output of the register set 1313. At this time, operation code extractor 1302, under the control of register set 1313, extracts operation code of the guest instruction to be converted. The extracted operation code and base address 'n' from register set 1313 are added together by adder 1318 to obtain a result. The result is used as an address to perform an addressing operation for the conversion rule memory 201, control the operation of the instruction converter, and convert the instructions of Q instruction set to the host instructions to store in the instruction memory 1203 shown in FIG. 12. When the processor core switches the current thread from J thread to K thread, it is actually the switch from execution of instructions in the P instruction set to execution of instructions in the Q instruction set. In this way, a program including a plurality of the guest instructions of the guest instruction set can be executed in the virtual machine. Of course, the same function can be implemented by using a plurality of instruction converters, and each instruction converter is configured to convert one guest instruction set.

A plurality of fields of the instruction in certain computer instruction sets are orthogonal. That is, these fields are independent. For example, in some instruction sets, besides operation code fields, code in some fields of the instruction can be used to perform an addressing operation for a specific memory or a register. These fields also need to be mapped by the conversion rules, other than shifting the address in the guest instruction to meet the requirement of the host instruction. By using a plurality of conversion rule memories and the corresponding logics corresponding to a plurality of orthogonal instruction fields, the total number of entries (the number of rows) in the conversion rule memory can be controlled at a reasonable number.

FIG. 13C illustrates a schematic diagram of an exemplary memory in a configurable converter consistent with the disclosed embodiments. Compared to FIG. 13A, a conversion rule memory 1321 and its specified extractor 1322 (the function is similar to extractor 1302) and a shifting logic 1323 (the function is similar to shifting module 1303) are added in FIG. 13C. A register set (not shown in FIG. 13C) similar to register set 1311 and register set 1313 shown in FIG. 13B is also added to control the memory 1321 and the corresponding logic. The outputs of the memory 1321 and the shift and mask logic 1323 are sent to merge module 1304 to be combined with the outputs of the memory 201 and the shifting module 1303. Two sets of memories and the corresponding logics together can process the instruction sets of one computer; and each set is responsible for conversion of some fields of the guest instruction and the outputs are combined to the host instruction in merge module 1304. Two sets of memories and the corresponding logics can process independently the instruction sets, and each set independently converts the guest instruction to the host instruction, implementing the similar function shown in FIG. 13B. Therefore, a writable register can be added. Based on the status of the new register, whether the instruction converter is in a cooperative manner or in an independent manner can be determined.

In addition, the merge module 1304 shown in FIG. 13A also needs to generate a mapping relationship for the guest instruction based on a conversion order of the host instruction (such as the embodiments shown in FIG. 8A or FIG. 8B) for filling in block address offset mapper YMAP. The merge module 1304 also generates a write address to control the filling of the host instruction into instruction memory 1203. If the host instruction is fixed length, one instruction is written in each pair of instruction memories 1203, and the fixed length (e.g., 4 bytes) is added to the write address of L1 cache. If the host instruction is variable length, the conversion rule corresponding to the instruction in memory 1301 records the length of the instruction, one instruction is written into each pair of instruction memories 1203, and the length of the instruction outputted by the memory 1301 is added to the write address of L1 cache to obtain a starting address of the next instruction. Further, a plurality of host instructions in one instruction block may be stored in a buffer at different times, and the entire host instruction block is written into the instruction memory 1203. Moreover, other modules may generate the above mapping relationship, such as the part that is responsible for the scanning function in the scan converter shown in FIG. 7A and FIG. 7B.

The processor system of the configurable converter can work under the condition that the instructions in the guest instruction set and the instructions in the host instruction set have one-to-one correspondence. However, when the instructions in both the instruction sets do not have one-to-one correspondence, one guest instruction may be converted to multiple host instructions or multiple guest instructions may be combined to one host instruction; or at least one of the guest instruction and the host instruction is a variable length instruction, which may cause that the branch target address of the guest instruction and the branch target address of the host instruction do not have one-to-one correspondence. At this moment, the address mapping module in combination with the instruction converter can implement the conversion of the instruction set and the mapping of the instruction address.

FIG. 14 illustrates a schematic diagram of an exemplary processor system including an instruction converter and an address mapping module consistent with the disclosed embodiments. As shown in FIG. 14, the guest instruction is converted by converter 1202 and stored in instruction memory 1203 for processor core 1201 execution. That is, the instruction stored in the memory 1203 is a host instruction, and the memory 1203 performs an addressing operation based on the host instruction address to output the host instruction. During the conversion process, the converter 1202 also generates a corresponding relationship between the guest instruction and the corresponding host instruction, and the generated corresponding relationship is stored in the address mapping module 1404. When the processor core 1201 executes the host instruction in instruction memory 1203 according to the order of the instructions, the program counter (PC) adds '1' every time, such that the corresponding host instruction address is added by '1', performing an addressing operation for instruction memory 1203 to read out the next host instruction.

When the processor core 1201 executes a branch instruction to generate a branch target address, because the branch target address is represented by the format of the guest instruction address, the branch target address is sent to the address mapping module 1404 and is converted to the corresponding host instruction address. Then, the host instruction address is sent to instruction memory 1203 to perform an addressing operation and read out the corresponding host instruction (that is, the branch target instruction).

Specifically, if the address mapping module 1404 stores the mapping relationship corresponding to the guest instruction address, it indicates that the host instruction corresponding to the guest instruction is stored in the instruction memory 1203, and the guest instruction address can be directly converted to the host instruction address and output the host instruction address. If the address mapping module 1404 does not store the mapping relationship corresponding to the guest instruction address, it indicates that the guest instruction has not been converted to the host instruction. At this moment, the converter 1202 converts at least one guest instruction including the guest instruction to the host instruction and stores the host instruction in the instruction memory 1203. The corresponding mapping relationship is stored in the address mapping module 1404, such that the guest instruction address can be converted to the host instruction address and the host instruction address is outputted. As used herein, the converter 1202 may be a fixed converter that can convert a specific guest instruction to the host instruction. The converter may also be a configurable instruction converter as shown in FIG. 2, FIG. 3, FIG. 4, FIG. 5, FIG. 13A, and FIG. 13B.

The address mapping module 1404 may be composed of the mapping table. The mapping table may be addressed by the guest instruction address, and its entry stores the address of the corresponding host instruction. Based on this, the mapping table may be implemented by the following ways.

Method 1: every entry in the mapping table is addressed using the smallest unit (e.g., byte) in the guest instruction address. Every entry stores the block address of the host instruction block including the host instruction corresponding to the guest instruction that corresponds to the entry (that is, the block number of the host instruction in the instruction memory 1203), and the block offset address of the host instruction in the host instruction block. Thus, when the guest instruction address is converted, an addressing operation is performed for the entry of the mapping table based on the guest instruction address to read out the host instruction address and the block offset address in the corresponding entry, thereby completing the address conversion.

Method 2: when the guest instruction is a variable length instruction, the mapping table described in method 1 can be compressed to eliminate empty entries. For example, when the guest instruction is addressed according to bytes, because the guest instruction is a variable length instruction, only the byte at starting address of every guest instruction occupies an entry for storing the block offset of the guest instruction and block offset address of the corresponding host instruction; whereas other bytes at non-starting addresses of the guest instruction do not occupy entries. Every row of the mapping table corresponds to a guest instruction block and can be addressed using the address of the guest instruction block. Therefore, when the guest instruction address is converted, the addressing operation can be performed for the row of the mapping table based on the block address of the guest instruction to read out contents of the entire row. Then, the block offset address of the guest instruction is matched with the block offset addresses of the guest instructions in all entries of the row. The host instruction address stored in the entries that is matched successfully is selected and outputted, and the address conversion is completed.

Method 3: every row in the mapping table is composed of 2 parts: the data bits contained in the first part is the same as the number of smallest address units contained in one guest instruction (for example, the data bits is the same as the number of bytes contained in the guest instruction block); the data bits contained in the second part is the same as the maximum number of host instructions possibly contained in the one host instruction block. The data corresponding to the starting address (that is, the starting byte) of the guest instruction in the first part is set to '1', and others are set to '0'. The specific format can refer to the format shown in FIG. 8B. When the guest instruction is converted, an addressing operation can be performed for the row of mapping table based on the block offset address of the guest instruction to read out the contents of the entire row (including two parts). Then, based on the block offset address of the guest instruction, the number of '1' from the first part to the data corresponding to the byte of the block offset address is counted (that is, the total number is increased by 1 for every '1'). Further, based on the number of '1' in the second part, the total number is decreased by 1 for every '1' in the second part until the total number is decreased to '0'. At this time, a count position in the second part corresponds to the block offset address of the host instruction to complete the address conversion. The components in FIG. 8C can complete efficiently the above mapping operations.

Further, the guest instruction block and the host instruction block may have a corresponding relationship. For example, one L2 cache block that stores the guest instruction is divided into two L2 cache sub blocks, where each sub block corresponds to one L1 cache block that stores the host instruction. So the mapping operation of the guest instruction and the host instruction can be decomposed into the mapping operation of the block address (because there is a corresponding relationship, it is easy to realize the mapping operation), and the mapping operation of the block offset address to simplify the mapping operation. Therefore, not every entry in the L1 cache block includes a valid host instruction. L1 instructions in the L1 instruction block are arranged in an ascending order starting from the smallest block offset address (the smallest block offset address is generally '0'). Therefore, the corresponding every instruction block also needs to store the offset address of the instruction with the largest offset address to remind the system that the L1 cache block address of the sequential next instruction needs to be provided in the next cycle. In addition, a block offset mapper is needed to provide a block offset mapping of the branch target based on the mapping relationship between the L2 cache sub block and the corresponding L1 cache block.

FIG. 15 illustrates a schematic diagram of another exemplary processor system including a configurable converter and an address mapping module consistent with the disclosed embodiments. As shown in FIG. 15, the converter 1202, the instruction memory 1203 and the processor core 1201 are similar to the corresponding components shown in FIG. 12 and FIG. 14. Also, a specific implementation way of the address mapping module is provided. In one embodiment, if there is a miss in the instruction memory 1203, the corresponding guest instruction may be sent to outer memory to obtain the corresponding guest instruction block. The obtained guest instruction block is converted by the instruction converter 1202 and the converted instruction block is filled into the instruction memory 1203. In the following explanation, it is assumed that there is always a hit in the instruction memory.

The address mapping module is composed of a tag memory 1505 (equivalent to active list 604 in FIG. 6), a block offset mapper (YMAP) 1504 (for the sake of simplicity, block offset mapper 1504 includes functions of the offset address mapping module 618 and the offset address converter 622 in FIG. 6) and an ending flag memory 1506. The rows of the tag memory 1505, the block offset mapper 1504 and the ending flag memory 1506 correspond to the host instruction blocks in the instruction memory 1203. Every row in the ending flag memory 1506 stores the block offset address of the last host instruction corresponding to the host instruction block in the instruction memory 1203. When the processor core 1201 reads the host instruction, the ending flag memory 1506 can checks whether the host instruction is the last instruction in the host instruction block. If the host instruction is not the last instruction of the current host instruction block, the block offset address of the next host instruction is the offset address of the host instruction added by 1; otherwise, the next host instruction is the first host instruction of the next host instruction block.

Every row of the tag memory 1505 stores the guest instruction block address (that is, tag). Therefore, through the tag matching, the location of a host instruction block in instruction memory 1203 corresponding to the guest instruction block, the corresponding mapping relationship in the same row in the block offset mapper 1504, and position information of the last host instruction of the instruction block in the ending flag memory 1506 can be found. Similar to the cache structure, for different forms of the memory, the tag memory 1505 and the instruction memory 1203 may have different structures.

Specifically, taking direct mapping storage structure as an example, the block address of the guest instruction may be further divided into a tag and an index number. Based on the index number, an addressing operation is performed for the row of the tag memory 1505 to read out content of the corresponding row. The content of the row is compared to the tag in the block address. If the result is equal, it indicates that the matching is successful; otherwise, the matching is unsuccessful. When the matching is unsuccessful, the guest instruction address can be used to obtain the corresponding guest instruction block from the lower instruction memory via instruction converter 1202, and the corresponding guest instruction block is converted to the host instruction block. The host instruction block is written into instruction memory 1203 using cache replacement policy. The tag in the guest instruction is written to the same row in tag memory 1505. The block offset mapping relationship generated by instruction converter 1202 is stored into block offset mapper 1504, and the block offset of the last instruction in the instruction block generated by instruction converter 1202 is stored into the same row in memory of ending flag memory 1506.

Of course, tag memory 1505 and instruction memory 1203 may also be any other appropriate organization structure (for example, set associative structure or fully associative structure). The specific matching method is the same as the matching method in the appropriate organization structure, which are not repeated here. For ease of description, as used herein, it is assumed that the direct mapping structure is used as an example for illustration, and the tag matching is successful.

The processor core 1201 provides different instruction addresses via bus 1508 based on information about whether a branch or a jump is needed. When an instruction address is outputted via bus 1508 to control the instruction memory 1203 to read out the instruction for processor core 1201 execution, the block address on bus 1508 is also sent to the ending flag memory 1506 to perform an addressing operation and read out the ending address of the row. The ending address is matched with the block offset address of the host instruction on bus 1508 to examine whether the host instruction is the last instruction of the host instruction block.

If the host instruction is not the last instruction of the host instruction block, a signal 1507 outputted by the ending flag memory controls that the instruction block address of the processor core 1201 is not changed in the next clock cycle, and the block offset is added by '1' and put on bus 1508. If the host instruction is the last instruction of the host instruction block, the signal 1507 outputted by the ending flag memory controls the processor core 1201 to output the guest instruction block address (obtained by adding '1' to the current instruction block address) of the next instruction block in the next clock cycle, and '0' is as the block offset address of the host instruction. The combination of the instruction address is put on bus 1508. At this moment, the signal 1507 also controls to send the instruction block address on bus 1508 to the tag memory 1505 to perform a matching operation. If the matching is successful, the address on the bus 1508 is the correct address of the next instruction. When the executed instruction is a non-branch instruction, a branch determination signal 1509 controls the selector 1510 to select the block offset address on bus 1508 to perform an addressing operation for the instruction memory 1203 to read out the host instruction in the next cycle for processor core 1201 execution. The block address used for the instruction memory 1203 is always from bus 1508.

When the process core 1201 decodes the instruction from the instruction memory 1203 and finds that the instruction is a branch instruction, the branch determination is performed according to the instruction. If the result of the branch determination is 'a branch is not taken', the address generated in the next cycle is the same as the above. The branch determination signal 1509 controls the selector 1510 to select the address on bus 1508. If the result of the branch determination is 'a branch is taken', the guest instruction address of the branch instruction and the branch offset included in the branch instruction are added together to obtain the guest instruction address of the branch target. The obtained guest instruction address of the branch target is sent out via bus 1508 in the next cycle. In order to reduce the number of addresses that are stored, in practical, the processor core only records the host instruction address of the branch instruction (or other instructions). A mapping component shown in FIG. 8C may be used to perform an inverse operation by using the mapping relationship shown in FIG. 8B. That is, the host instruction address is sent to the decoder 805, the host instruction mapping relationship is sent to the mask unit 807 as an input, and the mapping of the guest instruction is used to control array 803, so the output of the device is the guest instruction address. When the instruction is converted, the block offset of the guest branch instruction and the branch offset of the branch instruction are added together to obtained a sum. The sum is recorded in the host branch instruction as the branch offset. Therefore, when the processor core 1201 executes the branch instruction, the correct guest branch target address can be obtained by adding the instruction block address (the block offset is '0') and the corrected branch offset recorded in the branch instruction, without performing the operation that the host instruction block offset of the branch instruction is mapped to the guest instruction block offset.

The block address in the branch target address of the guest instruction is sent to the tag memory 1505 via bus 1508 to perform a matching operation, and the block address is also sent to the block offset mapper 1504 to read out the mapping relationship of the row. Then, the guest instruction block offset on bus 1508 is mapped to the host instruction block offset 1512 based on the mapping relationship of the row. The branch determination signal 1509 controls the selector 1510 to select the host instruction block offset 1512 as the block offset. The host instruction block offset 1512 is sent to the instruction memory 1203. The block address on bus 1508 is also sent to the instruction memory 1203. If the matching in the tag memory 1505 is successful, the branch target instruction is obtained based on the address for processor core execution.

In one embodiment, the block address (the block address contains a tag and an index in the instruction address) of the next instruction on bus 1508 is always the guest instruction address. The index part of the block address is used for row addressing by every memory, such as tag memory 1505, and instruction memory 1203. The block offset address of the next instruction on bus 1508 may be the guest instruction address or the host instruction address based on the instruction type. If the type of the current instruction is a non-branch instruction or a branch instruction without taking the branch, and the instruction is not the last instruction in the host instruction block, the block offset address of the next instruction is the host instruction format (the current instruction address is added by '1', pointing to the next host instruction of the current host instruction). If the type of the current instruction is a non-branch instruction or a branch instruction without taking the branch, and the instruction is the last instruction in the host instruction block, the block offset address '0' of the next instruction is the guest instruction format or the host instruction format.

If the type of the current instruction is a branch instruction with taking a branch, the block offset address of the next instruction is the guest instruction format, and the block offset address needs to be mapped to the block offset address of the host instruction by the block offset mapper 1504. Then, the obtained block offset address of the host instruction can be used to read out the instruction from the instruction memory 1203. If the index part of the guest instruction is used as the block address of the host instruction address, an addressing operation is performed using the host instruction address at any time in the instruction memory 1203.

If the structure of the instruction memory 1203 and the instruction address mapping module is multi-way structure, the block address of the similar host instructions is composed of a way number and an index part of the guest instruction. That is, the address mapping module in the virtual machine may map directly the guest instruction address generated by the guest instruction compiler to the host instruction address to access the instruction memory that stores the host instruction for processor core execution. Or the block address of the host instruction address is used as the block address equal to the guest instruction address (including the tag part and the index part).

The virtual machine avoids low efficiency when mapping the guest instruction address to the host instruction address by using the existing software virtual machine and storage consumption for storing a huge address mapping table. It also avoids high power consumption for repeatedly converting the same instruction (the existing hardware virtual machine needs to use the guest instruction address to perform an addressing operation for the instruction memory that stores the guest instruction, then the guest instruction is read out and is converted to the host instruction by the converter for processor core execution). As used herein, the technical feature of the virtual machine is that the guest instruction is first converted by the converter and then stored in the instruction cache. Therefore, the instruction stored in the instruction cache is the host instruction, and the host instruction can be directly executed without instruction conversion.

A branch target table may be added, and the branch target table is used to record the host instruction address of the branch target instruction, such that when repeatedly executing the same branch instruction and the branch is taken, there is no need to convert the guest instruction address of the branch target instruction to the host instruction address. FIG. 16 illustrates a schematic diagram of an exemplary processor system including a branch target table consistent with the disclosed embodiments. As shown in FIG. 16, the configurable converter 1202, the instruction memory 1203, the processor core 1201, the tag memory 1505, the block offset mapper 1504, and the ending flag memory 1506 are similar to the corresponding components shown in FIG. 15. The difference is that a branch target buffer (BTB) 1607 is added, and the connection of the selector 1608 is different from the connection of the selector 1510 shown in FIG. 15. As used herein, the branch target buffer 1607 stores branch target history information recorded using the form of the host instruction address. That is, the branch target table stores the host instruction address of the branch instruction, the host instruction address of the branch target, and prediction information about whether the branch is taken when previously executing the branch instruction. The rows of the branch target buffer 1607 may not correspond to the rows of any other memory. The branch target buffer 1607 outputs a branch prediction signal 1511 to control the selector 1608 to select the instruction address from bus 1508 or the branch target buffer 1607.

At the time, when the processor core 1201 via bus 1508 outputs the host instruction address to the instruction memory 1203 to perform an addressing operation, the processor core also sends the host instruction address to the branch target buffer 1607 to match with the host instructions of every branch instruction stored in the branch target buffer 1607. The host instruction address of the branch target and the prediction information included in the host instruction that is matched successfully are outputted. When the current instruction is a non-branch instruction, or when the current instruction is a branch instruction without taking the branch, in the next cycle, the branch prediction signal 1511 controls the selector 1608 to select the instruction address on bus 1508 to access the instruction memory 1203. The operation is similar to the operation shown in FIG. 15, which is not repeated herein. When the current instruction is a branch instruction and the branch prediction shows that the branch is taken, the branch prediction selection signal 1511 controls the selector 1608 to select the host instruction branch target address outputted by the branch target buffer 1607 to access the instruction memory 1203.

When the current instruction is a branch instruction, but the current instruction is not matched in the branch target buffer 1607, an entry is allocated in the branch target buffer 1607 according to conversion rules to store the host instruction address of the branch instruction. If the branch prediction shows 'the branch is taken' (similar to the embodiment shown in FIG. 15), the processor core 1201 generates the guest instruction address and sends out the generated guest instruction address via bus 1508. The instruction block address obtained by matching the guest instruction address in the tag memory 1505 and the block offset 1512 of the host instruction obtained by the mapping operation of the block offset mapper 1504 together can be used as the host instruction branch target address and the branch prediction value is stored into the corresponding field of the entry allocated recently in the branch target buffer 1607. The host instruction branch target address is bypassed by the branch target buffer 1607 to access the instruction memory 1203 via selector 1608.

If the branch prediction shows that 'the branch is not taken', the new added entry in the branch target buffer 1607 is set to invalid, the branch prediction selection signal 1511 controls the selector 1608 to select the instruction address (i.e., the next sequential host instruction address of the branch instruction) on bus 1508 to access the instruction memory 1203. At this moment, the instruction address on bus 1508 is the same as the instruction address generated in the embodiment shown in FIG. 15 under the same condition, which is not repeated herein. When the branch instruction is executed and it is determined that the branch prediction is wrong, the processor core 1201 clears an intermediate result of the instruction which is executed according to the wrong prediction. Then, the processor core 1201 executes the correct branch and updates the branch prediction stored in the branch target buffer 1607.

Figure 17:
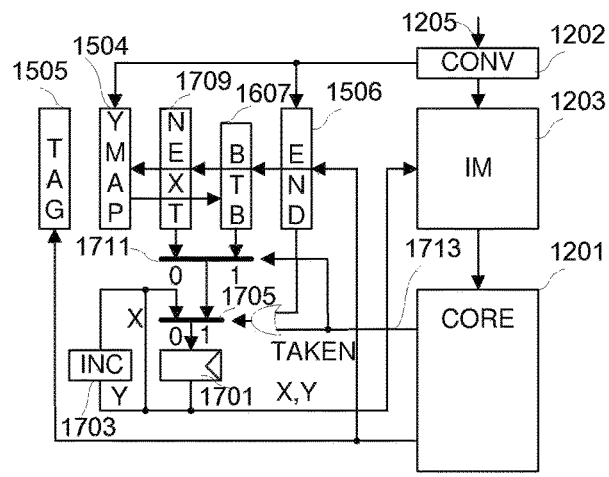
FIG. 17 illustrates a schematic diagram of another exemplary processor system including a branch target table and a tracker consistent with the disclosed embodiments.

FIG. 17 illustrates a schematic diagram of another exemplary processor system including a branch target table and a tracker consistent with the disclosed embodiments. As shown in FIG. 17, the converter 1202, the instruction memory 1203, the processor core 1721, the tag memory 1505, the block offset mapper 1504, the ending flag memory 1506 and the branch target buffer 1607 are similar to the corresponding components shown in FIG. 16. The difference is that the processor system shown in FIG. 17 also includes a next block address memory 1709, a selector 1711, an OR logic 1707 and a tracker. The host instruction address is generated through the tracker, so that the processor core 1701 only needs to output the guest instruction address.

Figure 18A:
FIG. 18A illustrates a schematic diagram of an exemplary format of a next block address memory consistent with the disclosed embodiments.

The rows in the next block address memory 1709, the tag memory 1505, the block offset mapper 1504, and the ending flag memory 1506 have one to one correspondence relationship. As shown in FIG. 18A, every row of the next block address memory 1709 includes two parts: the first part 1801 stores X address of the previous host instruction block of the host instruction block corresponding the row; and the second part 1802 stores X address of the next host instruction block of the host instruction block corresponding to the row. Thus, by using the block address of the current host instruction block (i.e., X address outputted by the tracker) to perform an addressing operation for the next block address memory 1709, the corresponding X address of the previous host instruction block and the corresponding X address of the next host instruction block can be read out. The selector 1711 selects the address of the first host instruction in the next host instruction block composed of X address and Y address '0' of the next host instruction block outputted by next block address memory 1709, and the branch target host instruction address outputted by the branch target buffer 1607 based on a TAKEN signal 1713 indicating whether the branch is taken, and send the selected address to selector 1705. When the current host instruction is the last instruction of the host instruction block, or the branch is taken, OR logic 1707 controls the selector 1705 to select the input from selector 1711.

The tracker is composed of a register 1701, an incrementer 1703 and a selector 1705. The register 1701 stores and outputs the current host instruction address 1723 composed of the block address (X address) and block offset of the host instruction (Y address). The current host instruction address 1723 is used to perform an addressing operation for the instruction memory 1203 to read out the host instruction in one row of the instruction memory 1203. The host instruction is then sent to the processor core 1721 for decoding. At the same time, the corresponding row of the next block address memory 1709 and the ending flag memory 1506 is accessed and sent to the branch target buffer (BTB) 1607 to perform a matching operation. X address in the current host instruction address 1723 is used to perform an addressing operation in for the ending flag memory 1506 to read out the content of the corresponding row. The content is matched with Y address in the current host instruction address 1723 to examine whether the instruction is the last instruction of the host instruction block. If the instruction is not the last instruction of the host instruction block, and the decoding result of the processor core 1721 shows that the instruction is not a branch instruction, OR logic 1707 controls the selector 1705 to select X address outputted by register 1701 and Y address added by '1' outputted by the incrementer 1703. The X address and Y address added by '1' are stored in register 1701 as the current host instruction address in the next clock cycle.

If the instruction is the last host instruction or the branch instruction, the selector 1705, under the control of OR logic 1707, selects the output of the selector 1711 and store the output in register 1701 as the current host instruction address in the next clock cycle. Specifically, if TAKEN signal 1713 indicates that the branch is not taken, the selector 1711 selects the address of the first host instruction of the next host instruction block (provided by addressing of the current host instruction address 1723) in the next block address memory 1709; and the address of the first host instruction is then selected by the selector 1705 and stored in register 1701. If TAKEN signal 1713 indicates that the branch is taken, the selector 1711 selects the branch target host instruction address obtained by the matching operation of the current host instruction address 1723 in the branch target buffer 1607; and the branch target host instruction address is then selected by the selector 1705 and stored in register 1701. The TAKEN signal 1713 generated by the processor core 1721 can be replaced by a branch prediction value stored in the branch target buffer 1607 to control selector 1711 and selector 1705. This method requires the mechanism to verify whether the branch prediction is correct and to amend the branch prediction when the prediction is wrong.

In one embodiment, the host instruction address that controls the instruction memory 1203 is provided by the tracker. The processor core 1721 needs to provide the guest instruction address 1708 as the address of the next cycle only when branch decision is taken and the current host instruction address 1723 is not matched with the content of the branch target buffer 1607, or when ending instruction is determinate and an invalid entry is found when addressing the next block address memory 1709.

Specifically, when the current host instruction address is not matched with the content of the branch target buffer 1607, the processor core 1721 calculates the branch target address 1708 of the guest instruction using the method shown in FIG. 16. The branch target address 1708 of the guest instruction is sent to the tag memory 1505 to perform the matching operation, and the branch target address 1708 of the guest instruction is also sent to the block offset mapper 1504 to perform the mapping operation. The branch target address of the host instruction obtained by the matching and mapping operation is stored in the entry of the branch target buffer 1607 using the method described in FIG. 16, and the branch target address of the host instruction is stored in register 1701 as the current host instruction address 1723. If an invalid entry is found when performing the addressing operation for the next block address memory 1709, the processor core 1721 calculates the next block address 1708 of the guest instruction using the method shown in FIG. 16. The next block address 1708 of the guest instruction is sent to the tag memory 1505 to perform the matching operation. The next block address of the host instruction obtained by the matching operation is stored in field 1802 of the invalid entry. The block address of the current instruction block is stored in field 1801 of the row corresponding to the row pointed to by the next block address of the host instruction obtained by matching in the next block address memory 1709.

It should be noted because various sequential host instruction blocks are linked together through information stored in the next block address memory 1709, the addressing operation can be performed for the next block address memory 1709 based on X address of the current host instruction block to read out X address in field 1802 of the next host instruction block. If a host instruction block is replaced in the instruction memory 1203, an addressing operation can be performed for the next block address memory 1709 based on X address of the host instruction block to read out X address in field 1801 of the previous host instruction block stored in the next block address memory 1709. Then, the addressing operation is performed for the next block address memory 1709 based on X address in field 1801 to find the corresponding row. X address in field 1802 of the next host instruction block (the host instruction block that is replaced) stored in the row is set to invalid, thereby representing the address relationship after replacement. If the instruction memory is organized using a way associative mode, the row address of the next instruction block of one instruction block is the row address of the current instruction block added by '1'. The field 1801 and the field 1802 can record the way number to realize the function.

Figure 19:
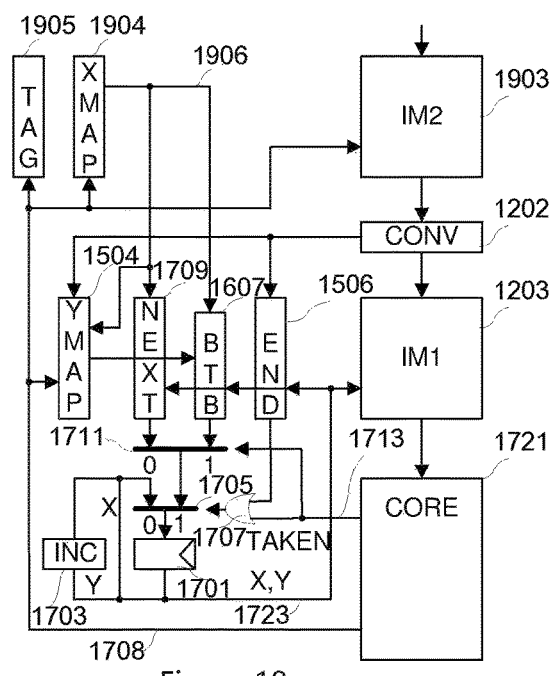
FIG. 19 illustrates a schematic diagram of a processor system including two levels of instruction memory consistent with the disclosed embodiments.

In addition, the above methods can also be applied to a processor system including multiple levels of instruction memory. FIG. 19 illustrates a schematic diagram of a processor system including 2 levels of instruction memory consistent with the disclosed embodiments. As shown in FIG. 19, the converter 1202, the instruction memory 1203, the processor core 1201, the block offset mapper 1504, the ending flag memory 1506, the branch target buffer 1607, the next block address memory 1709, the selector 1711, OR logic 1707 and the tracker are the same as the corresponding components shown in FIG. 16. The difference is that the instruction memory 1203, the block offset mapper 1504, the next block address memory 1709, the ending flag memory 1506 and the branch target buffer 1607 together form L1 instruction memory, whereas the instruction memory 1903, the tag memory 1905 and the block address mapping module (XMAP) 1904 together form L2 instruction memory. As used herein, the instruction memory 1203 (also called L1 instruction cache 1203 to distinguish from the instruction memory 1903) stores the host instructions, whereas the instruction memory 1903 (also called L2 instruction cache 1903) stores the guest instructions. Before the guest instruction stored in the instruction memory 1903 is executed by the processor core, the guest instruction is converted to the corresponding host instruction by the converter 1202, and then the converted host instruction is stored L1 instruction cache 1203 for processor core 1201 execution.

In one embodiment, one guest instruction block may correspond to multiple host instruction blocks. Because the instruction memory 1903 includes the guest instructions corresponding to all the host instructions stored in L1 instruction cache 1203, only one tag memory 1905 is used for the two levels of memory.

The row of the tag memory 1905 and the guest instruction block in the instruction memory 1903 have one-to-one correspondence. Every row of the tag memory 1905 stores the tag address of the corresponding guest instruction block. Further, the row of the block address mapping module 1904 and the row of the tag memory 1905 also have one-to-one correspondence. Every row of the tag memory 1905 stores 1X address of a single host instruction block or a plurality of host instruction blocks corresponding to the guest instruction block in L1 instruction cache 1203 and a valid signal (when one host instruction block corresponding to the guest instruction block is not stored in L1 instruction cache 1203, the valid signal of the corresponding 1X address is invalid).

Figure 18B:
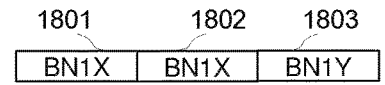
FIG. 18B illustrates a schematic diagram of another exemplary format of a next block address memory consistent with the disclosed embodiments.
Figure 18C:
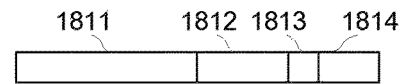
FIG. 18C illustrates a schematic diagram of an exemplary format of a guest instruction address in a processor system including two levels of memory.

FIG. 18C illustrates a schematic diagram of an exemplary format of a guest instruction address in a virtual machine including 2 levels of instruction memory. The guest instruction address is composed of a block address, a sunblock number 1813 and a block offset address 1814, where the block address corresponds to the guest instruction block in the instruction memory 1903 and the block address can be further divided into tag 1811 and index number 1812. The tag information stored in the row of the tag memory 1905 can be read out by performing an addressing operation for the row of the tag memory 1905 based on index number 1812. Then, the tag information is compared with the tag 1811 in the block address to determine whether the guest instruction block address is matched successfully. The index number 1812 can be used to address the memory in the block address mapping module 1904 to select one row of the memory, and the sub block number 1813 selects one column of the memory.

Figure 20:
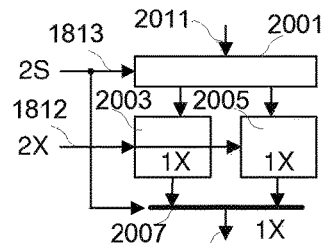
FIG. 20 illustrates a schematic diagram of an exemplary block address mapping module in a processor system including two levels of memory consistent with the disclosed embodiments.

FIG. 20 illustrates a schematic diagram of an exemplary block address mapping module consistent with the disclosed embodiments. As shown in FIG. 20, the block address mapping module 1904 includes a write module 2001, an output selector 2007 and a memory. Every guest instruction block is divided into 2 sub blocks. The guest instructions in every sub block are converted to the host instructions by the instruction converter 1202, and the converted host instructions are stored in a L1 instruction block in L1 instruction cache. Therefore, every row of the memory in the block address mapping module 1904 corresponds to one L2 guest instruction block in L2 instruction cache 1903. The memory is divided into two columns 2003 and 2005 which correspond to the two sub blocks in every guest instruction block, which are selected by the sub block number 1813. Every entry of the memory corresponds to one sub block, and the entry stores L1 instruction block address (1X address) of the host instruction block corresponding to the guest instruction sub block. Therefore, the block address mapping module 1904 can map the guest instruction block address to the corresponding host instruction block address, and correlate the guest instruction sub block to the corresponding host instruction block. In addition, the corresponding host instruction block of one guest instruction sub block can be put in any one L1 cache block in L1 instruction cache. Therefore, L1 instruction cache can be a fully associative cache.

Specifically, when the memory in the block address mapping module 1904 is written, the sub block number 1813 in the guest instruction address controls the write module 2001 to select column 2003 or column 2005 in the memory, and the index number 1812 selects one row of the memory for writing 1X address of the corresponding host instruction (that is, ix address shown in FIG. 20). When information in the memory of the block address mapping module 1904 is read out, the index number 1812 selects one row of the memory to read out the content, and the sub block 1813 of the guest instruction address controls selector 2007 to select data of column 2003 or 2005 in the memory to output the content.

Returning to FIG. 19, for the L1 instruction memory, the working principle and procedure are similar to the embodiment shown in FIG. 17. The only difference is that the system implements a different process when the current host instruction address 1723 is matched with the content of the target memory 1607 and the matching does not hit, or the addressing operation performed in the next block address memory 1709 finds an invalid entry, and the branch determination and the ending instruction determination select the above miss or the invalid instruction address. Similar to the embodiment shown in FIG. 17, the guest instruction address 1708 provided by processor core 1721 is used as the address in the next cycle. The difference is that the guest instruction address is not directly converted by the tag memory 1505 in the same level. Whereas an entry is read out from the tag memory 1905 using the index number 1812 in the guest instruction address and the entry is matched with the tag 1811 in the guest instruction address. Then, the index number 1812 in the guest instruction address and the sub block number 1813 are used to perform the addressing operation for the block address mapping module 1904.

If the tag matching hits and 1X address read out from the block address mapping module 1904 is valid, it indicates that the needed host instruction is stored in L1 instruction cache 1203. At this moment, 1X address via bus 1906 is sent back to the L1 instruction memory to fill the invalid entry of the next block memory 1709; or an addressing operation is performed for the block offset mapper 1504 using 1X address and the block offset address of the guest instruction on bus 1708 is mapped to the block offset address of the host instruction. 1X address and the block offset address of the host instruction together constitute the branch target address (1Y address) of the host instruction, and 1Y address is stored in the entry (that is, the entry when there is a miss in the matching operation) of the branch target buffer 1607. The following operations are the same as the operations shown in FIG. 17.

If the tag matching hits and 1X address read out from the block address mapping module 1904 is invalid, it indicates that the needed host instruction is not stored in L1 instruction cache 1203. At this time, an addressing operation is performed for L2 instruction cache 1903 using the guest instruction address on bus 1708. The corresponding guest instruction sub block is sent to the instruction converter 1202, and the corresponding guest instruction sub block is converted to the host instruction block. The host instruction block is stored in the L1 cache block specified by the cache replacement logic in L1 instruction cache 1203. 1X address of the L1 cache block is stored in the entry (the read out previously invalid entry) pointed to by the guest instruction in the block address mapping module 1904, and 1X address is set to valid. The block offset mapping relationship generated in the instruction conversion process and the ending flag are also written into the row pointed to by 1X address in the block offset mappers 1504 and ending flag memory 1506. 1X address via bus 1906 is sent back to the L1 instruction memory and 1X address is stored in the invalid entry of the next block address memory 1709; or 1X address and the block offset address of the host instruction generated by mapping together are stored in the entry (that is, the entry when there is a miss in the matching operation) of the branch target buffer 1607. The following operations are the same as the operations shown in FIG. 17.

If there is a miss in the tag matching, it indicates that the needed instruction is not stored in L2 instruction cache 1903. At this time, the guest instruction address on bus 1708 is sent to a lower level memory and the guest instruction block is taken out from the lower level memory and is filled in a L2 cache block specified by the cache replacement logic in L2 instruction cache 1903. At the same time, the tag 1811 in the guest instruction on bus 1708 is stored in the entry corresponding to the L2 cache block in the tag memory 1905, and two entries corresponding to the L2 cache block in the block address mapping module 1904 are set to invalid. Then, the following operations are the same as the operations under the condition that the tag matching hits and 1X address in the block address mapping module obtained by addressing operation is invalid.

When the guest instruction is a fixed length instruction, the boundary of the guest instruction block or sub block and the starting point of a guest instruction overlap. Therefore, whether the guest instruction block (or sub block) is entered in a sequential execution or a branch manner, the complete guest instruction block (or sub block) can be converted to the corresponding host instruction block starting from the boundary of the guest instruction block (or sub block). Then, the converted host instruction block is stored in the host instruction memory. If the guest instruction set is a variable length instruction set, the starting address of the first guest instruction in one guest instruction block (or sub block) may not overlap the boundary of the guest instruction block (or sub block). In this case, when the branch enters a guest instruction block, only a part of the guest instruction block starting from the branch target instruction to the end of the guest instruction block can be converted and stored in a host instruction cache block for the processor core execution. Whereas the instructions before the branch target instruction need to wait for conversation when the starting point falls over these instructions next time the guest instruction block is entered in the sequential execution or the branch manner. Then, the converted host instructions are added into the host instruction block. The storage format of the host instruction in L1 instruction cache 1203 can be modified to adapt to this situation, and it is defined that every guest instruction belongs to the guest instruction block including the starting address of the guest instruction.

Figure 21:
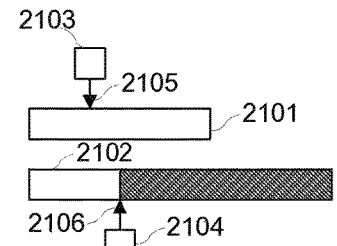
FIG. 21 illustrates an exemplary instruction memory storing host instructions when the guest instruction and the block boundary are not aligned.

FIG. 21 illustrates an exemplary instruction memory storing host instructions when the guest instruction and the block boundary are not aligned. As shown in FIG. 21, the guest instruction block 2101 is a row of guest instruction block (or sub block) in the instruction memory 1903, and the host instruction block 2102 is a row of host instruction block corresponding to the guest instruction block 2101 in L1 instruction cache 1203. Assuming that the target instruction of the first branch is the guest instruction 2105, the conversion starts from the target instruction 2105 until the conversion of the guest instruction block is completed. The converted host instructions are stored in the host instruction cache block. Therefore, the host instructions are still stored in an ascending order of the addresses, but the highest address of the host instructions obtained by the conversion and the most significant bit (MSB) (that is, the rightmost of the host instruction block 2102 in FIG. 21) of the address of the host instruction block 2102 are aligned. Therefore, the host instruction 2106 corresponding to the guest instruction 2105 is stored in the position shown in FIG. 21. The host instructions corresponding to all the guest instructions starting from the guest instruction 2105 in the guest instruction block 2101 are all stored in the order of instruction addresses in the shadow area of the host instruction block 2102 shown in FIG. 21.

Further, one pointer is added in every row of the instruction memory 1903 and the instruction memory 1203. The pointer is used to point to the first guest instruction that is converted in the guest instruction block (e.g., the pointer 2103 pointing to the host instruction 2105 in FIG. 21), and the first host instruction that is stored in the hot instruction block (e.g., the pointer 2104 pointing to the host instruction 2106 in FIG. 21). Therefore, when entering the guest instruction block again in the sequential execution or the branch manner, whether the target instruction is converted can be determined by comparing the block offset address of the guest instruction with the pointer 2103. Moreover, if it is determined that the new target instruction is not converted, all the guest instructions starting from the new target instruction until the guest instruction pointed to by the pointer 2103 in the guest instruction block are converted. Then, the highest address of every host instruction obtained by conversion is aligned with the previous address of the address pointed to by pointer 2104 in the host instruction block 2102. The host instructions are stored in an ascending order of the addresses. At the same time, the values of the pointer 2103 and the pointer 2104 are updated, such that the pointer 2103 and the pointer 2104 point respectively to the position where the new target instruction is in the guest instruction block 2101 and the position where the host instruction corresponding to the new target instruction is in the host instruction block 2102. The host instruction mapping relationship in the block offset mapper 1504 is also stored according to the most significant bit alignment method, which is the same as the storage method for the host instruction cache block.

When using the storing method described in the embodiment shown in FIG. 21, the first instruction of every host instruction block may be not at the starting address (that is, Y address '0') of the host instruction block. Therefore, the next block address memory in the processing system needs to be modified. FIG. 18B illustrates a schematic diagram of another exemplary format of a next block address memory. As shown in FIG. 18B, besides the first part 1801 and the second part 1802, every row of the next block address memory also includes a third part 1803 for storing 1Y address of the first host instruction in the next host instruction block of the host instruction block corresponding to that row. Thus, the second part 1802 and the third part 1803 together form the address of the first host instruction of the next host instruction block. Therefore, when the host instruction is not stored in the position starting from the least significant bit (LSB) of the host instruction block because the boundary of the guest instruction is not aligned, the first host instruction of the next host instruction block can still be found by performing an addressing operation for the next block address memory based on the block address (that is, 1X address) of the current host instruction block to read out the corresponding address. The formats shown in FIG. 21 and FIG. 18B can also be used in the embodiments shown in FIG. 15, FIG. 16 and FIG. 17 when the starting address of the guest instruction is not aligned with the boundary of the guest instruction block.

Figure 22:
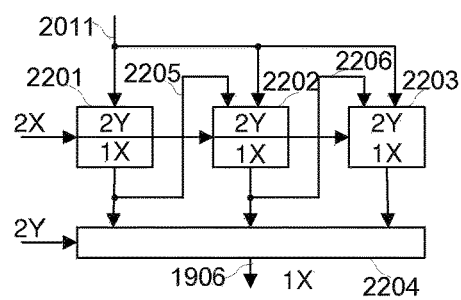
FIG. 22 illustrates a schematic diagram of another exemplary block address mapping module consistent with the disclosed embodiments.

FIG. 22 illustrates a schematic diagram of another exemplary block address mapping module consistent with the disclosed embodiments. An implementation method for an elastic mapping relationship between the guest instruction block and the host instruction block is described in FIG. 22 and the method can be applied in the embodiment shown in FIG. 19. In one embodiment, it is assumed that the host instructions converted from the guest instructions in a guest instruction block can be allocated in at most 3 host instruction blocks. It should be noted that the number of the allocated host instruction blocks can be any number. Therefore, the main part of the block address mapping module can be divided into memory 2201, memory 2202 and memory 2203. Every row of memory 2201, memory 2202 and memory 2203 corresponds to one guest instruction block. Every row is composed of 2 storage fields for respectively storing the block offset address (2Y) of the starting guest instruction in the guest instruction block and the block address (1X) of the host instruction block corresponding to the sub block in L1 instruction cache 1203. In addition, the corresponding rows of memory 2201, memory 2202 and memory 2203 have pathway 2205 and pathway 2206. Contents of any row of the memory 2201 can be shifted right to the corresponding row of the memory 2202, and contents of any row of the memory 2202 can be shifted right to the corresponding row of the memory 2203.

When a guest instruction block is accessed as a branch target for the first time, starting from the block offset address (2Y) of the guest instruction of the branch target, all complete instructions in the guest instruction block are converted to the host instructions, and all converted host instructions are stored in order in a host instruction block. 2Y and the block address (1X) of the host instruction block are stored in a row pointed to by the address (2X) of the guest instruction block in memory 2201 shown in FIG. 20. Thus, the content (i.e., 2Y and 1X) in the row may record the guest instruction that the block offset address is 2Y in the guest instruction block (2X) corresponding to the first host instruction in the host instruction block (the block address is 1X).

If the host instruction block is full and there are more host instructions that need to be stored, another host instruction block is allocated to store the remaining host instructions. The block offset address (2Y) of the guest instruction corresponding to the first host instruction in the remaining host instructions and the block address (1X) of the new allocated host instruction block are stored in the row pointed to by 2X in the memory 2202. The block offset mapping relationship of the guest instruction and the host instruction is also stored in the row that is addressed by 1X in the block offset mapper 1504 shown in FIG. 19.

Further, the block offset address (2Y) of the guest instruction of the branch target is mapped to the block offset address (1Y) of the host instruction by the mapping relationship pointed to by the corresponding host instruction block address (1X) in the block offset mapper 1504. At this point, the guest instruction block starting from the branch target instruction is converted to the host instructions by the converter 1202; the guest instruction block address 2X is also mapped to the host instruction block address (1X) by the block address mapping module 1904; and the block offset address (2Y) of the guest instruction is also mapped to the block offset address (1Y) of the host instruction by the block offset mapper 1504. Moreover, 1X and 1Y can be stored in the branch prediction module 1607 for tracker selection.

Returning to FIG. 20, when the guest instruction block is accessed next time, an addressing operation is performed for memory 2201, memory 2202 and memory 2203 using the guest instruction block address 2X in the access address to read out the same row, and the read out contents are sent to comparator 2204. The block offset address 2Y of the guest instruction in the access address is compared with every 2Y read out from every memory in the comparator 2204. 1X stored in the first memory whose 2Y is less than 2Y of the access address is selected as output 1906 of the block address mapping module 1904. The following operations are the same as the above description. If 2Y (the value of 2Y is the smallest value in every memory of the block address mapping module 1904) in the memory 2201 is still greater than BN2Y of the access address, the target instruction accessed is not converted to the host instruction. At this time, the system controls the converter 1202 to convert all guest instructions starting from the access target until the guest instruction before 2Y stored in memory 2201 to the host instructions, and the converted host instructions are stored in the L1 cache block specified by the replacement logic. The row pointed to by the guest instruction address 2X of the access address in memory 2202 is shifted right to the corresponding row in memory 2203, and the row pointed to by 2X in memory 2201 is shifted right to the corresponding row in memory 2202. 2Y of the access target and new 1X are stored in memory 2201. Therefore, a guest instruction block is converted to multiple host instruction blocks start with the starting point of multiple access. The mapping relationship is also stored in the block address mapping module 1904 in FIG. 22. The operations of the block address mapping module 1904 can refer to the embodiment shown in FIGS. 8A-8D. When 1X address of the host instruction corresponding to the host instruction is obtained, the following operations are the same, which are not repeated herein.

Figure 23:
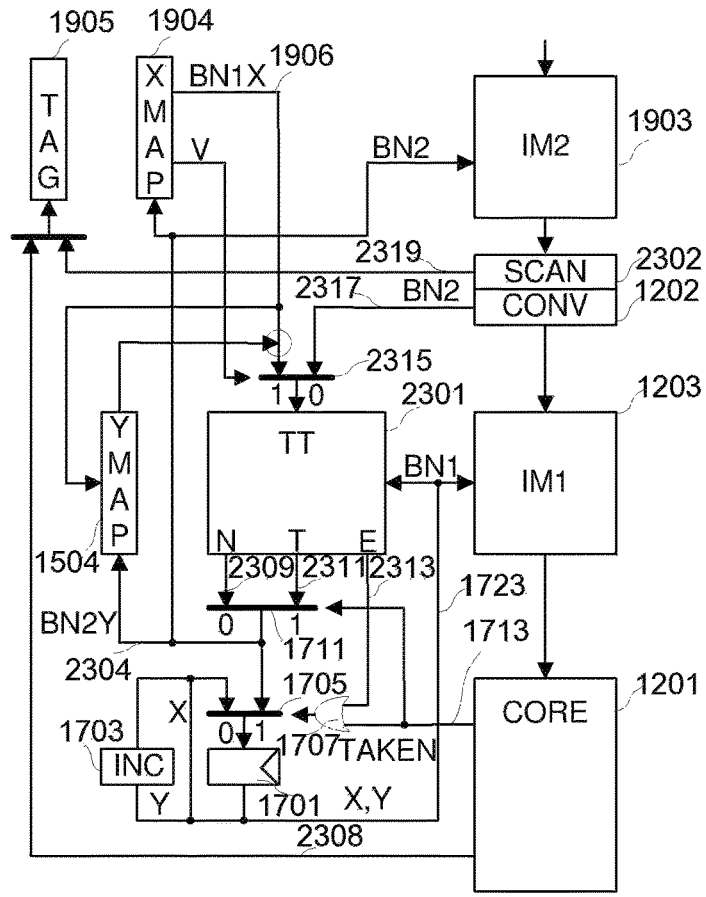
FIG. 23 illustrates a schematic diagram of an exemplary processor system including a track table consistent with the disclosed embodiments.

The track table can be incorporated into the processing system. FIG. 23 illustrates a schematic diagram of an exemplary processor system including a track table consistent with the disclosed embodiments. Because the track table includes the branch target address information, the next instruction block address information and the ending track point information, track table 2301 can be used to replace the next block address memory 1709, the ending flag memory 1506 and the branch target buffer 1607. Further, the tag memory 1905, the block address mapping module 1904, the converter 1202, L1 instruction cache 1203, the processor core 1201, the block offset mapper 1504, the selector 1711, OR logic 1707 and the tracker are the same as the corresponding components shown in FIG. 19. In one embodiment, a scanner is added. The scanner is configured to examine the converted guest instruction, calculate the guest instruction address BN2 of the branch target for the branch instruction and convert BN2 to the corresponding host instruction address BN1. Because the host instruction address BN1 is the address of L1 instruction cache 1203, the host instructions in L1 instruction cache 1203 and track points in track table 2301 have one-to-one correspondence, and the track point corresponding to the branch instruction includes the host instruction address of the branch target, the tracker can perform the addressing operation for track table 2301 to read out contents of the track point and select the current track address added by '1' or the branch target addressing address in the track point as the addressing address of the next host instruction based on the branch instruction execution.

In addition, based on the content of the track point in track table 2301, whether the instruction is the last instruction of the host instruction block can be determined. For example, a flag bit in the track point can be used to indicate whether the track point corresponds to the last instruction. When the read pointer of the tracker points to this track point, based on value of the flag bit read out from bus 2313, whether the instruction is the last instruction can be determined.

The track table 2301 can simultaneously output contents of the track point pointed to by the read pointer 1723 of the tracker via bus 2311 and contents of the ending track point (storing the address of the starting point of the next host instruction block) in the track containing the track point via bus 2309, thereby providing simultaneously the branch target addressing address BN1 and BN1 address of the next host instruction block for selector 1711.

In one embodiment, another difference is that a selector 2315 is added in FIG. 19. The selector 2315 is configured to select the BN1 host instruction address (also L1 instruction cache address) and BN2 L2 cache address outputted by scanner 2302 and store the selected result in track table 2301, where BN1 is formed by combing BN1X sent by the block address mapping module 1904 via bus 1906 and BN1Y sent by the block offset mapper 1504.

Specifically, when the scanner 2302 examines the guest instructions that are sent from L2 instruction cache 1903 to L1 instruction cache 1203, for the branch instruction in the guest instructions, the scanner calculates the guest instruction address of the branch target by adding the guest instruction address to the branch offset of the guest instruction. An addressing operation is performed for the tag memory using the index part of the guest instruction address. Then, the content read out is matched with the tag part of the guest instruction.

If there is a miss, the guest instruction block is read out from the lower level memory and store the guest instruction block read out from the lower level memory in L2 cache block pointed to by the cache block replacement logic in L2 instruction cache 1903. If there is a hit, the index number 1812 of the guest instruction is used as the L2 cache block address BN2X; the sub block number 1813 and block offset address 1814 together are used as BN2Y; and BN2X and BN2Y together form L2 cache address BN2. BN2 is stored in the entry of the host branch instruction corresponding to the guest branch instruction in track table 2301. In this way, when a guest branch instruction is converted to a host branch instruction and stored in L1 instruction cache 1203, the branch target of the host branch instruction is at least stored in L2 instruction cache 1903 using the guest instruction format, and the entry of the corresponding track table of the host branch instruction has stored the L2 cache address BN2 of the branch target.

When read pointer 1723 (L1 cache address BN1) of the tracker addresses L1 instruction cache 1203 to read out the host branch instruction for processor core 1723 execution, the read pointer 1723 of the tracker performs an addressing operation for track table 2301 to read out the track entry corresponding to the host branch instruction at the same time. When the output 2311 of the track table 2301 is BN2 format and the branch prediction is 'a branch is taken', the selector 1711 puts BN2 on bus 2304 and performs an addressing operation for the block address mapping module 1904 using BN2. If the output of the mapping is invalid, it indicates that the instruction block including the branch target instruction is not converted to the host instruction block to be stored in L1 instruction cache 1203. At this time, the processor system performs an addressing operation for L2 instruction cache 1903 using BN2 to read out the guest instruction block. The guest instruction block is sent to the scanner 2302 to calculate the branch target of the branch instruction in the guest instruction block. The guest instruction block is also sent to the converter 1202 and is converted to the host instruction block. The host instruction block is stored in the L1 instruction cache block pointed to by BN1X address specified by the cache replacement logic in the L1 instruction cache.

The system stores the BN1X address in the 'invalid' entry of the block address mapping module 1904, and also stores the offset address mapping relationship generated by instruction converter 1202 in the row pointed to by BN1X in the block offset mapper 1504. Further, the virtual machine system maps the guest instruction offset address 1814 to the host instruction BN1Y based on the mapping relationship pointed to by the BN1X in the block offset mapper 1504. The L1 cache address BN1 of the branch target host instruction formed by BN1X and BN1Y is written into the entry of the track table of the corresponding branch instruction to replace the BN2. Thus, the branch target guest instruction and the following guest instruction block are converted to the host instruction block and store the converted host instruction block in the L1 cache 1721. At the same time, the L1 cache address of the host branch target instruction is stored in the entry of the track table corresponding to the host branch target instruction.

When L1 cache address 1723 (BN1) outputted by the tracker addresses L1 instruction cache 1203 to read out the branch instruction for processor core 1721 execution, BN1 also addresses the track table 2301 to read out the entry of the track table corresponding to the instruction. When the output 2311 of the track table is BN1 format, BN1 controls selector 1711 and selector 1705 through TAKEN signal 1713. For example, when TAKEN signal 1713 is 'no branch', a read pointer of the tracker, and L1 cache address 1723 added '1' by incrementer 1703 may be used as L1 cache address 1723 in the next cycle. If the TAKEN signal 1713 is 'taken a branch', BN1 outputted by the track table is as a read pointer of the tracker and L1 cache address 1723 of the next cycle. L1 cache address 1723 addresses directly for the L1 instruction cache 1203 to read out the host instruction for processor core execution.

The operations for ending track point in the track table use the same method. That is, when the guest instruction is converted to the host instruction and the host instruction is stored in a L1 cache block, the scanner 2302 also calculates the address of the next guest instruction block (i.e., the address of the current guest instruction block plus 1) and the address of the next guest instruction block is sent to tag memory 1905 to perform a matching operation. If there is no match, a guest instruction block is taken out from the lower memory and stored in the L2 cache block specified by cache block replacement logic using BN2X address in L2 cache 1903. The corresponding rows in tag memory 1905 and block address mapping module 1904 are also updated. Thus, the obtained BN2X or BN2X obtained by the matching operation is stored in the ending track point of the row corresponding to the L1 cache block in the track table 2301.

When read pointer 1723 of the cache memory points to the row, the BN2 is read out from the ending track point via bus 2309. When BN2X is read out via bus 2311 (the operation for BN2X is similar to the operation for branch target instruction address BN2), BN2X is sent to block address mapping module 1904 via bus 2304 and is mapped to BN1X (when the BN1X address is invalid, a guest instruction is converted to a host instruction and stored in the L1 cache block specified by cache block replacement logic using BN1X address in L1 instruction cache 1203; and the corresponding rows in tag memory 1905 and block address mapping module 1904 are also updated.). The BN1X and BN2Y on bus 2304 are mapped to BN1Y via block offset mapper 1504. The BN1X and BN1Y constitute a BN1 address, and the BN1 address is stored into the track table 2301 via the selector 2315 to replace the previous BN2. For the above branch target address or the next block address, whether the corresponding entry content of block address mapping module 1904 is valid may be detected at the first time matching the tag. When the corresponding entry content of block address mapping module 1904 is valid, it indicates that the branch target instruction or the next instruction is converted to the host instruction and the host instruction is stored in L1 instruction cache 1203. At this time, BN2Y is mapped to BN1Y using BN1X in the corresponding entry content of block address mapping module 1904 as above process, and the BN1 is directly stored in the track table.

Figure 24:
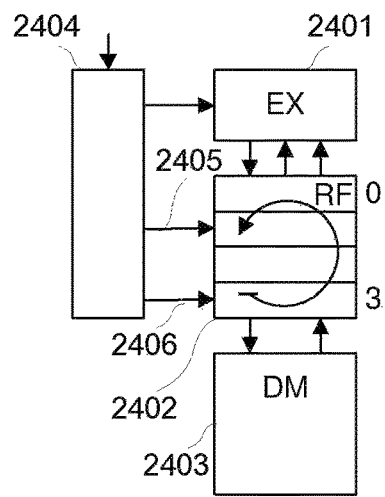
FIG. 24 illustrates a schematic diagram of an exemplary processor system using a register file to implement a stack operation function consistent with the disclosed embodiments.

FIG. 24 illustrates a schematic diagram of an exemplary processor system using a register file to implement a stack operation function consistent with the disclosed embodiments. For illustrative purposes, only a part of modules and devices are illustrated in FIG. 24. As shown in FIG. 24, register file 2402 in the processor core can be configured as a stack. Based on a decoding result of the instruction and storage status of the current register file 2402, stack controller 2404 can adjust respectively output address 2405 and output address 2406 as a value of top of stack (TOS) pointer and a value of bottom of stack (BOS) pointer, and the pointer values are sent to register file 2402.

Stack controller 2404 can be composed of controller 1019, register 1011, decrementer 1031, incrementer 1041 and the selector shown in FIG. 10A. The register 1011 (also called top of stack pointer register) is configured to store a value of a current top of stack pointer, where the pointer points to a register in the register file. The basic stack operations include POP and PUSH. Decrementer 1031 decreases '1' from the current top of stack pointer value. Incrementer 1041 increases '1' to the current top of stack pointer value. That is, the POP operation is implemented by decrementer 1031 (the top of stack pointer value subtracts '1') and the PUSH operation is implemented by incrementer 1041 (the top of stack pointer value adds '1'). Thus, according to the instruction decoding results, operands loaded from memory 2403 is pushed to register file 2402 in order (the top of stack pointer value adds '1' in order) to load data based on the stack. Or after the operands popped from register file 2402 in order (the top of stack pointer value subtracts '1' in order) are sent to execution unit 2401 to perform the corresponding arithmetic logic operation, the result is pushed again to register file 2402 (the top of stack pointer value adds '1') to implement the stack operation. Further, the operands popped from register file 2402 are stored in memory 2403 (the top of stack pointer value subtracts '1') to store data based on the stack. Specifically, three bits in the address field in the processor instruction set of the register file control the operations of the top of stack pointer value (increased by '1', unchanged, or decreased by '1') on the read port or write port.

In the operation process, the top of stack pointer value is compared to the bottom of stack pointer value to determine whether the stack is full (or nearly full), and empty (or nearly empty). Once a stack composed of register file 2402 is full (or nearly full), under the control of stack controller 2404, some data near the bottom of the stack is stored temporarily in memory 2403, and the bottom of stack pointer is adjusted to point to a new bottom of stack, such that the stack composed of register file 2402 can empty out a part of storage space which can be used by subsequent stack operations. The storage space in memory 2403 is organized in a stack form, and data that needs to be temporarily stored can be stored by the stack operation (POP and PUSH), maintaining the original order of the data. Thus, once the stack composed of register file 2402 is empty (or nearly empty), under the control of stack controller 2404, the temporarily stored data is read out from the stack of memory 2403 by a stack order and written back to the corresponding registers in register file 2402, and the bottom of stack pointer is adjusted to point to a new bottom of stack (that is, the temporarily stored data is recovered to the status before the data is temporarily stored in memory 2403), such that the stack composed of register file 2402 can still store a part of data for the use of the subsequent stack operations. Therefore, the stack operation functions can be implemented by the register file.

In order to apply the method in various hardware platforms, some computer programming languages can generate intermediate code containing the stack instructions. When the intermediate code is executed, a software interpreter can translate the intermediate code in real time into several machine instructions, and the machine instructions are executed by hardware platform. Therefore, execution efficiency of the intermediate code is low. As used herein, the processor system can execute directly the stack operation instructions (that is, each stack operation instruction is converted to the corresponding host instruction), thereby significantly improving the execution efficiency of the processor system. In addition, compared with software virtual machine technology, the processor system including multiple instruction sets can implement the virtual machine by a hardware mode.

Taking the structure described in FIG. 23 as an example, several practical applications are described herein. The corresponding methods and processes can be applied to any other structure proposed by the disclosure (for example, the structures in FIGS. 15, 16, 17, 19). In addition, for illustrative purposes, in the following description, only a variable length instruction set, a fixed length instruction set, and a stack instruction set are used as examples of the guest instruction set, but any other suitable computer instruction set can also be used as a guest instruction set.

First of all, the virtual machine system is used to execute a program composed of variable length instructions. That is, a guest instruction is a variable length instruction. The instruction mapping conversion rules for the variable length instruction set and the host instruction set is imported into the memory 1301 of the converter 1202, and the value for controlling register 212 in the converter 1202 is written. The conversion starting point register has a value of the entering address (whether from branch target or the sequential next address) for starting the conversion. Thus, when the variable length instruction is executed, if the variable length instruction needed by processor core 1201 is stored in instruction memory 1903, an addressing operation for instruction memory 1903 is performed to read out an instruction block containing the variable length instruction, and the instruction block is sent to scanner 2302 and converter 1202. The variable length instructions starting from the variable length instruction to the last variable length instruction that is not converted in the instruction block are scanned and converted to calculate a branch target address of a branch instruction. The branch target address of the branch instruction is converted to the corresponding host instruction address. At the same time, based on the cache replacement algorithms, the host instruction block that is converted from these variable length instructions is stored in the corresponding row in L1 instruction cache 1203 in turn, and corresponding track is built in the corresponding row of the track table 2301.

Specifically, when the variable length instructions are scanned/converted, if the L1 instruction cache 1203 stores the host instruction corresponding to the branch target, the variable length instruction address of the branch target can be converted to obtain the corresponding host instruction address BN1 through the address conversion (the address conversion can be implemented by the tag memory 1905, the block address mapping module 1904 and the block offset mapper 1504) as track point content stored in the track table. If the L1 instruction cache 1203 does not store the host instruction corresponding to the branch target, but the instruction memory 1903 stores the branch target, the variable length instruction address BN2 of the branch target as track point content is stored in the track table. If the instruction memory 1903 does not store the branch target, the branch target can be filled from the lower memory into the row determined by the replacement algorithm (e.g., LRU) in the instruction memory 1903, and the variable length instruction address BN2 of the branch target as the track point content is stored in the track table. Thus, track table 2301 contains address information of the branch target of the variable length branch instruction. According to content read out from the track table 2301 and an execution result of the branch host instruction executed by the processor core 1201, the tracker controls L1 instruction cache 1203 to output the corresponding host instruction for processor core 1201 execution. When the corresponding host instructions are executed in a host instruction address order, the track address (that is, the host instruction address) is added 1 by incrementer 1703, or the next host instruction block address outputted by the track table 2301 via bus 2309 is selected, finding directly the corresponding host instruction from the L1 instruction cache 1203.

When a branch is taken, according to the host instruction address BN1 of the branch target outputted by the track table 2301, the corresponding host instruction can be directly found from the L1 instruction cache 1203 for processor core 1201 execution. When the address outputted by track table 2301 is the variable length instruction address BN2 of the branch target, if the host instruction corresponding to the variable length instruction is stored in instruction cache 1203 in the previous operations, the variable length instruction address can be converted to the host instruction address BN1, and the corresponding host instruction is found from L1 instruction cache 1203 for processor core 1201 execution according to the host instruction address BN1. Otherwise, according to the variable length instruction address, the corresponding variable length instruction can be found from instruction memory 1903, and then the instructions are scanned/converted starting from the variable length instruction to the last variable length instruction that is not converted in the instruction block. The corresponding host instruction block is stored into a L1 instruction cache 1203, and the corresponding track is built in track table 2301. At the same time, the host instruction converted from the variable length instruction is provided for processor core 1201 execution. Processor core 1201 executes the host instructions to generate the corresponding result. For example, when a branch host instruction is executed, a TAKEN signal representing whether the branch is taken is generated and sent to the tracker. Based on the TAKEN signal and a signal representing whether the last instruction in the instruction block is reached sent form track table 2301 via bus 2313, the tracker selects multiple address sources to control program flow execution.

After a program composed of the variable length instructions is executed by the processor system, a program composed of the fixed length instructions is executed by the processor system. In this situation, when the last variable length instruction is executed completely, the operations executed by the processor core are stopped. The status in the processor core and each memory is reset to invalid, and instruction conversion rules between the fixed length instruction set and the host instruction set as well as the register setting are imported into the memory and the register in converter 1202 to replace the previously stored variable length conversion rules. The value of the register for controlling an instruction conversion starting address is the lowest address of the guest instruction block or sub block. When the fixed length instructions are executed by the processor system, if the fixed length instructions needed by processor core 1201 are stored in instruction memory 1903, the instruction block including the fixed length instructions obtained by perform an addressing operation on instruction memory 1903 is sent to scanner 2302 and converter 1202. Scanner 2302 and converter 1202 may scan/convert the entire fixed length instruction block and calculate the branch target address of the branch instruction. The branch target address of the branch instruction is converted to the corresponding host instruction address. At the same time, the obtained host instruction block is stored into the corresponding row in a L1 instruction cache 1203 according to the replacement algorithm, and the track corresponding to the corresponding row is built in the track table 2301. The process is similar to the previous described operations for the variable length instruction. The difference is that the entire fixed length guest instruction block is scanned and converted. Based on content read out from the track table 2301 and the execution result of the branch host instructions by the processor core 1201, the tracker controls L1 instruction cache 1203 to output the corresponding instructions for processor core 1201 execution. The details may refer to the previous embodiments, which are not repeated herein.

Then, assuming that the processor system executes a program including the variable length instruction set and fixed-length instruction set, converter 1202 can be reconfigured to switch different guest instruction sets in real-time when the instruction set is switched. Specifically, the process is the similar to the above process for switching an instruction set to another instruction set. But the process does not need to reset track table 2301, instruction cache 1203, instruction memory 1903, and all other memory to zero. Different thread tracks in the track table 2301 do not interfere with each other, but other memory devices are associated with track table 2301, so various threads are independent of each other, and each has its own independent track. When the instruction set or the thread is switched, as long as the read pointer of the tracker 1723 of the thread and register state of the processor core are stored, when the thread is called back for resuming execution, the data is written back to the corresponding components (e.g., register). Thus, this thread can resume execution from the point that the thread is switched out. One memory in the tracker may store the read pointer corresponding to each thread, such that when the thread (or virtual machine) is switched, the corresponding read pointer can easily be restored. Similarly, one memory corresponding to each thread can be created for each status register of the processor core 1701. Therefore, when the different threads are switched, the time interval is only the required time for data exchange among the read pointer, status register and read pointer memory, and status memory.

The processor system also can combine the method described in FIG. 13B, according to different thread number, converter 1202 converts the guest instructions using the mapping relationship of the corresponding instruction set, such that when the instruction sets corresponding to different thread are different, the processor system does not need to suspend processor core to reconfigure converter, executing the instructions without interruption.

Specifically, before the program is executed, according to the methods described in FIG. 13B, all corresponding relations of the guest instruction set that are possibly used are imported into memory space addressed by the thread number in the memory of converter 1202. When the guest instruction is converted, at the beginning, memory space addressed by the thread number in the memory of converter 1202 is found. Then, according to the corresponding relationship in the memory space, the guest instruction is converted to the host instruction. In this case, other operations are the same as the operations in the previous embodiments, which are not repeated herein. Because each virtual machine contains a different thread, the functionality for multiple different virtual machines running simultaneously on the same processor system can be implemented using the methods described in this example. As mentioned earlier, because different threads in the track table 2301 tracks do not interfere with each other, a plurality of virtual machines also do not interfere with each other because of the guest instructions of the same computer instructions set or different computer instruction sets of different threads that coexist in L2 cache 1903. The method for storing the read pointer of the tracker and the register status of the processor core may refer to the above described embodiments. Thus, when multiple different virtual machines that can execute the same instruction set run simultaneously on the same processor system, one conversion rule for only one guest instruction set can be stored in converter 1202, and every thread points to the same conversion rule. Different threads (different virtual machines) are independent, data in the read pointer of the tracker and the status register of the processor core is exchanged when the threads (virtual machines) are switched.

The disclosed processor system can implement seamless switching between two different instruction sets. The processor core that directly executes stack operation instructions can also implement seamless switching between an instruction set for performing register operations and an instruction set for performing stack operations, without stopping to perform instructions in different instruction sets. Specifically, before the program is executed, according to the methods described in FIG. 13B, all instruction sets for the register operations and the stack operations that are possibly used are imported into memory space addressed by the thread number in the memory of converter 1202. When the instruction for the register operation or the stack operation is converted, at the beginning, memory space addressed by the thread number in the memory of converter 1202 is found. Then, according to the corresponding relationship of the memory space, the instruction for the register operation or the stack operation is converted to the host instruction.

When defining the host instruction, one additional bit is added in the instruction field used to control register operation instructions, that is, control signal 1021 in FIG. 10A. When one instruction in the register operation instruction set is converted to the host instruction, the bit is set to '0', and signal 1021 controls selectors 1033, 1035, 1037 to directly select the register file address field of the host instruction to directly perform an addressing operation on register file 1001 for controlling the corresponding read and write operation. When one instruction in the stack operation instruction set is converted to the host instruction, the bit is set to '1', and signal 1021 controls selectors 1033, 1035, 1037 to directly select the instruction field (i.e., the register address field when the register operation instruction is executed) of the host instruction that control increasing or decreasing the top of stack pointer to control selectors 1053, 1055, 1057 to select the top of stack pointer 1045 to perform an addressing operation on register file 1001 for controlling the corresponding read and write operation. Thus, when the processor core executes the program, the processor core can implement seamless switching between an instruction set for performing register operations and an instruction set for performing stack operations. As long as there has certain condition (e.g., the thread number) that can control instruction converter 1202 to convert the guest instruction to the host instruction using the correct conversion rules, the stack operation instruction can be embedded seamlessly in the program including the register operation instruction set. The processor core can implement seamless switching between an instruction set for performing register operations and an instruction set for performing stack operations. In this case, other operations are the same as the operations in the previous embodiments, which are not repeated herein.

Without departing from the spirit and scope of this invention, other modifications, equivalents, or improvements to the disclosed embodiments are obvious to those skilled in the art and are intended to be encompassed within the scope of the present disclosure.

INDUSTRIAL APPLICABILITY

The systems and methods provided in this disclosure can be applied in various applications related to instruction set conversion, improving efficiency of the processor system. The systems and methods provided in this disclosure can also be applied in various applications related to a virtual machine, such that the virtual machine can be realized by using hardware, improving the efficiency of the virtual machine.

What is claimed is:
1. An instruction conversion method, comprising:
defining conversion rules between a guest instruction set and a host instruction set;
storing the conversion rules in a first memory;
converting a plurality of guest instructions, using the conversion rules stored in the first memory, to a plurality of corresponding host instructions;
storing each of the plurality of host instructions obtained from conversion in an instruction memory in one or more instruction blocks, wherein an instruction block is a plurality of instructions having a same upper bit portion of memory address, called a block address, and a lower bit portion of memory address is called a block offset;

storing at least mapping relationship between block offsets of the guest instructions and block offsets of the corresponding host instructions in a second memory;
producing an address of a guest instruction to be executed by an processor core;
mapping a block address of the address of the guest instruction to be executed to a corresponding block address of the address of the instruction memory;
mapping a block offset of the address of the guest instruction to be executed to a corresponding block offset using the block offset mapping relationship stored in the second memory;
addressing the instruction memory by the corresponding block address of the address of the instruction memory and the corresponding block offset of the address of the instruction memory to provide a host instruction corresponding to the guest instruction;
executing the host instruction corresponding to the guest instruction by the processor core;
extracting an instruction type from a guest instruction during the converting;
extracting and mapping one or more instruction fields from the guest instruction using the instruction type and the conversion rules; and
splicing the extracted and mapped one or more instruction fields from the guest instruction to form the corresponding host instruction.

2. The method according to claim 1, wherein the conversion rules include a plurality of sets of conversion rules and each set is stored in its own memory space in the first memory, and the method further comprises:
recording a starting address of the memory space of each set of conversion rules;
selecting a desired set of conversion rules from the plurality sets of conversion rules from the first memory using the corresponding starting address; and
converting the guest instruction to the corresponding host instruction using the selected desired set of conversion rules.

3. The method according to claim 2, further comprising:
recording a relationship between a thread number of a thread and the guest instruction set of the thread;
selecting automatically a desired set of conversion rules for the guest instruction set of the thread based on the thread number; and
converting guest instructions of the thread to host instructions based on the selected desired set of instruction conversion rules.

4. The method according to claim 1, further comprising:
executing guest instructions of a plurality of guest instruction sets by the same processor core; and
operating a plurality of virtual machines on the same processor core, wherein each virtual machine executes instructions of a different or same instruction set.

5. The method according to claim 1, further comprising:
converting a guest instruction block to a host instruction block;
storing the host instruction block from instruction conversion to the instruction memory such that the block address of the host instruction block corresponds to the block address of the guest instruction block being converted; and
addressing a host instruction block using the block address of a guest instruction address.

6. The method according to claim 5, further comprising:
recording a position of a last host instruction in a host instruction block in the instruction memory;
when the processor core executes a host instruction which is not the last host instruction in a host instruction block, keeping the block address of the host instruction block unchanged as a new block address, while increasing the block offset of the host instruction block by a length of a host instruction as a new branch offset;
when the processor core executes a last host instruction in a host instruction block, providing a block address of a next host instruction block as the new block address and the block offset of the first host instruction in the next host instruction block as the new block offset; and
when no branch is taken, addressing the instruction memory using the new block address and the new block offset.

7. The method according to claim 5, further comprising:
when the processor core executes a branch host instruction, calculating a branch target address using a sum of a branch offset and an address of a corresponding branch guest instruction;
selecting a recorded block offset mapping relationship using the block address of the branch target address;
mapping the block offset of the branch target address, using the selected block offset mapping relationship, to a host block offset; and
using the block address of the branch target address and the mapped host block offset to address the instruction memory when the branch is taken.

8. The method according to claim 7, further comprising:
counting a number of guest instructions between a given guest instruction and an end of the guest instruction block; and
counting a same number of first host instructions of a single or plurality of host instructions corresponding to a guest instruction starting from the corresponding end of the host instruction block,
wherein the block offset of the first host instruction counted last is the block offset of a corresponding host instruction.

9. The method according to claim 7, further comprising:
storing a pair of branch instruction address and host branch target address together with a branch-prediction flag in a branch target buffer (BTB), where the host branch target address is in the format of a block address of a branch target address and a mapped host block offset using the block offset mapping relationship;
when the BTB is not hit or when the branch-prediction flag is not taken, addressing the instruction memory using the address the processor core generated;
when the BTB is hit and when the branch-prediction flag is taken, addressing the instruction memory using the host branch target address the BTB provides.

10. The method according to claim 7, further comprising:
calculating a compensated branch offset as a sum of a block offset and a branch offset embedded in a guest branch instruction;
embedding the compensated branch offset in a branch host instruction corresponding to the guest branch instruction; and
calculating the branch target address using the sum of the compensated branch offset and the block address of the branch host instruction.

11. The method according to claim 1, further comprising:
detecting each branch guest instruction during instruction conversion;
calculating a branch target address using a sum of a branch offset and an address of the branch guest instruction;

selecting a recorded block offset mapping relationship using the block address of the branch target address;

mapping the block offset of the branch target address, using the selected block offset mapping relationship, to a host block offset;

storing the block address of the branch target address and the host block offset to a track table; and using the block address of the branch target address and the host block offset stored in the track table to address the instruction memory when the branch is taken.

12. The method according to claim 11, further comprising:

providing two addresses by the track table in correspondence to the last host instruction in a host instruction block, one is a branch target address and the other is an address of a first host instruction in the sequential next host instruction block;

when the last host instruction in a host instruction block is a branch instruction and the branch is taken, providing the branch target address from the track table to address the instruction memory;

when the last host instruction in a host instruction block is not a branch instruction, or when the last host instruction in a host instruction block is a branch instruction but the branch is not taken, providing the address of a first host instruction in the sequential next host instruction block to address the instruction memory.

13. The method according to claim 1, further comprising:
extracting mapping relationship between guest instruction block addresses and host instruction block addresses;
extracting mapping relationship between guest instruction block offsets and host instruction block offsets;
storing the mapping relationship between guest instruction addresses and host instruction addresses; and
sorting the host instruction block addresses in the order of both of the guest instruction block address and the guest instruction block offset.

14. The method according to claim 13, further comprising:

adding the block address of a host instruction not-yet-stored in the sorted host instruction block addresses based on the block address and the block offset of a guest instruction address corresponding to the host instruction not-yet-stored; and recording in the second memory the mapping relationship between the block offsets of guest instructions in the guest instruction block and the block offsets of host instructions in the host instruction block.

15. The method according to claim 14, further comprising:

reading out a block address of host instruction using the block address and the block offset of a guest instruction address, when the host instruction block address is already recorded in the data structure.

16. The method according to claim 15, further comprising:

selecting from the second memory the block offset mapping relationship using the block address of the host instruction;

mapping the block offset of the guest instruction using the selected block offset mapping relationship to the corresponding block offset of host instruction address; and addressing the instruction memory using the block address and the block offset of host instruction address to provide instruction to the processor core.

17. The method according to claim 16, further comprising:

counting a number of guest instructions between a given guest instruction and a starting guest instruction corresponding to a starting host instruction of a host instruction block; and counting a same number of first host instructions of a single or plurality of host instructions corresponding to a guest instruction, wherein the block offset of the first host instruction counted last is the block offset of a corresponding host instruction.

18. The method according to claim 1, further comprising: configuring a register file in the processor core to function as a stack, by recording a top of stack pointer which points to a register in the register file;

when the stack is near full, moves data from the stack to a data memory; and when the stack is near empty, moves data from the data memory to the stack.

19. The method according to claim 18, further comprising: modifying the definition of a host instruction so a modified host instruction of a modified host instruction set controls a movement of the top of stack pointer;

converting guest instructions of a stack operation guest instruction set to the modified host instructions of the modified host instruction set;

when performing a stack push, pointing the top of stack pointer to a higher register in the register file using the modified host instruction; and when performing a stack pop, pointing the top of stack pointer to a lower register in the register file using the modified host instruction.

* * * * *